United States Patent
Hale

(10) Patent No.: US 9,355,132 B1
(45) Date of Patent: May 31, 2016

(54) TIERED ARRAYS

(71) Applicant: SEMMLE LIMITED, Oxford (GB)

(72) Inventor: Joshua George Hale, Oxford (GB)

(73) Assignee: Semmle Limited

( * ) Notice: Subject to any disclaimer, the term of this patent is extended or adjusted under 35 U.S.C. 154(b) by 0 days.

(21) Appl. No.: 14/871,934

(22) Filed: Sep. 30, 2015

Related U.S. Application Data

(60) Provisional application No. 62/234,939, filed on Sep. 30, 2015.

(51) Int. Cl.
*G06F 17/30* (2006.01)
(52) U.S. Cl.
CPC .... *G06F 17/30324* (2013.01); *G06F 17/30424* (2013.01)
(58) Field of Classification Search
CPC ............... G06F 17/30321; G06F 17/30625; G06F 17/30961; G06F 17/30324; G06F 17/30424
See application file for complete search history.

(56) References Cited

U.S. PATENT DOCUMENTS

| | | | |
|---|---|---|---|
| 6,675,379 B1 | 1/2004 | Kolodner et al. | |
| 7,346,609 B2 | 3/2008 | Chen et al. | |
| 7,490,317 B1 | 2/2009 | Hahn et al. | |
| 7,496,890 B2 * | 2/2009 | Miller | G06F 8/60 717/107 |
| 7,526,468 B2 | 4/2009 | Vincent et al. | |
| 7,937,399 B2 | 5/2011 | Furusho | |
| 7,958,076 B2 | 6/2011 | Bergsten et al. | |
| 7,962,494 B2 | 6/2011 | Furusho | |
| 8,473,527 B2 * | 6/2013 | Jentsch | G06F 17/30292 707/803 |
| 8,627,199 B1 | 1/2014 | Handley et al. | |
| 8,726,236 B2 | 5/2014 | Coldicott et al. | |
| 8,745,483 B2 | 6/2014 | Chavoustie et al. | |
| 8,775,433 B2 * | 7/2014 | Green | G06F 17/2264 707/741 |
| 8,776,047 B2 | 7/2014 | Wookey | |
| 8,799,859 B2 | 8/2014 | Wehrwein | |
| 2002/0184231 A1 * | 12/2002 | Baskins | G06F 17/30961 |
| 2007/0006119 A1 | 1/2007 | Price | |
| 2008/0016026 A1 | 1/2008 | Farber et al. | |
| 2009/0106298 A1 | 4/2009 | Furusho | |
| 2010/0211618 A1 * | 8/2010 | Anderson | G06F 17/30548 707/812 |
| 2011/0093467 A1 * | 4/2011 | Sharp | G06F 17/2264 707/741 |
| 2011/0320498 A1 * | 12/2011 | Flor | G06F 17/30017 707/797 |
| 2012/0072656 A1 * | 3/2012 | Archak | G06F 17/30132 711/104 |
| 2013/0262832 A1 | 10/2013 | Chen et al. | |

FOREIGN PATENT DOCUMENTS

CN 103020075 4/2013

* cited by examiner

*Primary Examiner* — Shiow-Jy Fan
(74) *Attorney, Agent, or Firm* — Fish & Richardson P.C.

(57) ABSTRACT

Methods, systems, and apparatus, including computer programs encoded on computer storage media, for using tiered arrays to represent aggregated software dependencies. One of the methods includes receiving a request to generate a range of contiguous indexes having non-default values represented by a tiered array having a plurality of tiers, wherein each non-default element of each tier is a reference to a catalog at a lower tier except for a bottom-most tier of the tiered array that stores non-default values, wherein the request specifies a start index. After descending one or more tiers in the tiered array to identify a first index that (i) is greater than or equal to the start index and (ii) has a non-default value, a system ascends one or more tiers in the tiered array and subsequently descends again to identify a second index that is a last index in a contiguous sequence of indexes having non-default values from the first index up to and including the second index.

27 Claims, 37 Drawing Sheets

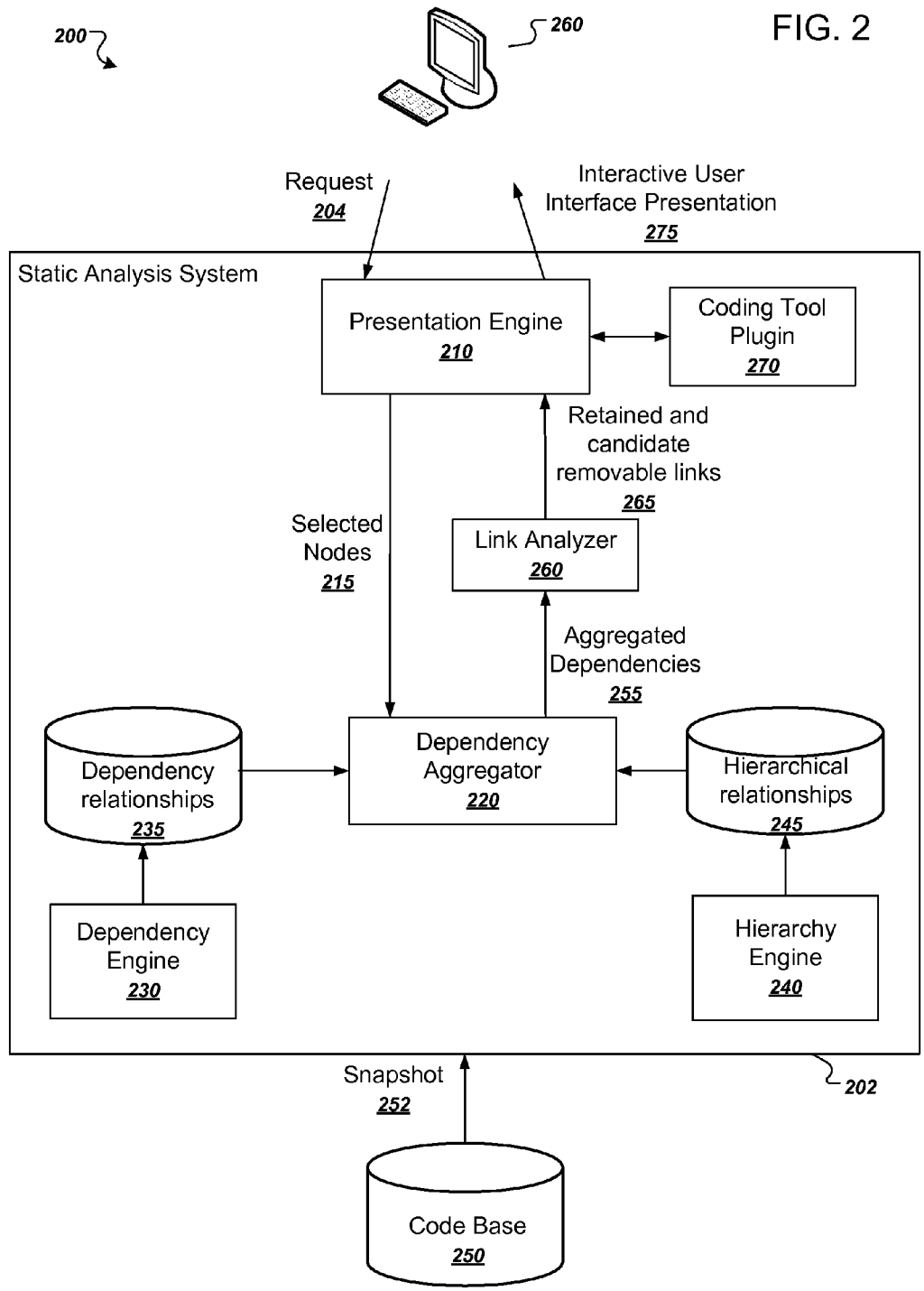

Explorer

- ▼ 📁 Users
  - ▼ 📁 tmp
    - ▼ 📁 even-or-odd
      - ▲ 📄 even.c
      - ▲ 📄 even.h
      - ▲ 📄 main.c
      - ▲ 📄 odd.c
      - ▲ 📄 odd.h
- ▲ 📁 usr

Architecture | Dependency | Tangle | Focus | Cycle | Cycle Clustering | Source Code

📄 *even.c* /Users/tmp/even-or-odd/even.c

```
1  #include <stdio.h>
2  #include "odd.h"
3
4  int even (int x) {
5      if (x == 0)
6          return 1;
7      if (x > 0)
8          return odd(x-1);
9      else
10         return odd(x+1);  ← 642
11
12 }
13
```

← 640

Dependency Details | Aggregated Dependency Details | Explanation | Rules even.c depends on odd.c:

| Dependency origin | Line no. | Dependency target |
|---|---|---|
| ○ definition of even(int x) | 10 | ○ definition of odd(int x) |
| ○ definition of even(int x) | 8 | ○ definition of odd(int x) |

↑ 630

FIG. 6G b0 > a1
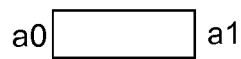
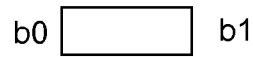
FIG. 11B
b1 <=a1
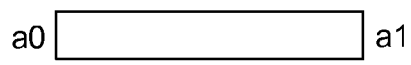
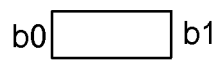
FIG. 11C
b1 > a1
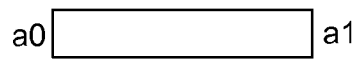
FIG. 11D a1 < b0
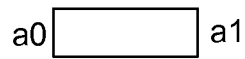
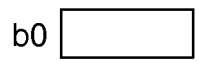
FIG. 12B
b1 <=a1
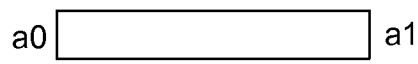
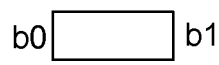
FIG. 12C
b1 > a1
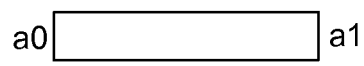
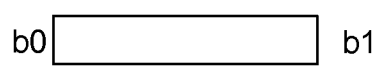
FIG. 12D

TIERED ARRAYS

CROSS REFERENCE TO RELATED APPLICATIONS

This application claims the benefit under 35 U.S.C. §119 (e) of the filing date of U.S. Provisional Patent Application No. 62/234,939, filed on Sep. 30, 2015, entitled "Hierarchical Dependency Analysis of Source Code," the entirety of which is herein incorporated by reference.

BACKGROUND

This specification relates to static analysis of computer software source code.

Static analysis refers to techniques for analyzing computer software source code without executing the source code as a computer software program.

Source code is typically maintained by developers in a code base, which may be referred to as a project. Developers can maintain the source code of the project using a version control system. Version control systems generally maintain multiple revisions of the source code in the code base, each revision being referred to as a snapshot. Each snapshot includes the source code of files of the code base as the files existed at a particular point in time.

Cyclic dependencies are a common problem in large code bases. A cyclic dependency occurs, for example, when a first software package depends on a second software package, the second software package depends on a third software package, and the third software package depends on the first software package. Cyclic dependencies make code bases harder to maintain because a change to any one software package in the cycle can require changes to each and every other software package in the cycle.

Dependencies in source code can be represented as a directed graph. However, as code bases become larger and larger, visualizations of the raw dependencies between source code elements, which can number many millions in large code bases, tend to be less useful.

SUMMARY

This specification describes how a static analysis system can generate aggregated dependencies among software elements in a code base. The system can use the aggregated dependencies to generate interactive user interface presentations for visualizing the structure and cyclic dependencies in a code base.

Particular embodiments of the subject matter described in this specification can be implemented so as to realize one or more of the following advantages. Users can gain an intuitive understanding of the structure and function of a complex software system by browsing interactive visualizations of an aggregated dependency graph. The interactive visualizations allow users to interactively explore complex software systems. The interactive visualizations help users to identify the causes of unnecessary complexity in software systems, and to develop solutions for reducing that complexity. The intuitive interactive visualizations can be integrated into existing coding tools to provide immediate and intuitive guidance on the design of a complex software system as the system is being built. The aggregated dependency information provides users with an intuitive sense for how hard it would be to remove or rearrange certain dependencies from the code base. The computation of aggregated dependencies allows users to create model architectures with associated rules that help developers modify a code base toward the model architecture.

A static analysis system can provide highly customizable definitions of dependencies by using queries to define the dependencies. Using queries to define dependencies provides a natural mechanism for rich dependency categorization. In addition, using queries is typically faster and clearer than specifying dependencies using a general purpose programming language. Furthermore, using queries makes the system easier to update or extend to support new language features. The rich categorization of dependencies can be used in an interactive presentation of aggregated dependencies. For example, different categories of dependencies can be visually distinguished in the presentation. Furthermore, some categories of queries can be turned on or off. A dependency analysis query can operate over a full program database, which can contain the entire program. Thus it is possible to perform global dependency analysis.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example system.

FIGS. 6A-6L illustrate example user interface presentations of aggregated dependency graphs.

FIG. 11B illustrates ranges of indexes when $a0<b0$ and $b0>a1+1$.

FIG. 11C illustrates ranges of indexes when $a0<b0$ and $b1<=a1$.

FIG. 11D illustrates ranges of indexes when $a0<=b0$, $a1>=b0$.

FIG. 12B illustrates ranges of indexes when a1<b0.

FIG. 12C illustrates ranges of indexes when a0<b0 and b1<=a1.

FIG. 12D illustrates ranges of indexes when a0<b0 and b1>a1.

Like reference numbers and designations in the various drawings indicate like elements.

DETAILED DESCRIPTION

This specification describes static analysis techniques for generating visualizations of aggregated dependencies between software elements in a project. Large code bases can include millions of software elements and millions of corresponding dependencies between software elements. Therefore, it is often impractical for a static analysis system to present visualizations of raw dependencies in the code base.

Instead, a static analysis system can aggregate dependencies between software elements and present visualizations of the aggregated dependencies. An aggregated dependency between software elements merges information from two different types of relationships between software elements: (1) dependency relationships and (2) hierarchical relationships. The visualizations of the aggregated dependencies assist a user in understanding the structure of the code base without overwhelming the user with raw dependency information.

In this specification, the term "software element" refers broadly to any discrete part of a software system. A software element may be a source code element, e.g., a variable, function, class, or type. Software elements may also be build system elements, including files, directories, libraries, and packages. The definition of what software elements exist in a project is flexible. The software elements that are defined to exist in a project can thus vary according to different programming languages, different build systems, and different user-supplied definitions of software elements.

Figure 1A:
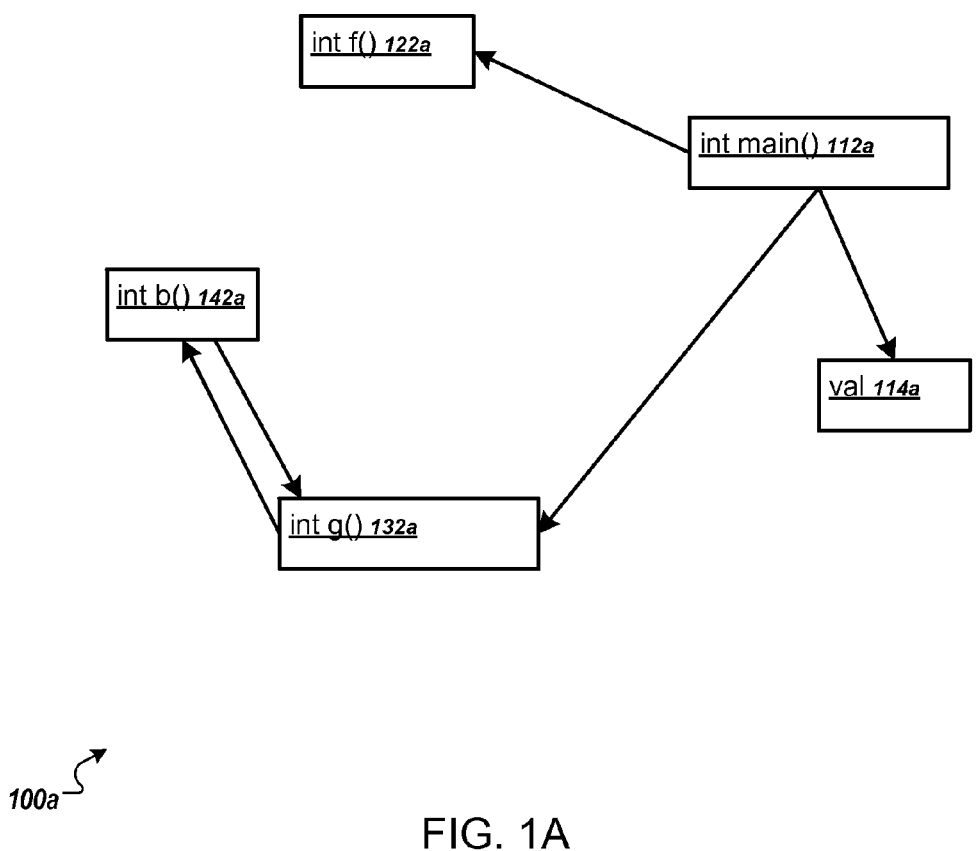
FIG. 1A illustrates an example dependency graph

FIG. 1A illustrates an example dependency graph 100a. The dependency graph 100a represents dependency relationships in a highly simplified example project. Even in this highly simplified example, the dependency graph 100a can appear quite complex.

The example project includes the following source code files, main.c, f.h, f.c, g.h, g.c, a.h, and a.c.

The main.c source code file includes the following source code:
include f.h
include g.h
const int val=2;
int main( ) {
int y=g(val)+f(1)
printf(y)
}

The f.h source code file includes the following source code:
int f(int z);
The f.c source code file includes the following source code:
int f(int z) {
return z+1
}

The g.h source code file includes the following source code:
int g(int a);
The g.c source code file includes the following source code:
int g(int a) {
return b(a)+1
}

The a.h source code file includes the following source code:
int b(int e);
The a.c source code file includes the following source code:
include g.h
int b(e) {
return g(e)+1
}

A dependency relationship, or for brevity, a "dependency" or a "software dependency" represents a functional relationship between two software elements. A dependency can be described as representing that one software element depends on another software element. Thus, a software element A can be considered to depend on a software element B when the software element A functions as intended only if the software element B is also available. For example, a source code file may not compile correctly if a header included by the source code file is not available.

In FIG. 1A, for example, an "int main( )" node 112a that represents the function "main( )" in main.c depends on a "val" node 114a that represents the variable "val" in main.c.

The "int main( )" node 112a also depends on an "int f( )" node 122a representing the function "int f( )" that is called from the function "int main( )." The "int main( )" node 112a also depends on an "int g( )" node 132a representing the function "int g( )" called from the function "int main( )" in main.c.

The "int g( )" node 132a depends on an "int b( )" node 142a that represents the function "int b( )" called from the function "int g( )." Similarly, The "int b( )" node 142a depends on an "int g( )" node 132a that represents the function "int g( )" called from the function "int b( )."

The definition of which software elements depend on which other software elements is flexible. The dependency relationships in a project can thus vary according to different programming languages, different build systems, and different user-supplied definitions of dependencies. For example, some programming languages are interpreted rather than compiled. Thus, dependences in interpreted programming languages represent run-time dependencies rather than compile-time dependencies.

The dependency relationships may be collectively referred to as a raw dependency graph. The term "raw dependency graph" is intended to distinguish the dependency relationships from aggregated dependencies, which may be collectively referred to or visualized as an aggregated dependency graph. The raw dependency graph and the aggregated dependency graph are both directed graphs that can include cycles.

Figure 1B:
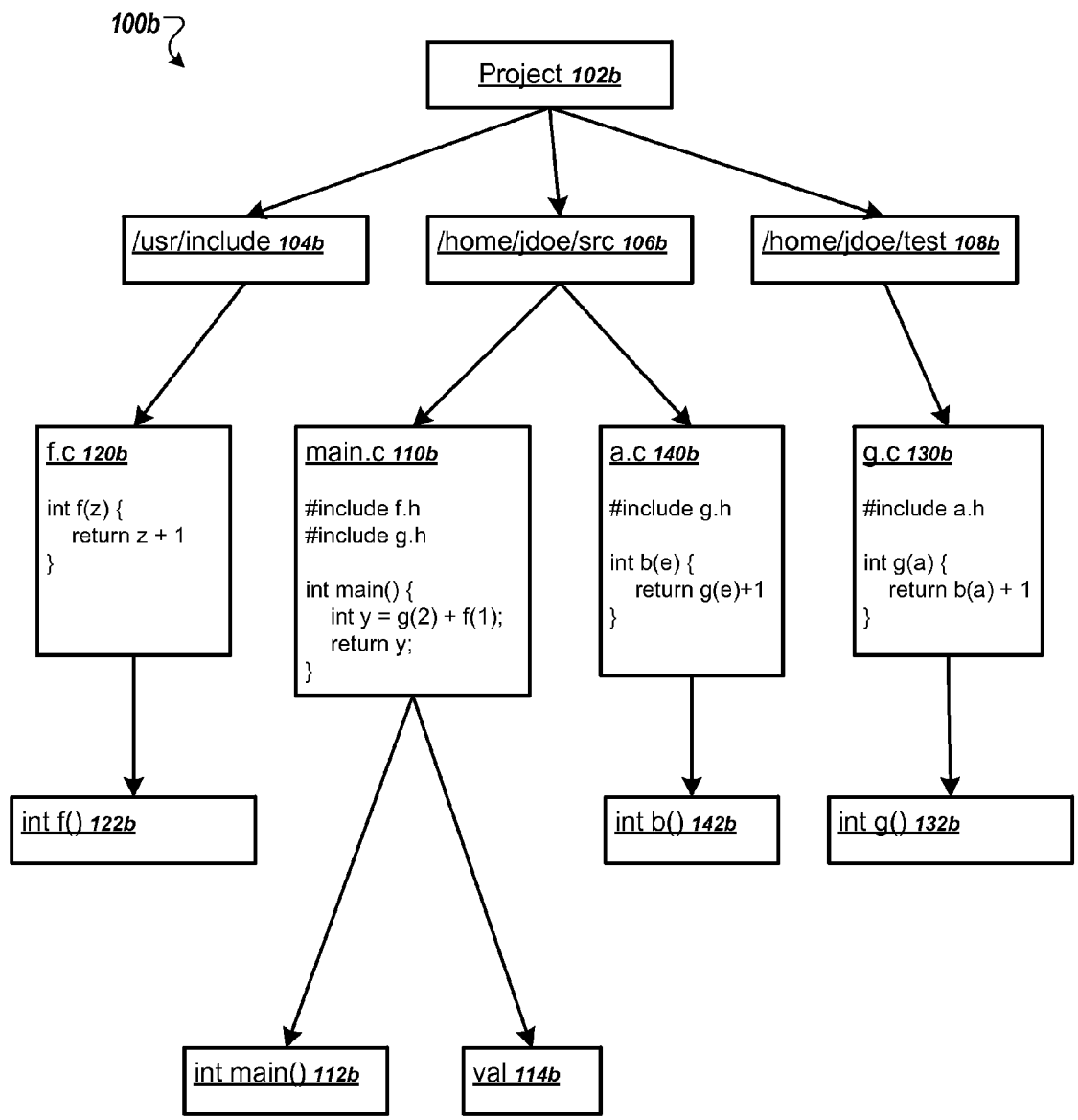
FIG. 1B illustrates an example hierarchy graph.

FIG. 1B illustrates an example hierarchy graph 100b. The hierarchy graph 100b represents hierarchical relationships in the example project of FIG. 1A.

A hierarchical relationship typically represents a containment relationship between software elements. For example, a hierarchical relationship can represent that a variable is contained in a function, that a function is contained in a class, that a class is contained in a file, that the file is contained in a directory, and that a directory is contained in the project, to name just a few examples. Each hierarchical relationship defines a parent element and a child element. Thus, a software element A is a parent element of a software element B when the software element B is contained in the software element A. Likewise, the software element B is a child element of software element A when the software element B is contained in the software element A.

In FIG. 1B, for example, an "int f( )" node 122b is a child element of the "f.c" node 120b because the definition of the function "f( )" is contained in the file f.c. Similarly, the "y" node 114b is a child element of the "int main( )" node 112b, which is a child element of the "main.c" node 110b. The "int g( )" node 132b, is a child element of the "g.c" node 130b. And the "int b( )" node 142b is a child element of the "a.c" node 140b. For simplicity, the header files of the example project are not illustrated in the example hierarchy graph 100b.

The hierarchy graph 100b also includes software element nodes representing file system constructs. For example, a "/usr/include" node 104b represents the directory "/usr/include," a "/home/jdoe/src" node 106b represents the directory "/home/jdoe/src," and a "/home/jdoe/test" node 108b represents the directory "/home/jdoe/test." A root node of the hierarchy, project node 102b, represents the entire example project.

Thus, the "f.c" node 120b is a child element of the "/usr/include" node 104b because the source code file f.h is contained in the directory "/usr/include." Similarly, the "main.c" node 110b and the "a.h" node 140b are child elements of the "/home/jdoe/src" node 106b because the source code files main.c and a.h are contained in the directory "/home/jdoe/src." And the "g.h" node 130b is a child element of the "/home/jdoe/test" node 108b because the source code file g.h is contained in the directory "/home/jdoe/test." The three directory nodes 104b, 106b, and 108b, are child elements of the project node 102b because the directories are contained in the project.

Although hierarchical relationships generally represent containment, the definition of the hierarchy is flexible. The definition of the hierarchy can vary according to different programming languages, different build systems, and different user-supplied definitions, which can correspond to business units, geographic locations, security policies, or areas of responsibility. In addition, in some implementations the hierarchy can also be interactively manipulated by a user.

The hierarchical relationships may be collectively referred to or visualized as a hierarchy graph, or for brevity, a hierarchy. When represented as a graph, each node of the hierarchy represents a software element and each software element has a link with one or more other software elements. The links in the hierarchy can be directed links that represent parent or child relationships. The hierarchy may have one type of link representing a parent relationship or a child relationship, or alternatively, the hierarchy may have two types of links representing parent and child relationships respectively.

Typically, the hierarchy includes a superset of the nodes that are in the raw dependency graph. In other words, the hierarchy includes all software elements represented by the dependency graph in addition to other software elements. For example, the hierarchy 100b has nodes that represent all of the software elements represented by the nodes in the raw dependency graph 100a. This is because the hierarchy represents containment relationships while the dependency graph represents functional relationships. Thus, even software elements that are not functionally related to any other software elements will still be included in the hierarchy.

The hierarchy can often be represented as a tree with a root node representing the project. However, a tree structure is not necessary. In other words, the hierarchy can be represented by any appropriate acyclic, directed graph that defines parent and child relationships between nodes. Some hierarchies may have multiple root nodes representing multiple projects being analyzed, and some nodes in the hierarchy may be reachable by multiple paths in the hierarchy.

Figure 1C:
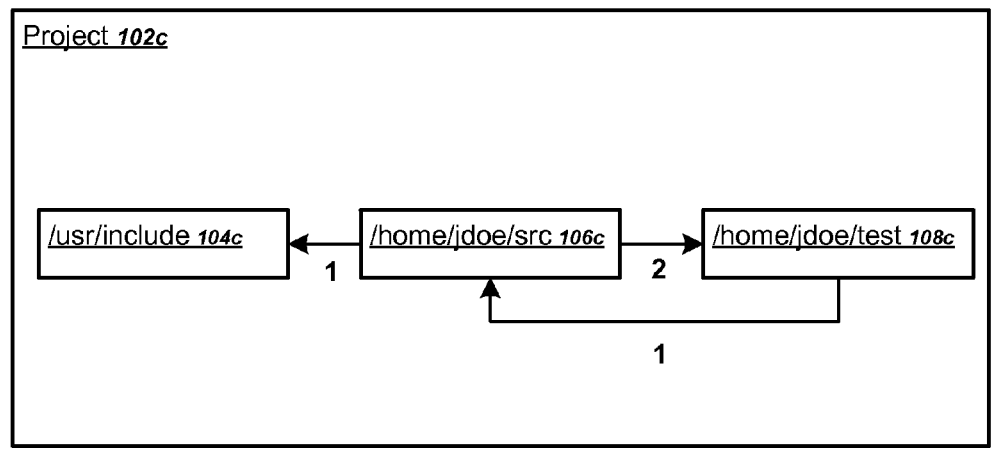
FIG. 1C illustrates an aggregated dependency graph.

FIG. 1C illustrates an aggregated dependency graph 100c. From the dependency relationships and the hierarchical relationships, a system can generate aggregated dependency relationships, or for brevity, aggregated dependencies. In general, an aggregated dependency exists between a software element A and a software element B when the software element A, or any descendent in the hierarchy of the software element A, has a dependency relationship with the software element B or with any descendent in hierarchy of the software element B.

In this specification, the set of all dependencies inbound to a node of the hierarchy and inbound to any descendant of the node in the hierarchy will be referred to as a set of aggregated inbound dependencies. In other words, the set of aggregated inbound dependencies is a set union of dependencies inbound to the node and dependencies inbound to any descendant of the node in the hierarchy.

Conversely, the set of all dependencies outbound from a node of the hierarchy and dependencies outbound from any descendant of the node in the hierarchy will be referred to as a set of aggregated outbound dependencies. The set of aggregated outbound dependencies is a set union of dependencies outbound from the node and dependencies outbound from any descendant of the node in the hierarchy.

An aggregated dependency thus represents a non-empty intersection between a set of aggregated inbound dependencies and a set of aggregated outbound dependencies.

Typically, dependency relationships represent a single raw dependency graph for the snapshot. Likewise, hierarchical relationships represent a single hierarchy for the snapshot. In contrast, a vast number of aggregated dependency graphs are possible for a snapshot depending on which dependencies are aggregated.

In FIG. 1C, for example, the project node 102c and three directory nodes 104c, 106c, and 108c have been chosen for dependency aggregation. In the resulting aggregated dependency graph, the project node 102c is illustrated as containing the three directory nodes 104c, 106c, and 108c.

Each aggregated dependency link between the nodes in the graph 100c is displayed with a count that represents a number of dependencies that contributed to the aggregated dependency. For example, the "/home/jdoe/src" node 106c has one dependency on the "/usr/include" node 104c because the file main.c in "home/jdoe/src" called one function defined in the file f.c located in the directory "/usr/include." The "/home/jdoe/src" node 106c has two dependencies on "/home/jdoe/test" node 108c because main.c and a.c called two functions that were defined by files in that directory. The link from the "/home/jdoe/src" node 106c to the "/home/jdoe/test" node 108c may be somewhat surprising to a developer or a system architect. This is because it is difficult to see the relationship between those directory from looking at the source code alone or even a raw dependency graph. In addition, it is immediately clear, even at a very high level of inspection, that the project includes a cyclic dependency. In particular, a cyclic dependency exists between the "/home/jdoe/src" node 106c and the "/home/jdoe/test" node 108c. The reason that this cyclic dependency arises may not be clear from browsing the source code itself or complexity of the raw dependency graph 100a. In fact, it arose because functions defined in "home/jdoe/src" call a function defined in "/home/jdoe/test," which itself calls a function defined in "/home/j doe/src."

The counts associated with the links also provide an intuitive indication of how intertwined the software elements are. For example, it is immediately clear that breaking the cyclic dependency in the graph 100c is probably easier, from a source code development perspective, to remove the link with the count of one rather than the link with the count of two.

Thus, computing aggregated dependencies allows a user to explore the structure of the source code in an intuitive way and to intuitively uncover dependencies and potential problems with the design of the code.

FIG. 2 illustrates an example system 200. The system 200 includes a user device 260 in communication with a static analysis system 202. The static analysis system 202 includes several functional components, including a presentation engine 210, a dependency aggregator 220, a dependency engine 230, a hierarchy engine 240, a link analyzer 260, and a coding tool plugin 270. Each of these components of the static analysis system 202 can be implemented as computer programs installed on one or more computers in one or more locations that are coupled to each other through a network.

A user of user device 260 can communicate with the static analysis system 202 to browse an interactive user interface presentation of aggregated dependencies between source code elements in the code base 250. Typically only one snapshot 252, or a portion thereof, of the code base 250 is analyzed at a time.

The user device 260 can communicate with the static analysis system 202 over a network, which can be any appropriate communications network, e.g., an intranet or the Internet, or some combination thereof. Alternatively, the static analysis system 202 can be installed in whole or in part on the user device 260.

For example, a user of user device 260 can provide a request 204 that specifies a portion of the snapshot 252 to be analyzed. The request 204 can be generated by an application installed on the user device 260. The application can be a dedicated coding tool or a light-weight client, e.g., a web browser.

Coding tools include any appropriate application that facilitates selection, by a user, of a subset of source code files in the code base 250 that should be analyzed by the system. The static analysis system 202 can use a coding tool plugin 270 to integrate the analysis of source code with a particular coding tool. The coding tool plugin 270 is a software application or module that extends the capabilities of a coding tool by allowing the selection of source code elements and the presentation of analysis results generated by the static analysis system 202 to be integrated into the coding tool. The implementation of the coding tool plugin 270 will depend on the particular coding tool being extended. For simplicity, only one coding tool plugin 270 is shown. However, the system 202 may include multiple coding tool plugins to support a variety of coding tools A presentation engine 210 receives the request 204 and identifies one or more selected nodes 215 that correspond to the request 204. The presentation engine 210 may use the coding tool plugin 270 to identify the selected nodes 215 from a request 204 generated by a coding tool.

For example, the coding tool can be an integrated development environment (IDE). An IDE is an application, or a suite of applications, that facilitates developing source code on a single user device through a graphical user interface. An IDE usually has applications including a source code editor, a compiler, and a debugger. IDEs often also have a file browser as well as object and class browsers. An IDE can use the coding tool plugin 270 to allow the user to select, through the IDE interface, a portion of the code base 250 for analysis. The IDE can then generate the request 204. The coding tool plugin 270 can then automatically identify selected nodes 215 corresponding to software elements for which the aggregated dependencies 255 should be generated. The IDE can also use the coding tool plugin 270 to present the interactive presentation 275 of the aggregated dependencies within the IDE interface.

As another example, the coding tool can be a code review tool. A code review tool is a software application, or suite of software applications, that developers can use to facilitate review of source code files that are the subject of previous or proposed commits or changes to the source code base 250. Thus, a code review tool can use the coding tool plugin 270 to allow a user to select, within an interface of the code review tool, a number of source code files that are part of a proposed commit to the code base 250. The coding tool plugin 270 can then automatically identify selected nodes 215 corresponding to the software elements for which the aggregated dependencies 255 should be generated. The coding tool plugin 270 can then present the interactive presentation 275 of the aggregated dependencies within the code review tool interface.

The dependency aggregator 220 receives the selected nodes 215 and computes aggregated dependencies 255 for the selected nodes 215 using dependency relationships 235 and hierarchical relationships 245.

A dependency engine 230 analyzes code of the snapshot 252 and applies one or more dependency criteria to the code of the snapshot 252 to generate the dependency relationships 235. The dependency engine 230 typically generates the dependency relationships 235 before the request 204 is received.

A hierarchy engine 240 analyzes code of the snapshot 252 as well as the structure of a build system used to build the snapshot to generate the hierarchical relationships 245 using one or more hierarchy criteria. The hierarchy engine 240 also typically generates the hierarchical relationships 245 before the request 204 is received.

Both the dependency criteria used to generate the dependency relationships 235 and the hierarchical criteria used to generate the hierarchical relationships 245 can include language-specific, project-specific, and other user-defined criteria.

Unlike the dependency relationships 235 and the hierarchical relationships 245, the aggregated dependencies 255 are typically computed in real-time. This is due to the vast number of possible software elements and the vast number of possible aggregated dependencies between those software elements making it infeasible in time and storage space to generate every possible aggregated dependency before the request is received. In other words, the dependency aggregator 220 computes the aggregated dependencies 255 after the system 202 receives the request 204 and after receiving the identification of the selected nodes 215.

The dependency aggregator 220 provides the aggregated dependencies 255 to a link analyzer 260. The link analyzer 260 processes the aggregated dependencies 255 to identify candidate removable links. Candidate removable links are suggestions for how the project can be improved. Candidate removable links can be identified due to links violating one or more explicit or implicit rules for how aggregated dependencies among software elements in the project should be arranged. In reality, a candidate removable link cannot simply be removed without incurring consequences to the project. For example, developers will typically need to modify one or more source code files in order to remove a link from the aggregated dependency graph.

One example of an implicit rule that is almost universal in all software development is that cyclic dependencies are undesirable. Thus, the system can identify cycles in the graph and suggest, by providing candidate removable links, ways that the cycles can be removed from the graph with minimal impact to the project. The link analyzer 260 thus classifies links in the aggregated dependencies as retained links or candidate removable links. Classifying links as retained links or candidate removable links is described in more detail below with reference to FIG. 5. The link analyzer then provides the retained and candidate removable links 265 to the presentation engine 210.

The presentation engine 210 generates an interactive user interface presentation 275 having the retained and candidate removable links 265. The interactive user interface presentation 275 displays aggregated dependencies 255 for the portion of the snapshot 252 identified by the request 204. The presentation engine 210 then provides the interactive user interface presentation 275 back to the user device 260 for presentation to the user, possible by using the coding tool plugin 270. Example interactive user interface presentations that make use of retained and candidate removable links are described in more detail below with reference to FIGS. 6A-6F.

Figure 3:
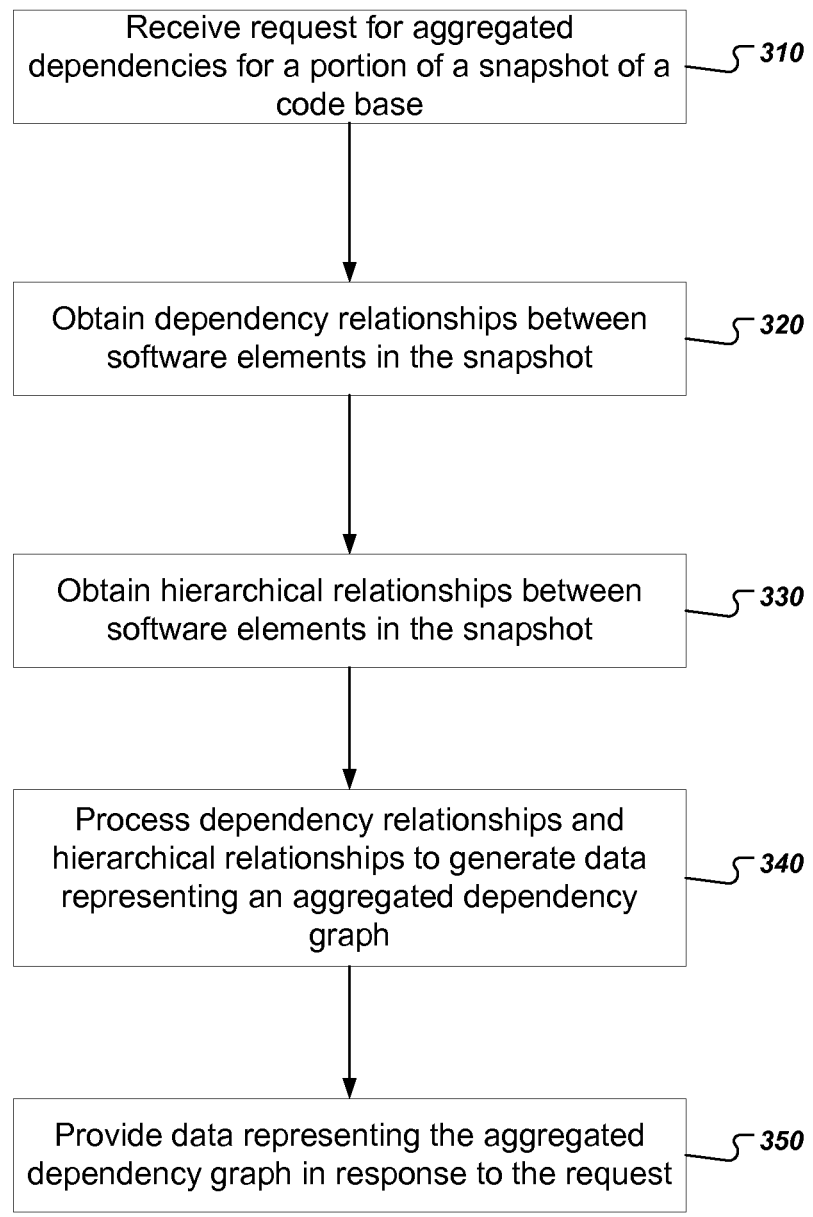
FIG. 3 is a flow chart of an example process for generating aggregated dependencies.

FIG. 3 is a flow chart of an example process for generating aggregated dependencies. A system can use dependency relationships and hierarchical relationships to generate aggregated dependencies for a selected portion of a snapshot. The process will be described as being performed by an appropriately programmed system of one or more computers, e.g., the static analysis system 202 of FIG. 2.

The system receives a request for aggregated dependencies for a portion of a snapshot of a code base (310). The request can for example specify one or more software elements of the snapshot for which aggregated dependencies should be generated.

For example, the user can view an interactive presentation of an aggregated dependency graph. Example interactive presentations of the aggregated dependency graph are described in more detail below with reference to FIGS. 6A-6F.

The system obtains dependency relationships between software elements in the snapshot of the code base (320). The system can represent each distinct software element in the snapshot with a unique ID. The system can also maintain metadata for each distinct software element in a metadata table or other form of data storage. The metadata for a software element can include location information, for example, a location in a file of the software element, a location of the file in a file system, or both.

The system can represent a dependency relationship with a pair of software element IDs. A first software element of the pair, which is referred to as the source element, represents a software element that depends on a second software element of the pair, which is referred to as the target element. Because of the directional nature of the dependency relationships, two software elements can depend on each other, in which case two dependency relationships would exist between the two software elements.

The system can store the dependency relationships as a two-column table. The first column represents the software element ID of the source element, and the second column represents the software element ID of the target element. The system can then use the row number of the table to uniquely identify each dependency relationship.

The system obtains hierarchical relationships between software elements in the snapshot of the code base (330). The system can represent a hierarchical relationship with a pair of software element IDs. A first software element of the pair, which can be referred to as the parent element, represents a software element that is a parent in a hierarchy of a second software element of the pair, which can be referred to as the child element.

The system can likewise store the hierarchical relationships in a two-column table. The first column represents the software element ID of the parent element, and the second column represents the software element ID of the child element. The system can then use the row number of table to uniquely identify each hierarchical relationship.

The system can define a number of different hierarchical relationships in order to generate the hierarchy graph. For example, instead of using files and directories as the nodes of the hierarchy, the system could use namespaces to define the hierarchy. Then, if different classes were defined in different files but were in the same namespace, nodes representing the classes would share a parent in the hierarchy.

The system processes the dependency relationships and the hierarchical relationships to generate data representing an aggregated dependency graph (340). For each pair of selected nodes representing software elements, the system can determine whether a first software element of the pair or any of its descendants depends on a second software element of the pair or any of its descendants. If so, the system generates a link representing the aggregated dependency between the nodes representing the first and second software elements.

Computing the aggregated dependencies from the dependency relationships and the hierarchical relationships will be described in more detail below with reference to FIG. 4.

The system provides the data representing the aggregated dependency graph in response to the request (350). For example, the system can generate a presentation that illustrates the aggregated dependency graph. The system can also generate any appropriate representation of the graph for consumption by another software tool.

Figure 4:
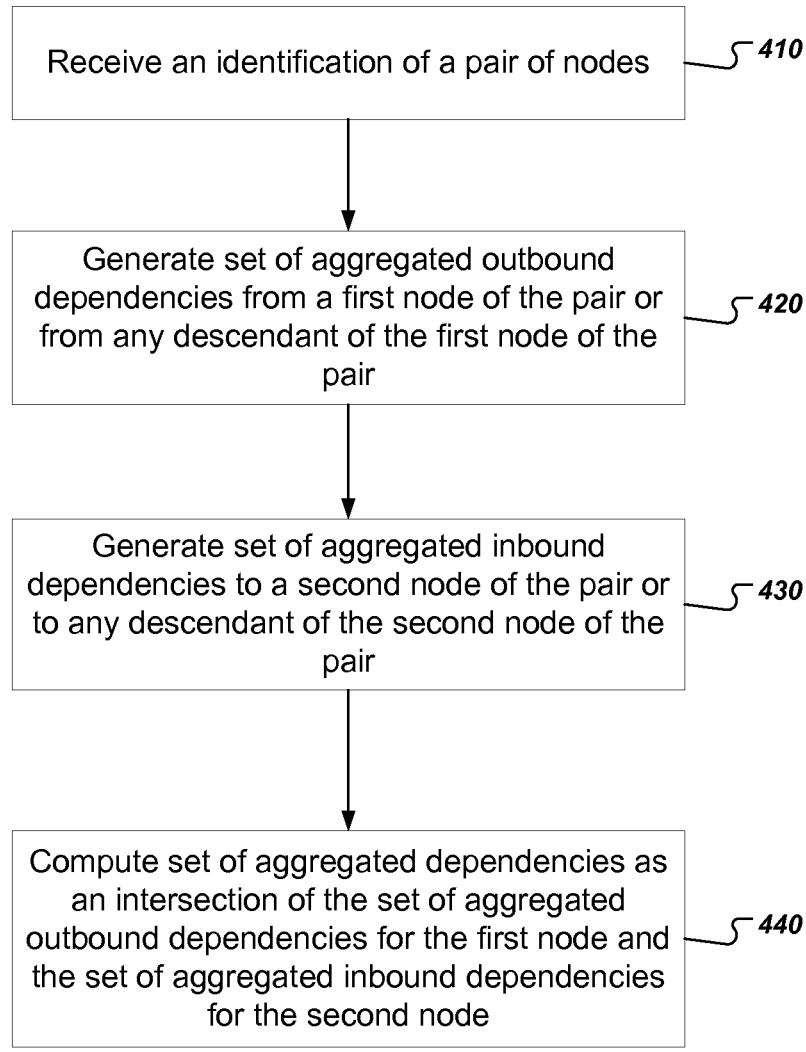
FIG. 4 is a flow chart of an example process for computing aggregated dependencies between a pair of nodes.

FIG. 4 is a flow chart of an example process for computing aggregated dependencies between a pair of nodes in the hierarchy. The process will be described as being performed by an appropriately programmed system of one or more computers, e.g., the dependency aggregator 220 of FIG. 1.

The system receives an identification of a pair of nodes (410). Each node represents a software element in the hierarchy. For example, a user can provide a selection of one or more nodes of a portion of an aggregated dependency graph.

The system generates a set of aggregated outbound dependencies, which is a set union of dependencies outbound from a first node of the pair and dependencies outbound from any descendants of the first node in the hierarchy (420). As described above, each dependency relationship in the snapshot has a unique ID. Thus, the system can generate a set of aggregated outbound dependencies as a set of all dependency IDs in which the first node or any descendant of the first node in the hierarchy occurs as a source element.

The system generates a set of aggregated inbound dependencies, which is a set union of dependencies inbound to a second node of the pair and dependencies inbound to any descendants of the second node in the hierarchy (430). Similarly, the system the system can generate a set of aggregated inbound dependencies as a set of dependency IDs in which the second node or any descendant of the second node in the hierarchy occurs as a target element.

The system computes a set of aggregated dependencies as an intersection of the aggregated outbound dependencies for the first node and the aggregated inbound dependencies for the second node (440). If the intersection is not empty, the system generates an aggregated dependency link from the first node to the second node. The system can repeat the process in reverse for determining whether an aggregated dependency link exists from the second node to the first node.

Techniques for representing the sets of aggregated inbound dependencies and aggregated outbound dependencies and for quickly computing the intersection of the sets using these representations are described in more detail below.

Figure 5:
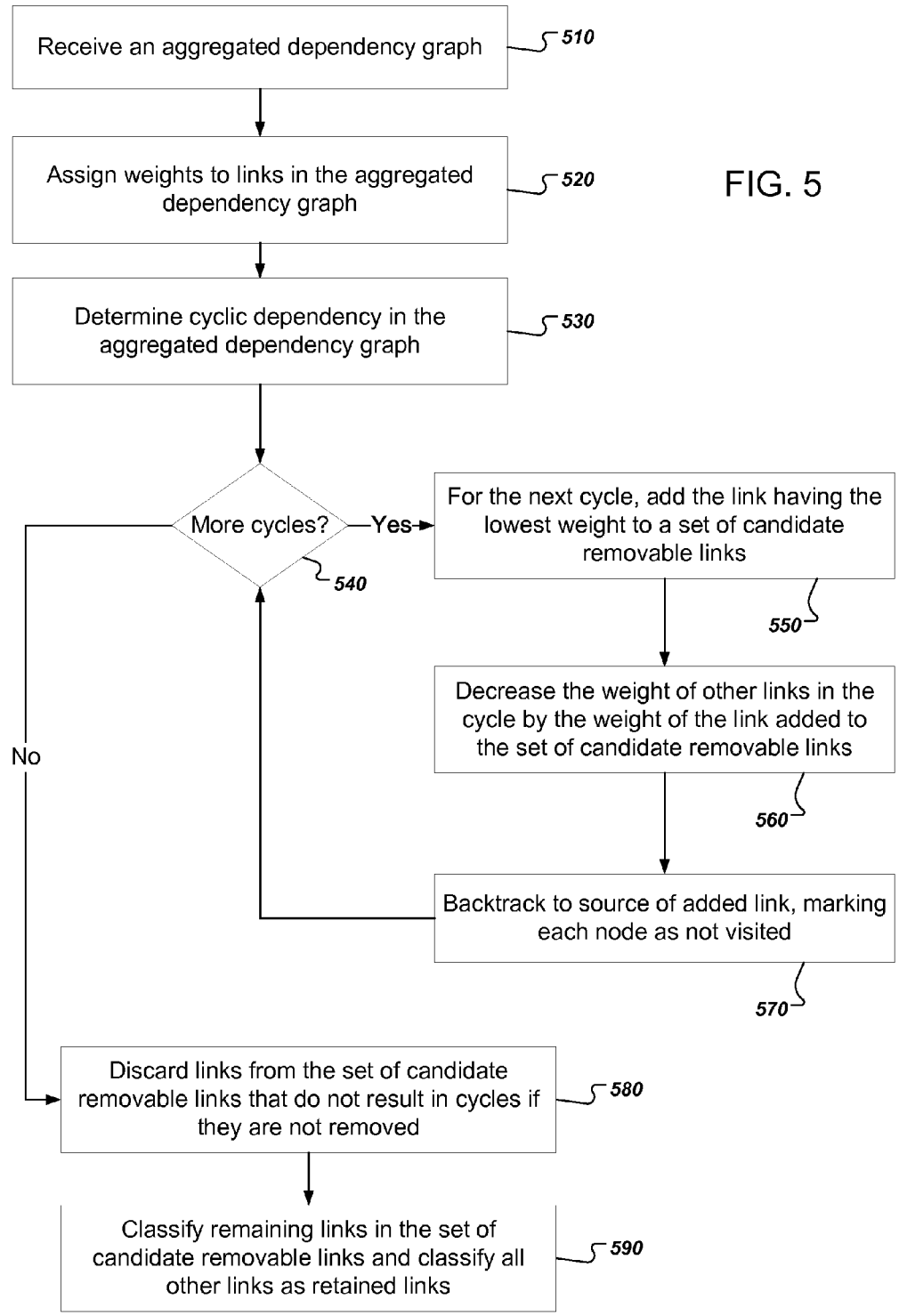
FIG. 5 is a flow chart of an example process for identifying candidate removable links.

FIG. 5 is a flow chart of an example process for identifying candidate removable links due to cycles. The system can analyze links in an aggregated dependency graph to identify cyclic dependencies. Cyclic dependencies are usually a problem for software projects because they represent a breakdown in modularity and thus introduce problems in maintainability. For example, if a file A depends on a file B, and the file B depends on a file C, and the file C depends on the file A, a cyclic dependency exists. Therefore, any changes made to file A may also require changes to file B and also file C to avoid breaking the build. The example process can automatically suggest, e.g., to a software architect, how to address such cyclic dependencies in a code base. The process will be described as being performed by an appropriately programmed system of one or more computers, e.g., the link analyzer 120 of FIG. 1.

The system receives an aggregated dependency graph (510). As described above, the system can compute the aggregated dependency graph from dependency relationships and hierarchical relationships. The system can compute the aggregated dependency graph in response to a user selection of one or more nodes representing software elements of a code base.

The system assigns weights to links in the aggregated dependency graph (520). Between a first software element and a second software element, the weight of a link represents how significantly the first software element depends on the second software element. The significance of the dependency increases as the number of descendants of the first software element that depend on the second software element or any descendants of the second software element increases.

In some implementations, the system computes a count of dependencies from the first software element and any descendants of the first software element to the second software element or any descendants of the second software element. The system then uses the count to compute the weight for the link between the first software element and the second software element. In some cases, the weight is the count itself.

The system can also use a variety of other factors when computing the weight. For example, the system can consider the type of dependency, as some types of dependencies are easier to remove than others. The system can also consider a measure of how tangled a target of the dependency is with siblings of the target. For example, if A depends on a constant defined in B, and the constant in B is not used at all, then the constant can be moved to A with little difficulty. On the other hand, if the constant is used throughout B, removing the dependency is harder and the system can adjust the weight accordingly. The system can also consider other factors, e.g., cyclomatic complexity of a target of the dependency.

One benefit of using the count of dependencies as the weight is that it provides a user with a very useful and intuitive sense for how hard the link would be to remove. When the weight represents a count of dependencies, the weight intuitively indicates how many software elements need to be changed in order to remove the link.

The system can also compute the weight based on a distance between the first software element and the second software element. The distance can represent how intertwined the two software elements are in terms of their occurrences in the code base. For example, if the first software element and the second software element co-occur infrequently, the distance is likely to be large. But if the first software element and the second software element co-occur frequently, the distance is likely to be small. In this context, distance is inversely proportional to weight because a large distance represents a smaller significance of the dependency between the software elements. Thus, a larger distance will result in a smaller weight.

The system need not compute weights of the links as a separate and subsequent process to that of generating the aggregated dependency graph. Rather, the system can compute the weights of the links as the aggregated dependency graph is being constructed.

In some implementations, the system provides a user interface that allows a user to mark some links as non-candidates for removal. This can be useful, for example, when a portion of the code base is not controlled by the user. Thus, in response to the user designation of links as non-candidates for removal, the system can assign a very high weight or a special value that indicates that the link is not to be classified as removable under any circumstances.

The system determines cyclic dependencies in the aggregated dependency graph (530). A software element A depends transitively on a software element B if a path in the aggregated dependency graph exists from a node representing software element A to a node representing the software element B. A cyclic dependency occurs whenever a particular node transitively depends on itself.

The system can determine cyclic dependencies using any appropriate search procedure. For example, the system can perform a recursive depth-first search, marking nodes as "visited" as they are processed. When the system processes a node that has already been marked as visited, the system can determine that a cyclic dependency exists. When the system determines that a cyclic dependency exists, the system processes links along the cycle to identify a candidate link for removal.

Thus, if there are more cycles to be processed (540), the system processes the next cycle by adding the link along the cycle having the lowest weight to a set of candidate removable links (branch to 550). The set of candidate removable links identifies candidate links that the system can suggest to a user as ways to get rid of cyclic dependencies in the code base.

The system decreases the weight of other links in the cycle by the weight of the link that was added to the set of candidate removable links (560). Decreasing the weight of other links in the cycle can reveal when a heavy link that is part of multiple cycles is more preferable to remove than multiple light links on single cycles. In other words, as each cycle of the heavy link is processed, the heavy link becomes effectively cheaper and cheaper to remove.

The system backtracks to the source of the added link, marking each node as not visited (570). The system has already determined a candidate link for removing the currently detected cycle. However, the system can mark nodes on the cycle as "not visited" so that they will be considered appropriately if they are part of other cycles in the graph.

The system can then continue searching the graph for additional cycles, processing each newly found cycle.

If there are no more cycles to be processed (540), the system discards links from the set of candidate removable links that do not result in cycles if they remain in the graph (branch to 580). Because each cycle is processed separately, it is possible that the set of candidate removable links includes more links than must be removed to remove all cycles in the aggregated dependency graph. For example, after adding a first link to the set of candidate removable links that would break cycle C1, the system may then add a second link to the set of candidate removable links that would break cycle C2 and which would also happen to break cycle C1 as well. Thus, the first link and the second link need not both be in the set of removable links. Rather, the first link can be discarded from the set of removable links so that it will be reclassified as a retained link.

Because the weight of the links approximates the amount of work that would be required to remove the link, the system can discard links in the set of candidate removable links in order of decreasing weight. In other words, the system can iterate over links in the set of candidate removable links from heaviest to lightest, discarding each link from the set that would not reintroduce a cycle, assuming that all other links in the set of candidate removable links were indeed removed.

In some implementations, the system provides a user interface that allows the user to specify an order in which the candidate removable links should be discarded from the set. This can be useful, for example, when parts of the code base represent well-tested or legacy software that the user would rather not modify significantly. Thus, the user can move links from parts of the code base that the user does not want to modify to the top of the list, and the system will first attempt to remove those links from the set of candidate removable links.

The system classifies remaining links in the set of candidate removable links and classifies all other links as retained links (590). In other words, the system classifies links that are not candidates for removal as retained links. The system can then suggest links that are classified as candidate removable links to the user.

To do so, the system can then generate various user-interface presentations that illustrate the aggregated dependency graph arranged according to retained and candidate removable links.

FIGS. 6A-6L illustrate example user interface presentations of aggregated dependency graphs. Each example presentation illustrates a different layout for presenting an aggregated dependency graph according to links classified as candidate removable links and links classified as retained links.

The examples illustrate the structure of a simple example software project "even-or-odd" written in C and which has the following source code files.

First, the project includes a main file, main.c, which has the following source code:
```
#include <stdio.h>
#include "even.h"
int main( ) {
int val;
printf("Enter a number:");
scanf("% d", &val);
if (even(val))
   printf("% d is even\n", val);
else
   printf("% d is odd\n", val);
return 0;
}
```

The "even" function is declared in even.h, which has the following source code:
   int even(int);
The "even" function is defined in even.c, which has the following source code:
```
#include <stdio.h>
#include "odd.h"
int even(int x) {
if (x==0)
   return 1;
if (x>0)
   return odd(x−1);
else
   return odd(x+1);
}
```
The function "even" depends on an "odd" function declared in odd.h, which has the following source code:
   int odd(int);
The function "odd' is defined in odd.c, which has the following source code:
```
#include <stdio.h>
#include "even.h"
int odd(int x) {
if (x==0)
   return 0;
return even(x>0 ? x−1: x+1);
}
```
As shown in the example source code, the function "odd" has one dependency on the function "even" due to calling the function "even" one time, while the function "even" has two dependencies on the function "odd" due to calling the function "odd" twice. Also, because the two functions depend on each other, the aggregated dependency graph will include a cycle. After processing the source code of this project and generating aggregated dependencies, the system can generate a variety of layouts to present this information.

Figure 6A:
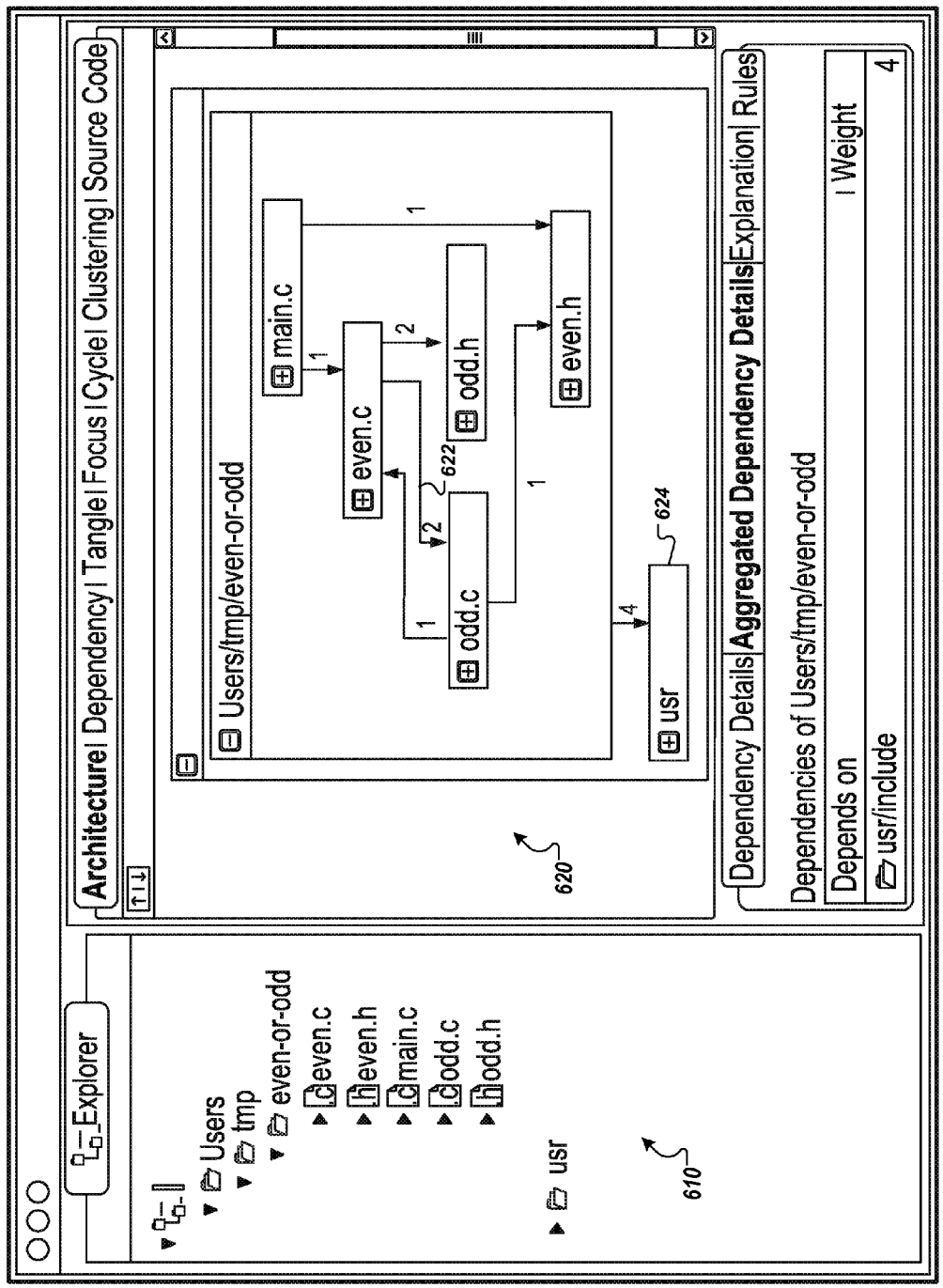

FIG. 6A illustrates a default layout. The default layout illustrates nodes that represent software elements and links that represent aggregated dependencies between the software elements. Each node may have multiple descendant nodes according to the hierarchy graph.

The example presentation includes a hierarchy explorer 610 that allows a user to interactively browse the hierarchy graph. The example presentation also includes an aggregated dependency graph pane 620 that shows nodes from the hierarchy and links representing the aggregated dependencies between them.

Each of the links is presented with an associated count representing the number of dependencies between the corresponding software elements. The link 622, for example, represents that the file even.c has two dependencies on the file odd.c.

In the default layout, all nodes of the hierarchy are selected for presentation. However, the system may cut off some nodes at a particular level of detail in order to comply with space limitations of the aggregated dependency graph pane 620. For example, the illustrated aggregated dependency graph also includes a "usr" node 624 that contains only system software code, as opposed to user code.

A user can also select or filter dependencies by type. In other words, the user can choose different types of dependencies to be shown or hidden from the graph.

Figure 6B:
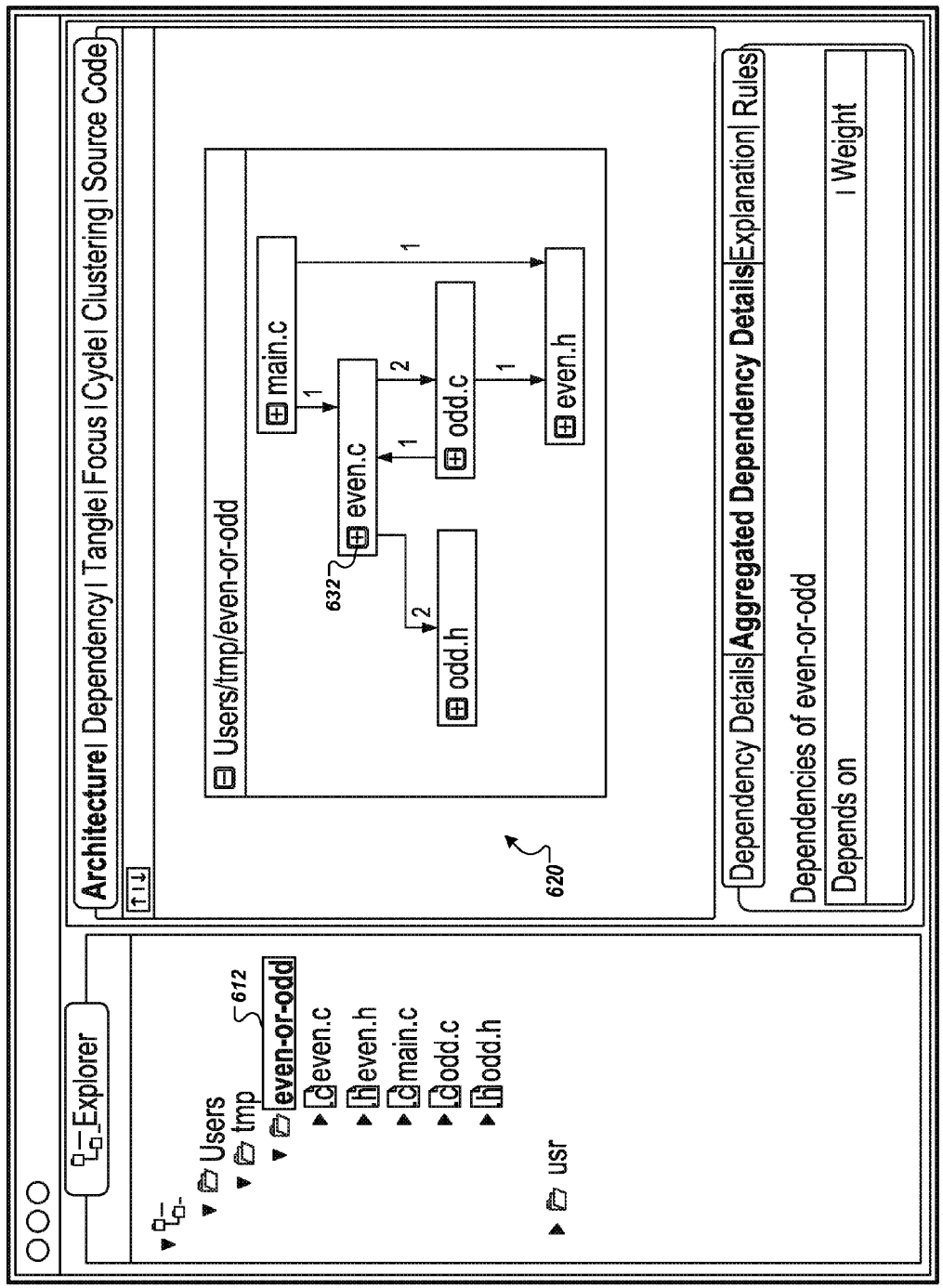

FIG. 6B illustrates selection of a directory node of the hierarchy. A user can select or filter one or more nodes in the presentation to view additional nodes and their aggregated dependencies. For example, in FIG. 6B a user has selected the directory node 612 of the hierarchy corresponding to the "even-or-odd" directory. In this view, if both a child and a parent node are selected, the parent node will be displayed, with the children nested inside it.

In response to the selection, the system updates the presentation of the aggregated dependency graph to show only a graph having the selected nodes of the hierarchy. In this example, the aggregated dependency graph pane 620 no longer shows a node representing the "usr" system software node.

A user can drill down further into the presented nodes by using an expansion icon presented with each node in the aggregated dependency graph pane 620, e.g., expansion icon 632 of the even.c node.

Figure 6C:
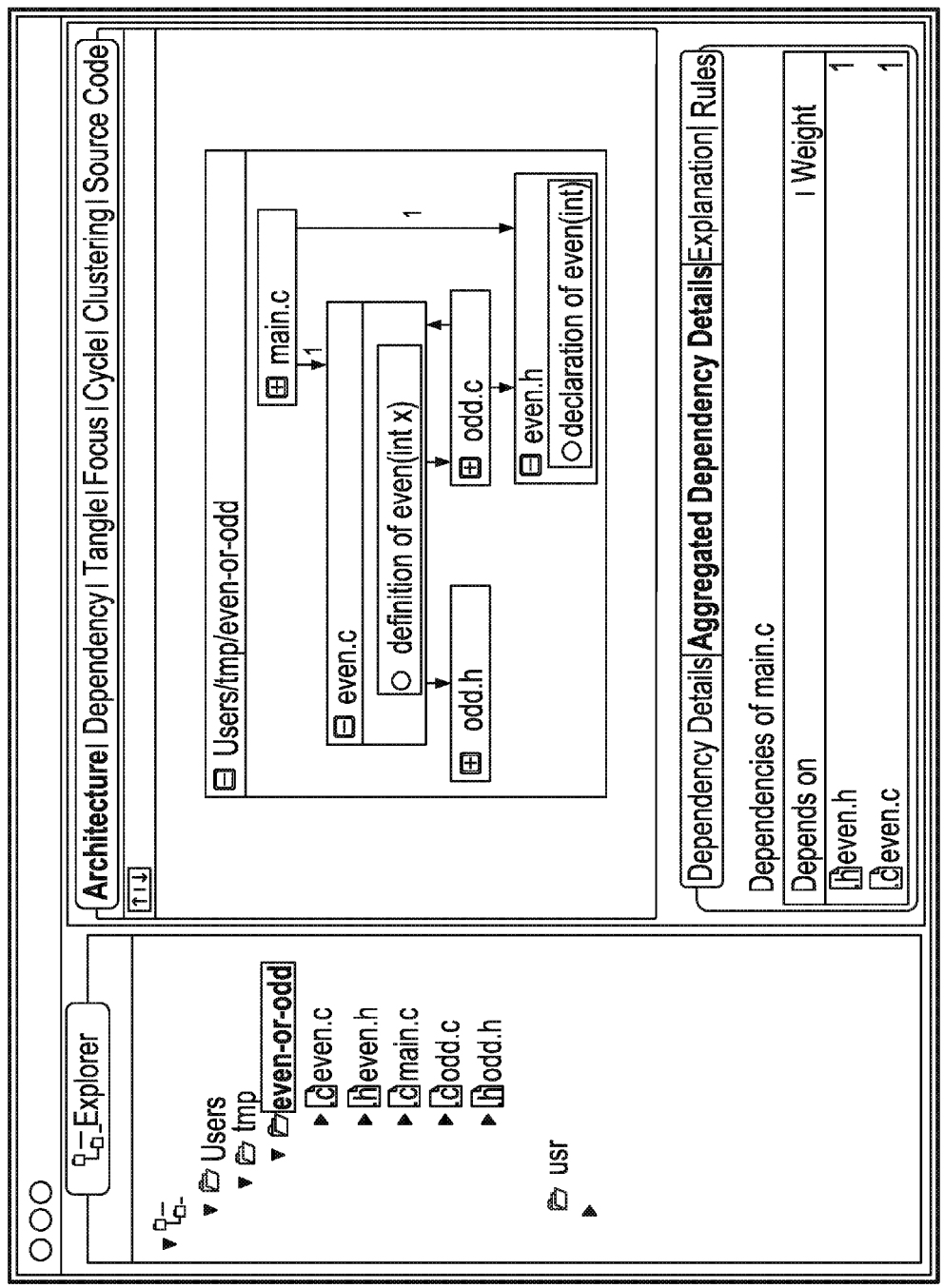

FIG. 6C illustrates expanding a file node of the hierarchy. In FIG. 6C, a user has selected the expansion icons for even.c and even.h. In response, the system displays software elements within the expanded files. For example, a user can choose to expand a node representing a particular software element, which can cause the system to display the immediate children nodes of the selected node according to the hierarchy graph. Or the user can choose to collapse a node to hide its immediate children. Either of these user actions triggers the system to recompute the aggregated dependencies for the nodes to be displayed.

Figure 6D:
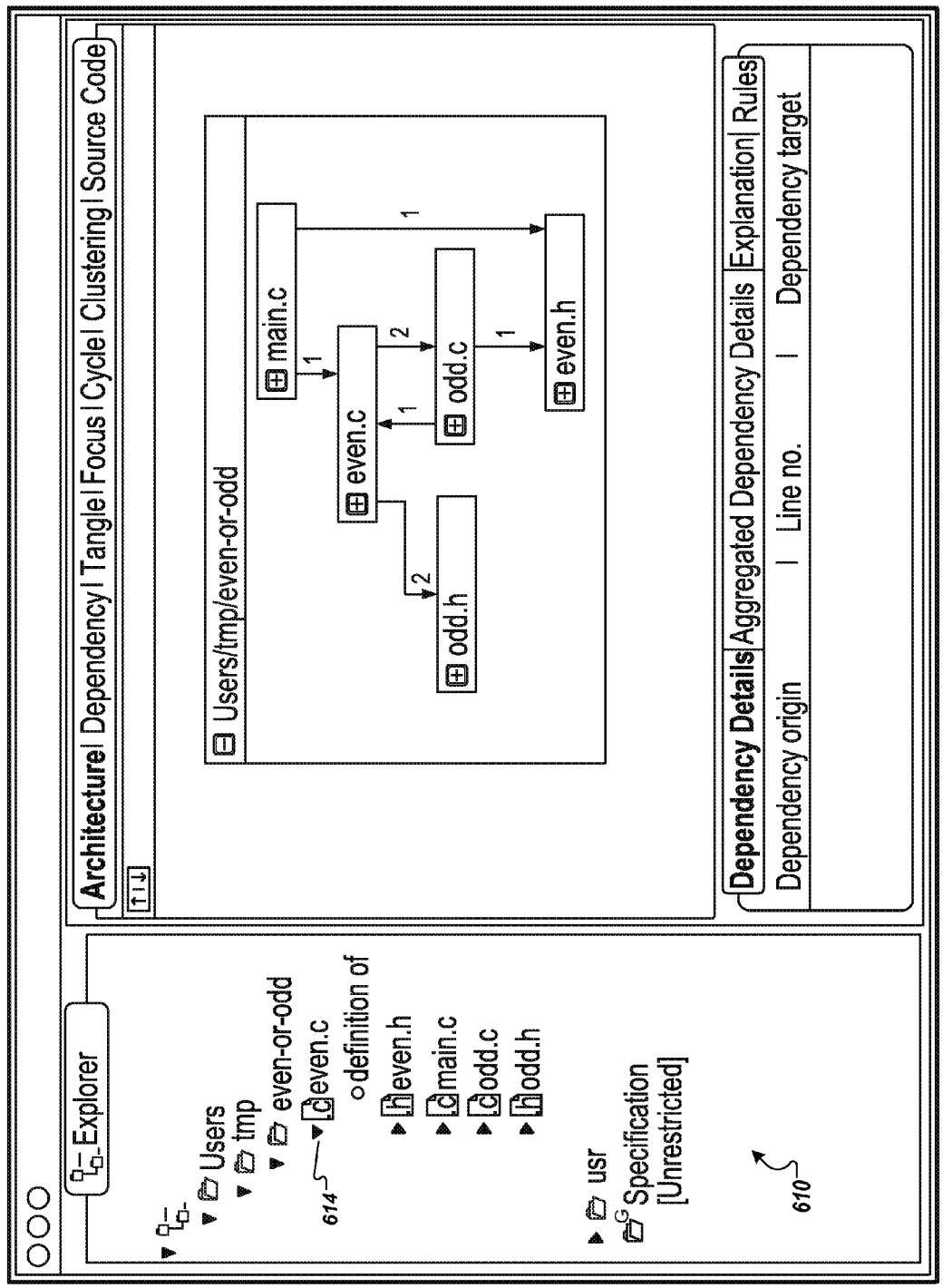

FIG. 6D illustrates expanding a file node in the hierarchy explorer 610. In FIG. 6D, a user has selected an expansion icon 614 presented within the hierarchy explorer 610. In response, the system displays software elements contained within the corresponding file as subnodes in the hierarchy explorer 610.

Figure 6E:
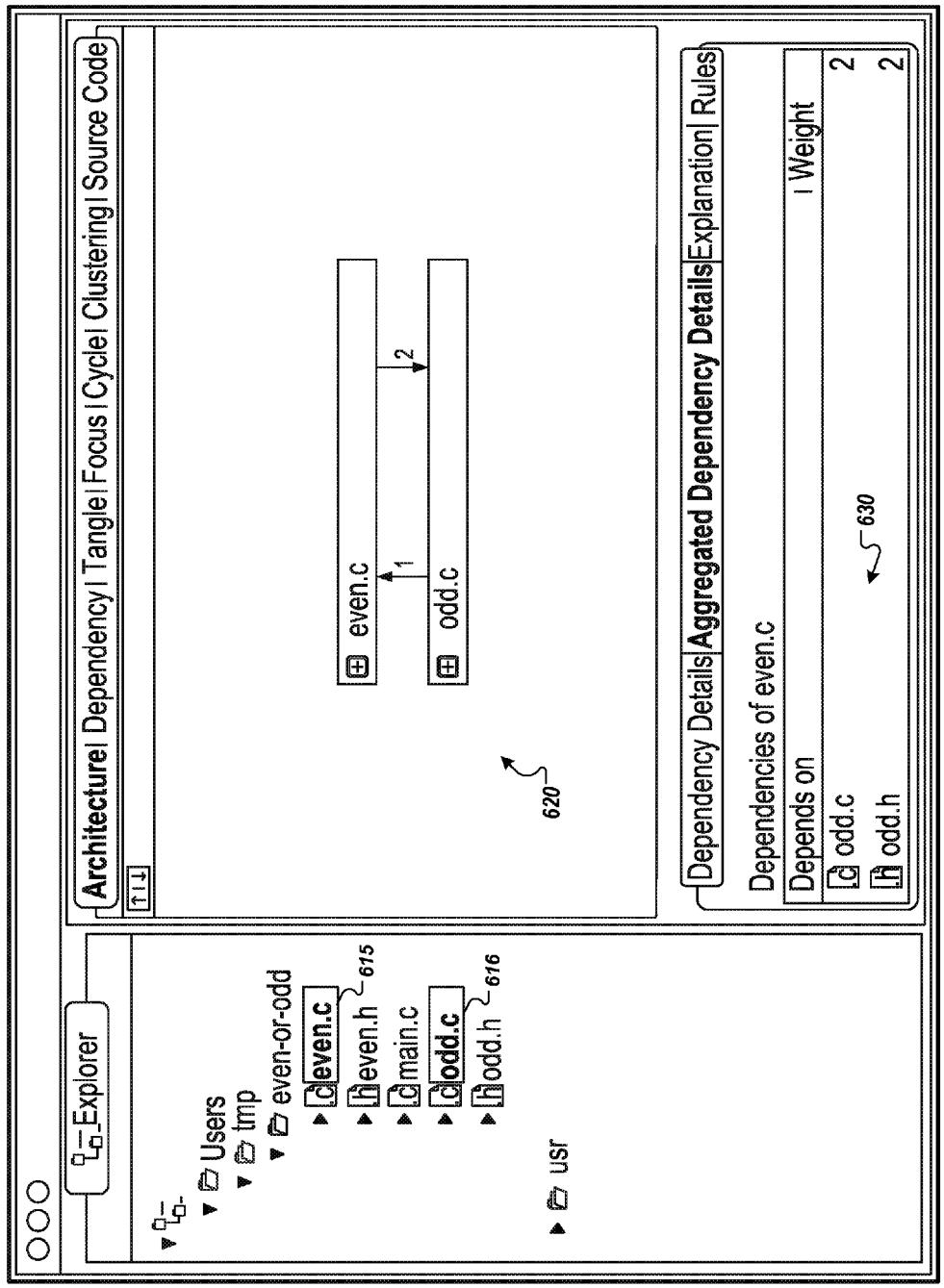

FIG. 6E illustrates selection of multiple file nodes of the hierarchy. In FIG. 6E, a user has selected only a subset of nodes of the project, the even.c node 615 and the odd.c node 616. In response, the system updates the aggregated dependency graph pane 620 to show an aggregated dependency graph with dependencies only between the selected nodes. In this example, the system shows the one dependency of odd.c on even.c and the two dependencies of even.c on odd.c.

Figure 6F:
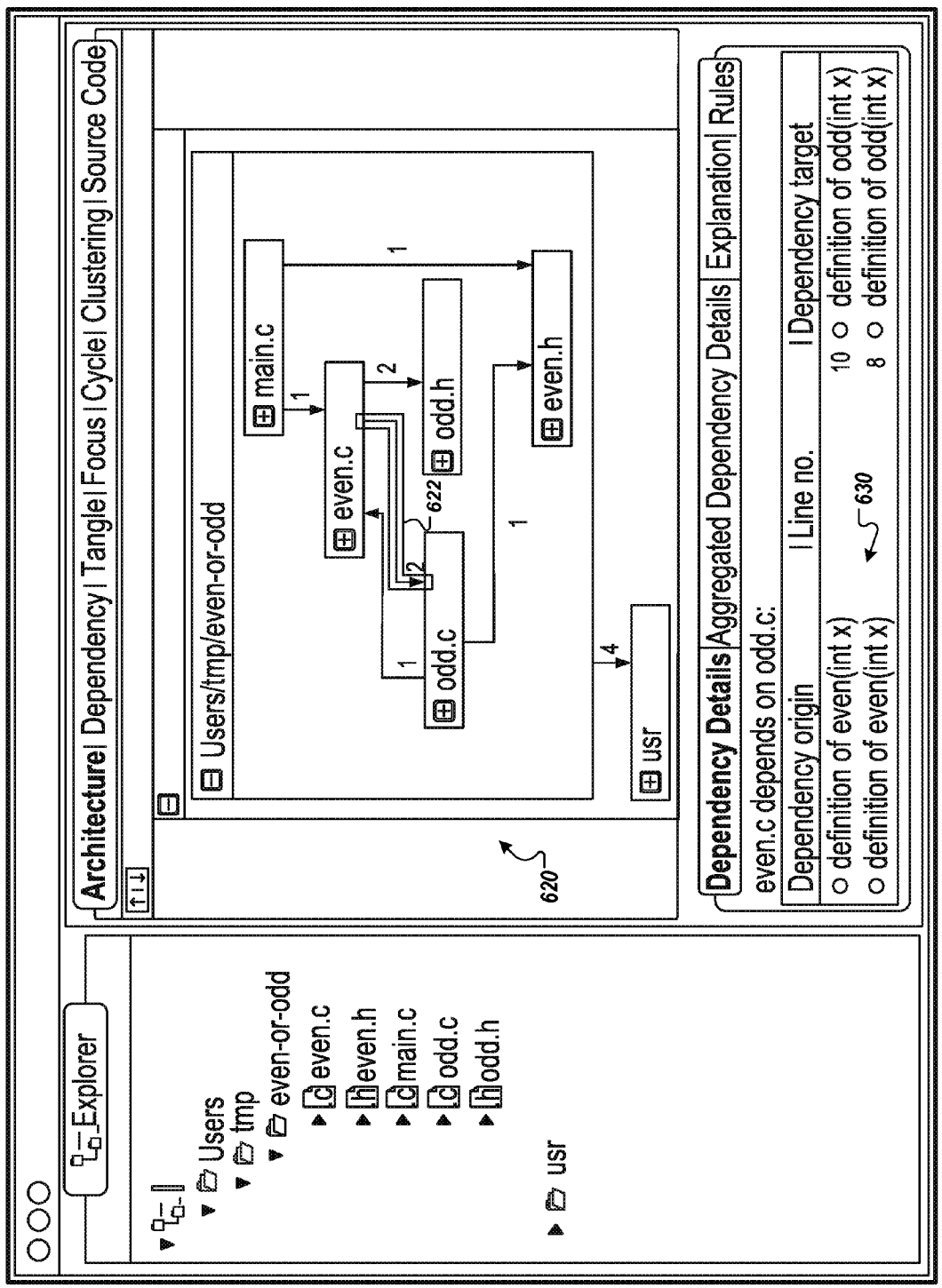

FIG. 6F illustrates selection of a particular dependency. In FIG. 6F, a user has selected a particular dependency 622 in the aggregated dependency graph pane 620. In response, the system displays more details about the corresponding dependencies in a dependency pane 630.

FIG. 6G illustrates a source code file view in response to a dependency selection. In FIG. 6G, a user has selected a particular dependency in the dependency pane 630. In response, the system displays the source code in a source code pane 640 that replaces the aggregated dependency graph pane 620.

The system can highlight the exact source code causing the dependency selected by the user. For example, the source code pane highlights the call to the function "odd" 642, which is the code that causes the dependency selected by the user.

Figure 6H:
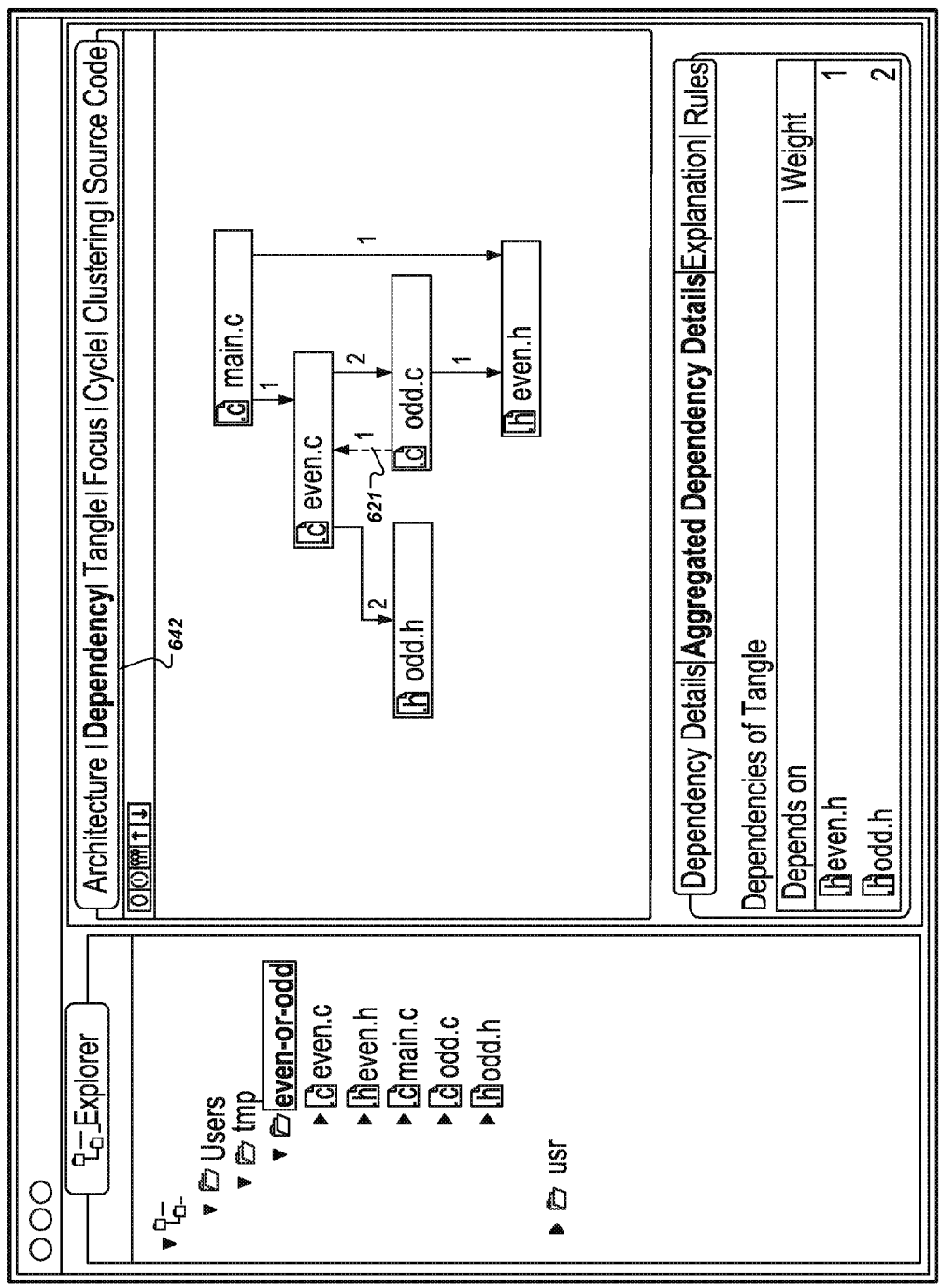

FIG. 6H illustrates candidate removable links. In FIG. 6H, a user has selected a new view for the aggregated dependency graph by selecting the user interface element 642 for the "Dependency" view. In this view, if both a child and a parent are selected, only the children are displayed.

The system then determines one or more candidate removable links for the selected nodes of the hierarchy. For example, the link 621 is a candidate removable link, which the system visually distinguishes from other links by presenting the candidate removable link as a dashed line.

The system can visually distinguish the removable links from the retained links in any appropriate way. For example, the system can present the removable links in a different color, a different style, or a different line thickness, to name just a few examples.

A user can also select or filter the cyclic dependencies by type. Cyclic dependencies in the code base may be problematic for some types of dependencies but not others. For example, include-type dependencies are an example dependency type for which cycles may not be a problem. Thus, the user can select a particular type of dependency to show or filter another particular type of dependency for which cycles are not a problem.

The system can also present the weight of each link near the link itself. The presentation of the weight provides users with an intuitive indication of how much work on the code base would be required to remove each link. For example, the link 621 has a weight of 1, whereas the other link in the cycle has a weight of 2. Thus, removing link 621 will probably require less effort than removing the other link in the cycle.

Figure 6I:
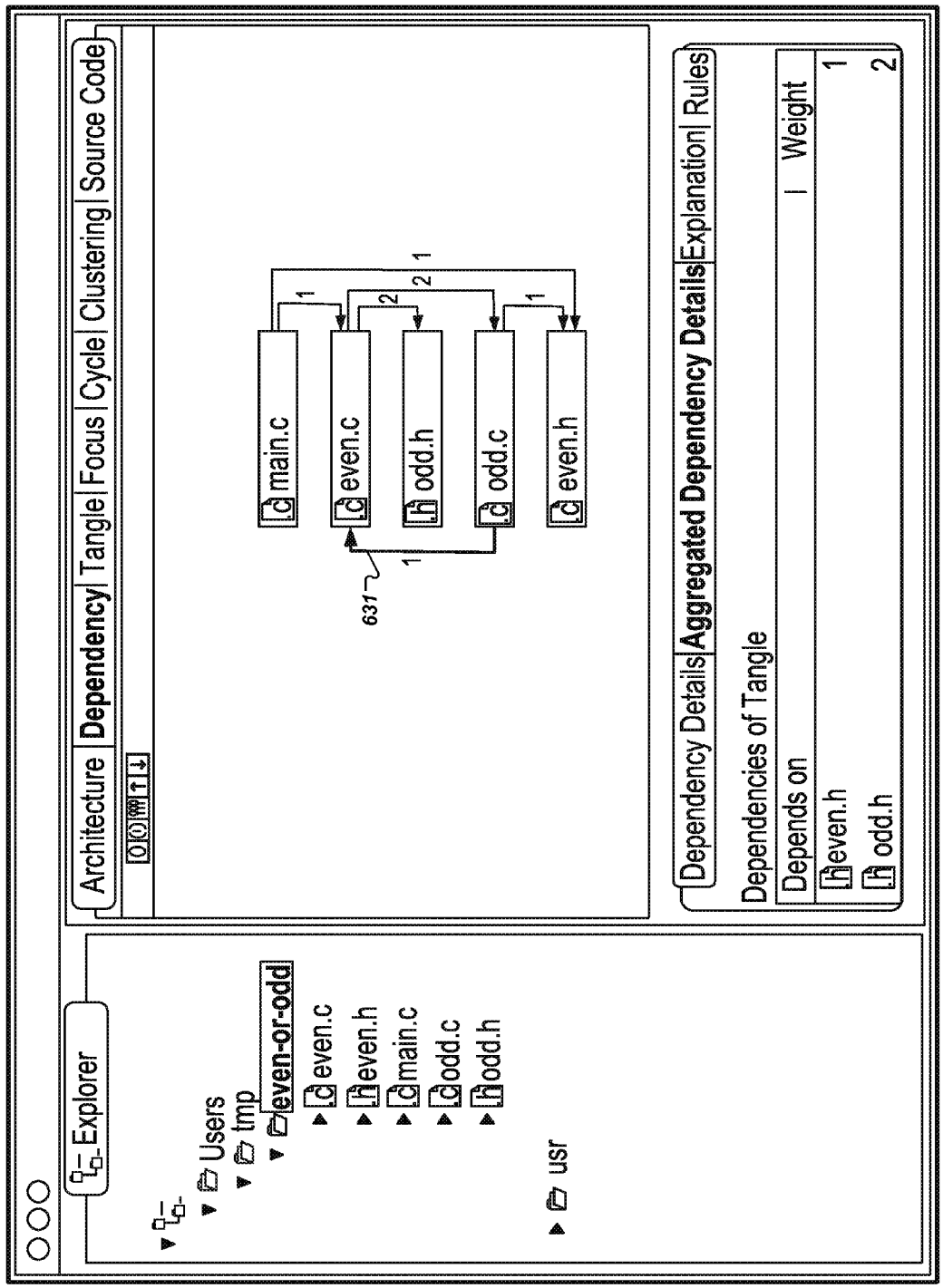

FIG. 6I illustrates a serial layout. In the serial layout, all software element nodes of the aggregated dependency graph are arranged in a column such that all retained links point downwards and all candidate removable links point upwards. In this example, the link 631 is the only candidate removable link, and thus it points upwards while all other links point downwards. This layout reveals an ordered structure of the software elements and highlights the cyclic and acyclic aspects of the code base.

Figure 6J:
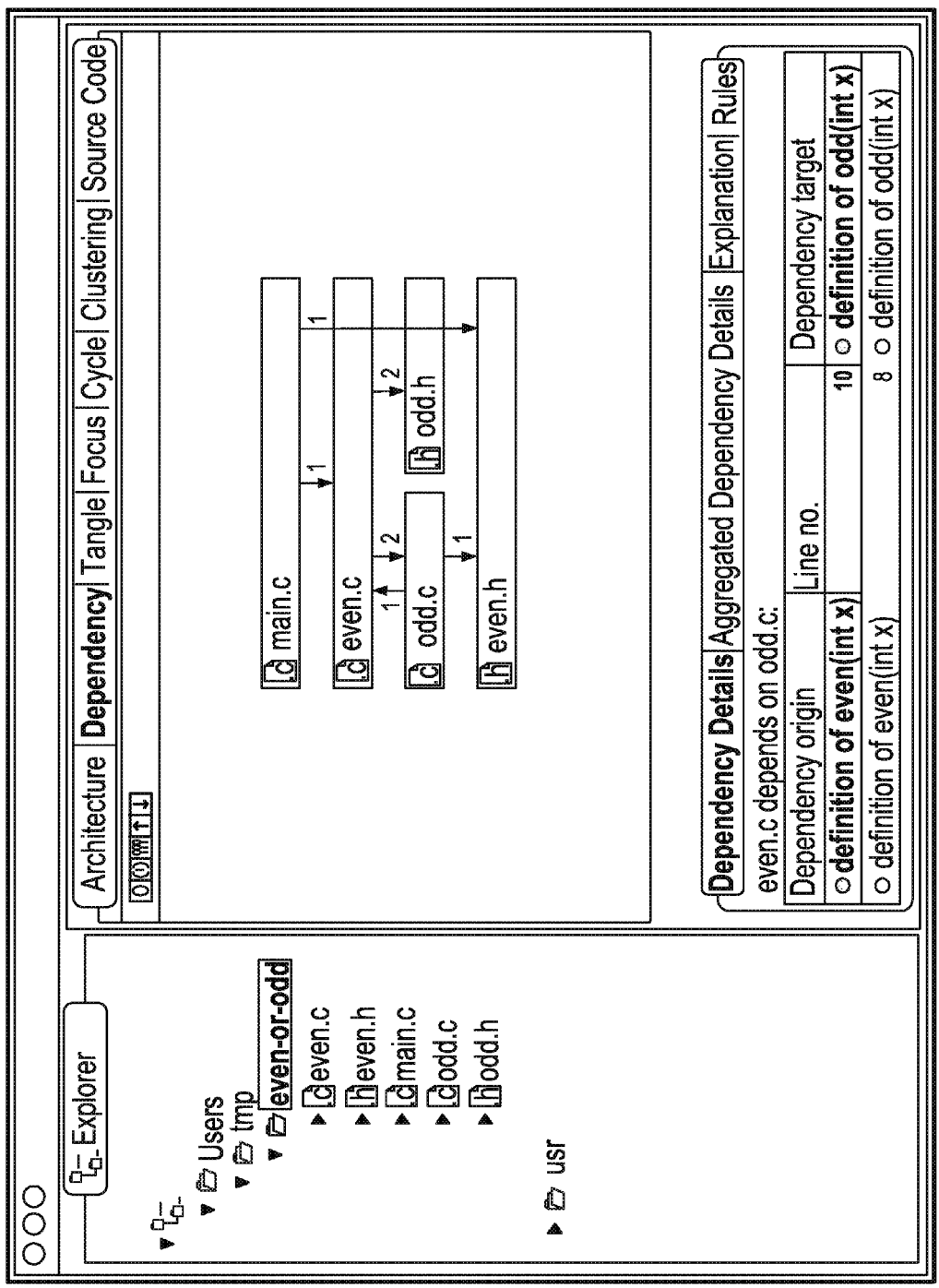

FIG. 6J illustrates a layered layout. In this layout, the system displays all software elements in horizontal layers such that (1) there are no dependencies between software elements in a layer, and (2) all retained links point downwards to other layers, and (3) all candidate removable links point upwards to other layers. This layout reveals a layering and an ordering structure among the software elements. This layout is also generally intuitively understandable for a higher number of software elements and links than the serial layout.

The system can also present a clustered layout that is based on the layered layout. In the clustered layout, the system presents each layer as a proposed cluster and presents links representing aggregated dependencies between the proposed clusters instead of between the individual software elements. The system can generate the clusters as a suggestion to a user for how the software elements should be packaged according to the aggregated dependencies.

Figure 6K:
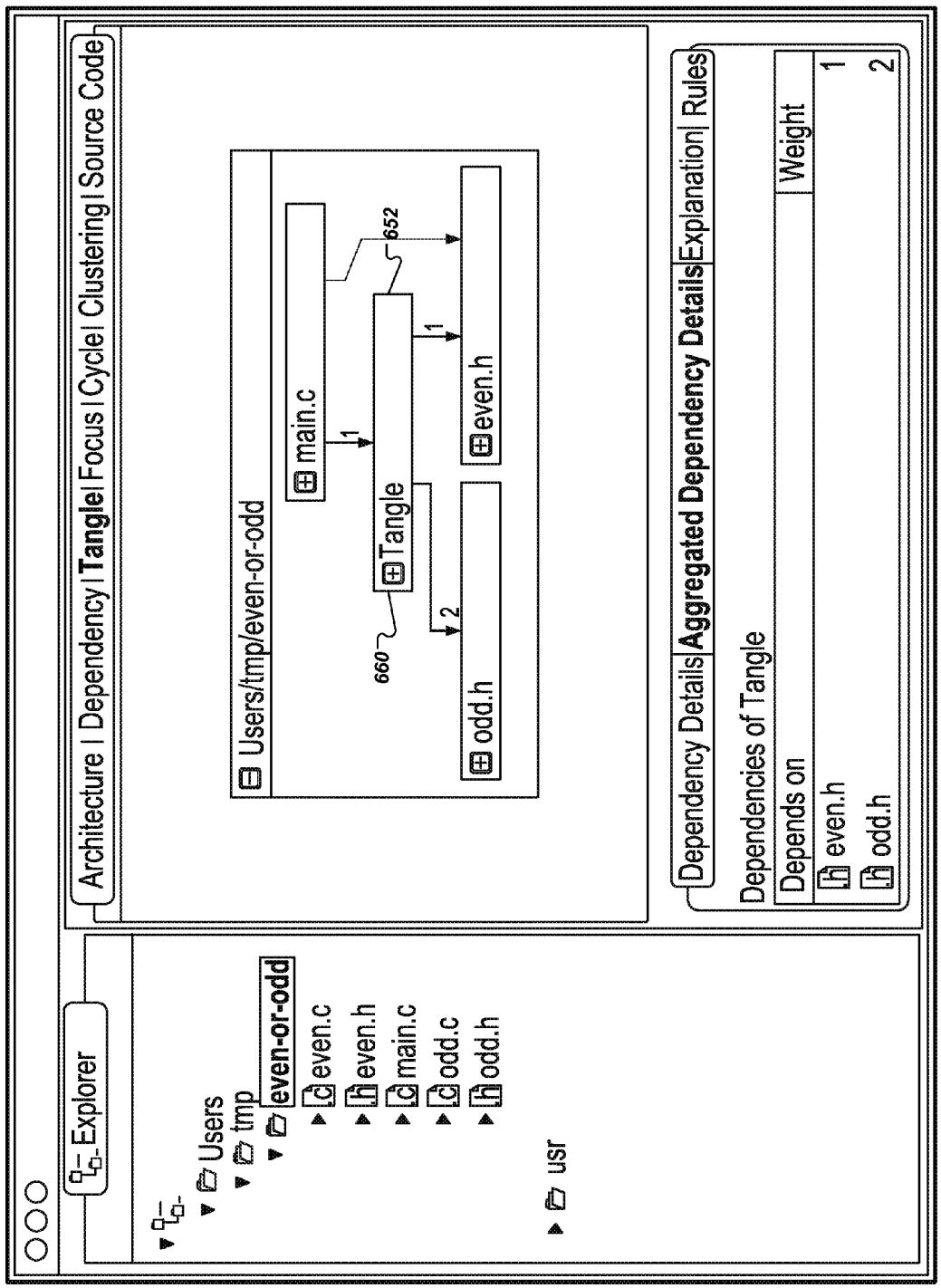

FIG. 6K illustrates a collapsed tangle layout. A tangle is a group of software element nodes that are cyclically connected. A single tangle can include multiple cycles when a particular software element is cyclically connected to multiple cycles.

The system can collapse the nodes in the tangle to represent the tangle as a single tangle node in the aggregated dependency graph. The system can then update the aggregated dependencies to illustrate links between the tangle node and other software elements instead of links between individual software elements of the tangle.

When the system has already classified links in the graph as retained links and candidate removable links, the system can add each node connected to an inbound or outbound removable link to a tangle node. The system can also add nodes that are only connected to other nodes in the tangle to the tangle as well.

FIG. 6K illustrates the same software elements as in FIG. 6A, except with cyclically connected nodes collapsed into a tangle node 652. For example, the tangle node 652 represents multiple nodes that were cyclically connected in FIG. 6A.

When the system collapses all cyclically connected nodes into tangle nodes, the resulting graph is acyclic. For example, the aggregated dependency graph in FIG. 6E is an acyclic graph.

The tangle node 652 in the presentation has a user interface element 660 that allows the user to explore software element nodes in the tangle. In this example, the user interface element 660 is a plus icon, which indicates that the user can select the plus icon to see further software element nodes that are in the tangle.

Figure 6L:
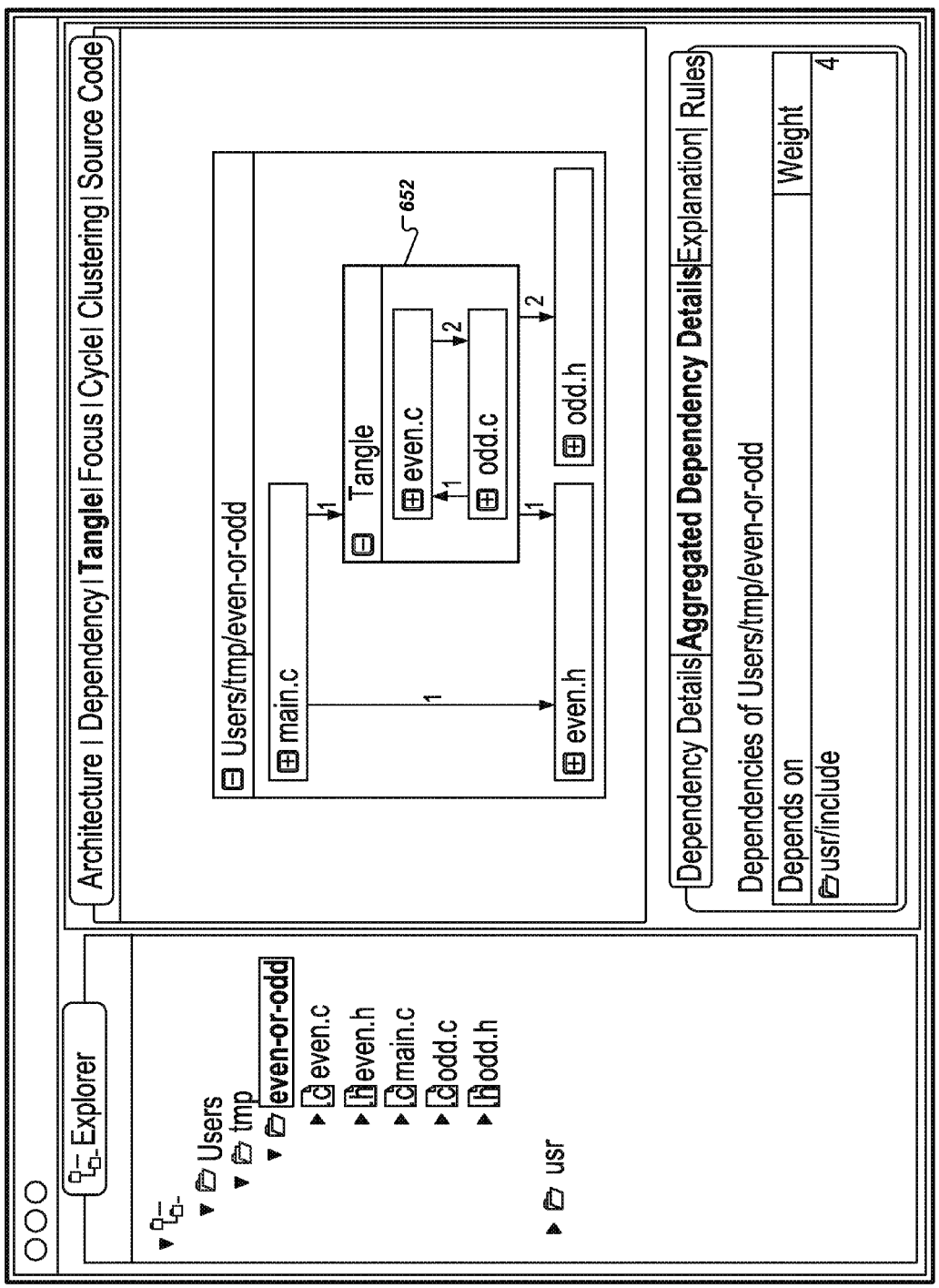

FIG. 6L illustrates an expanded tangle layout. FIG. 6L illustrates the same tangle node 652 that was represented in FIG. 6K. But in FIG. 6L, the tangle node 652 is presented in an expanded view that illustrates all individual software element nodes in the tangle.

The expanded tangle layout shows both (1) aggregated dependencies between the tangle node 650 and other software elements outside the tangle, and (2) aggregated dependencies of the individual software elements inside the tangle.

The expanded tangle layout essentially isolates each tangle as a separate cyclical graph, with each separate cyclical graph represented as an individual tangle node in an acyclic graph. Within the individual tangle nodes, the system can suggest candidate removable links for removal.

The interactive nature of the visualizations generated by the system requires that the system be able to compute relationships between software elements and their respective dependencies in real time or near real time. To do so, the system can use techniques that (i) allow many sets of dependencies to be represented in main memory, (ii) provide for fast computation of operations between arbitrary sets of dependencies, and (iii) allow the result of a binary composition, e.g., conjunction, disjunction, implication, to be computed and accessed randomly without ever representing the result in memory.

The system can arrange identifiers of software elements in a project so that software elements that are near each other in the hierarchy are likely to have identifiers that are close to each other. Thus, subtrees of software elements are likely to have identifiers that are contiguous in a range of identifiers.

The system can then use a data structure called a "tiered array" to exploit the ranges of contiguous identifiers. Each identifier that uniquely identifies a dependency corresponds to one of N indexes, where N is the number of dependencies. Thus, in the description that follows, an "index" refers both to a position represented in a tiered array as well as a unique identifier for a particular dependency.

This allows the system to efficiently compute operations involving dependency sets represented as tiered arrays, e.g., conjunctions, disjunction, inverses, implications, e.g., "A implies B," which is logically equivalent to "B or not A," and a "without" operation, e.g., "A without B," which is equivalent to "A and not B".

Figure 7:
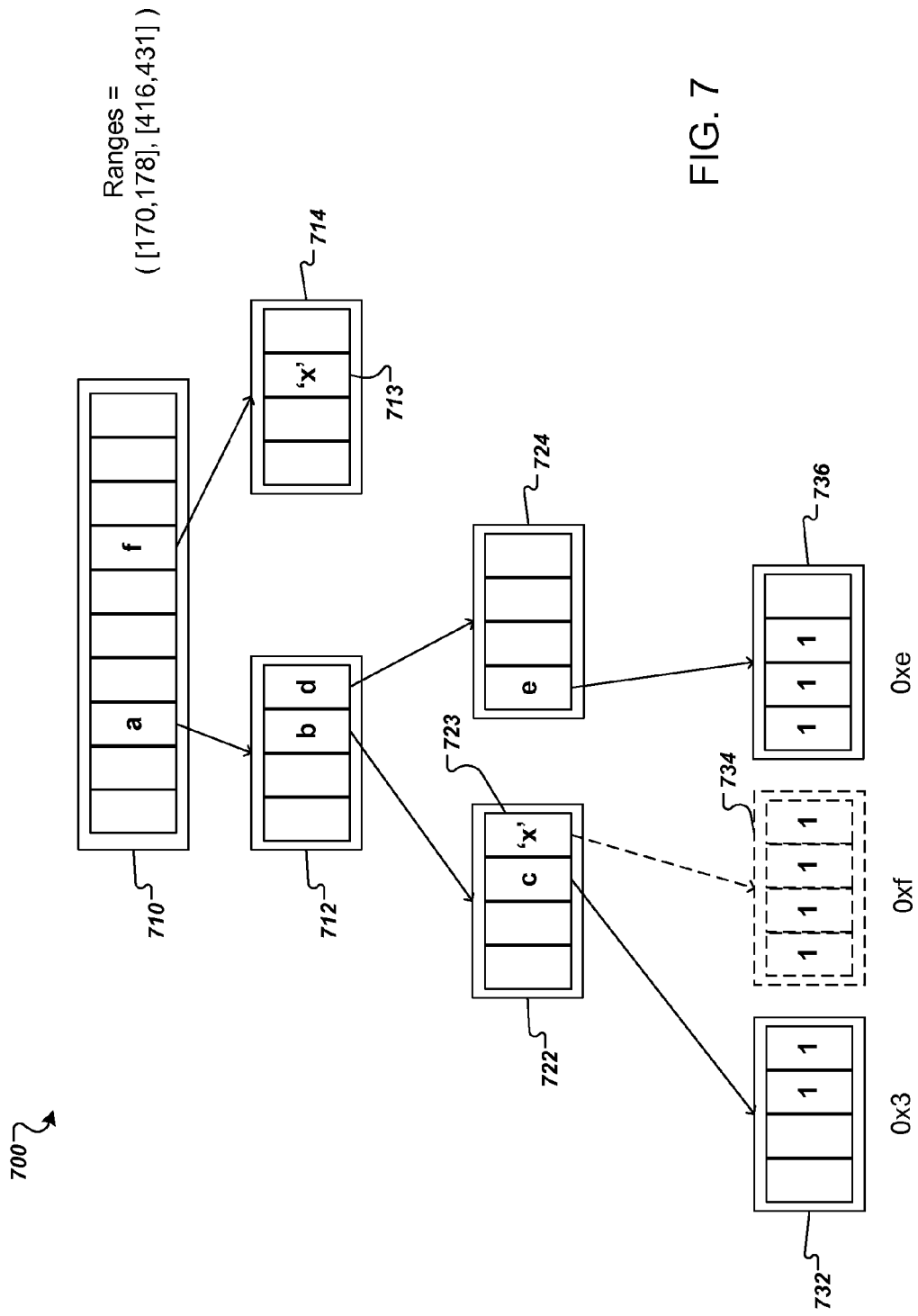
FIG. 7 is a diagram of an example tiered array.

FIG. 7 is a diagram of an example tiered array 700. Each tier in the tiered array has one or more arrays that are arrays of references to arrays at a lower level, except for the bottom tier, which has catalogs of values, which each bottom-level array storing values over a predetermined range of indexes. For clarity, the individual arrays on each tier of a tiered array will be referred to as catalogs. For ease of reading, a "tier" of a tiered array will also be referred to as a "level." These terms will be used interchangeably, whose meaning will be clear from the context.

A tiered array has unallocated portions that represent ranges of indexes defined to have a default value. Thus, a tiered array can represent the same data as a simple array in a manner that is almost always more efficient in terms of space, at a negligible reduction in speed of access. In other words, the default values are not explicitly represented in the tiered array. Rather, the tiered array allocates catalogs that are sufficient to represent elements that are associated with non-default values. The "worst case" for a tiered array arises when there is a value associated with at least one index in every possible catalogue, so that every tier must be instantiated. In this case, the tiered array incurs slightly worse space efficiency, but the actual occurrences in practice of the worst case in terms of both speed and space efficiency are generally negligible.

The default value of a tiered array can be defined arbitrarily, and the choice depends on the data type being represented. The default value of a non-bottom-level catalog is a null pointer. If the tiered array represents an array of bits, the default value for bottom-level catalogs is usually "0", although "1" could also be used. If the tiered array represents an array of strings, the default value is the null string. For other numeric types, the default is zero. The choice of default value is normally that which is consistent with the notion of an "empty" array, i.e., the state of the array when first created and before any associations have been stored in it. For brevity, an index having a non-default value can be referred to as the index being "set," or equivalently, being a "set index." An index having the default value can be referred to as the index being "not set," or equivalently, being an "unset index."

The tiered array 700 has a top-level catalog 710. Each element of the top-level catalog 710 has either a default value, e.g., a null pointer, or a reference to a catalog on a lower level. For brevity, the action of following a reference from a catalog on one level to a catalog on a lower level will be referred to as descending a level in the tiered array. Similarly, moving from a catalog on a lower level to a catalog on a higher level will be referred to as ascending a level. The sense of direction is arbitrary. However, in this specification, descending will refer to moving closer to the bottom-level catalogs storing values.

In FIG. 7, the third element of the top-level catalog 710 is the first element of the top-level catalog 710 that is set, e.g., associated with a non-default value. The third element references a catalog 712 on a lower level of the tiered array 710. The catalog 712 has two elements set that respectively reference catalogs 722 and 724 on lower levels of the tiered array 710.

The bottom-level catalogs of a tiered array can store any appropriate data type. For example, the bottom-level catalogs can store signed or unsigned unsigned integers, long integers, or individual bits. When the bottom-level catalogs store individual bits, each bottom-level catalog itself can be represented as an integer type. In some implementations, the system stores bottom-level catalogs as unsigned longs having 64 bits each.

The structure of the tiered array allows the system to store values over an arbitrary range of indexes that is arbitrarily large. For example, a tiered array can store values over a range of indexes represented by 64-bit longs. In addition, the range of indexes can include negative indexes. For example, a tiered array can have indexes that are signed integers, and thus the tiered array store values that are associated with indexes from $-2^{31}$ to $2^{31}-1$.

In the example of FIG. 7, each bottom level catalog stores just 4 bits. The bottom level catalog 732 has its last two bits set. Thus, it can be represented by an integer type having the hexadecimal value 0x3.

A system can implement a number of optimizations by maintaining some metadata for each catalog of a tiered array. In particular, the system can maintain, for each catalog, a value of the first set index in the catalog, a value of the last set index in the catalog, and a value representing the number of set indexes in the catalog.

The system can deallocate catalogs that represent fully-set ranges of indexes. For example, if the bottom-level catalog 734 has every bit set, the system can deallocate the bottom-level catalog 734. The system can then replace the reference 723 in the catalog 722 with a special reserved value, in this example 'x', to indicate that the catalog was fully set and therefore deallocated. In FIG. 7, the dashed lines represent that the bottom-level catalog 734 is not actually allocated in the tiered array 700.

The system can also represent fully set but unallocated catalogs using metadata associated with the catalogs. For example, the reserved value 'x' can actually be the default value, e.g., null, when used in association with the metadata. Thus, if a value in a catalog is a default value, e.g., null, but is associated with a bottom-level having metadata that indicates that the bottom-level catalog is full, the system can determine that the bottom-level catalog is a fully set but unallocated catalog. In other words, the system can use the default value, e.g., null, to represent catalogs that are fully set if the metadata indicates they are fully set, or fully empty otherwise.

The deallocated catalogs representing fully-set ranges of indexes can also occur at higher tiers of the tiered array 700. For example, the catalog 714 includes a reference 713 indicating that all catalogs on lower levels would have been fully set. In this example, the reference 713 represents 16 set bits.

The system can maintain the catalogs by allocating a new catalog whenever a fully deallocated catalog has one of its elements set, by deallocating a catalog whenever a fully allocated catalog has one of its elements removed, and by reallocating a catalog whenever an element in a fully allocated catalog is removed. The system can reduce the time required for allocating catalogs by maintaining a pool of fully-allocated catalogs and fully-deallocated catalogs. Then, if a new fully-allocated catalog is required, the system can use one of the already-allocated catalogs from the pool of fully-allocated catalogs. Similarly, whenever a new partially allocated catalog is needed, the system can use one of the fully-deallocated catalogs. That is, when the only unset index in a catalogue is set or the only set index in a catalogue is unset, the reference to that catalogue can be removed from the tiered array, but added to the pool. Conversely, when an index in a fully set catalogue is unset (or vice versa) a catalogue in the pool of fully set or fully unset catalogues can be reused. It is more efficient to use a catalogue from the appropriate pool, but if that pool is empty while the other pool is not, it is generally still preferable to reuse a catalogue from the other pool because doing so still functions to reduce the frequency at which chunks of memory are allocated and deallocated on the heap and hence reduces memory fragmentation, even though it is necessary to invert every value in such a catalogue before reusing it.

Figure 8:
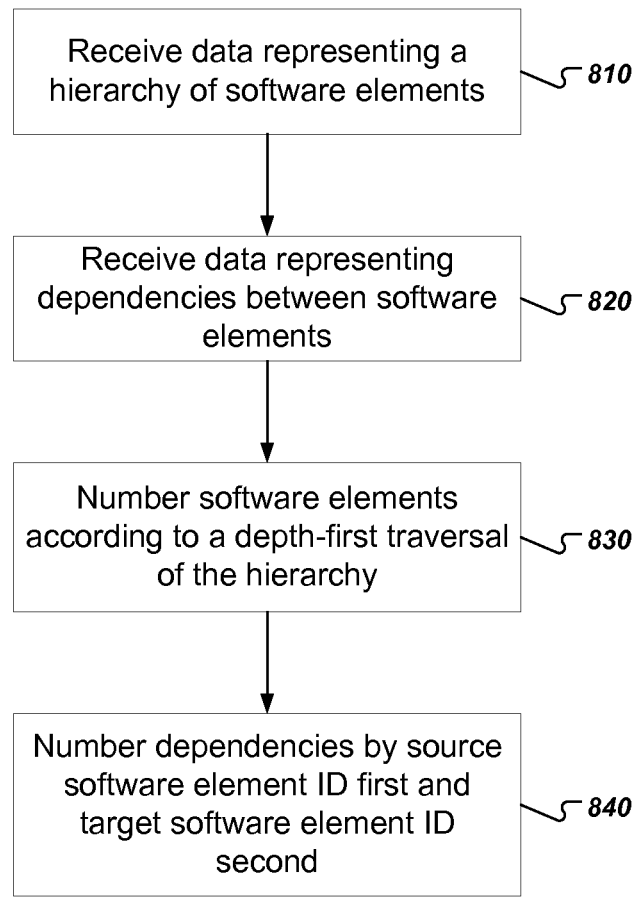
FIG. 8 is a flow chart of an example process for assigning software element IDs and dependency IDs.

FIG. 8 is a flow chart of an example process for assigning software element IDs and dependency IDs. To exploit the properties of tiered arrays, the system can number software elements and dependencies in a way that increases the number of contiguous bits in tiered arrays representing dependencies. The process will be described as being performed by an appropriately programmed system of one or more computers, e.g., the static analysis system 202 of FIG. 2.

The system receives data representing a hierarchy of software elements (810). As described above, the system can maintain a hierarchy graph representing hierarchical relationships, which typically represents a containment relationship between software elements. For example, FIG. 1B illustrates one such hierarchy graph.

The system receives data representing dependencies between the software elements in the hierarchy (820). As described above, the data can represent a raw dependency graph between software elements in the project. Each dependency identifies a source software element and a target software element.

The system numbers the software elements according to a depth-first traversal of the hierarchy (830). For example, the system can assign an ID of 1 to the root node, 2 to the root node's first child, 3 to the first child's first child. Typically, the ID 0 is not used; rather, 0 or null is reserved for use as an indication of the absence of a node or dependency.

The system numbers dependencies in the project in an order determined by source software element IDs first, and target software element IDs second (840). That is, all dependencies having a same particular node as a source software element will be numbered consecutively. And the order among the dependencies from the particular node will be determined by the IDs of the target software elements of the dependencies. For the sake of clarity, the resulting association of IDs with dependencies is consistent with the following algorithm: Let S(X) indicate the ID of the software element that is the source of a dependency X, and T(X) the ID of its target. Create a list containing all of the dependencies. Sort this list such that dependency A is before dependency B if S(A)<S(B) or, S(A)=S(B) and T(A)<T(B), if S(A)=S(B) and T(A)=T(B). The relative placement of A and B is arbitrary. Lastly, allocate to each dependency the ID that corresponds to its position in the sorted list, e.g., the first element in the list is allocated the ID 1, the second element in the list is allocated the ID 2, and so on.

This technique causes outgoing dependencies for each software element to be stored contiguously in the tiered arrays for those software elements. This property can be exploited to more efficiently perform operations involving the dependencies between software elements.

The number n of dependencies represents the range of indexes that will be represented by tiered arrays. A tiered array is used to represent the IDs of the dependencies inbound to a particular software element node, and typically also the IDs of the dependencies inbound to any software element nodes that are descended from it in the hierarchy. A tiered array is likewise used to represent the IDs of the dependencies outbound from a particular software element node, and typically also those of its descendants).

Figure 9:
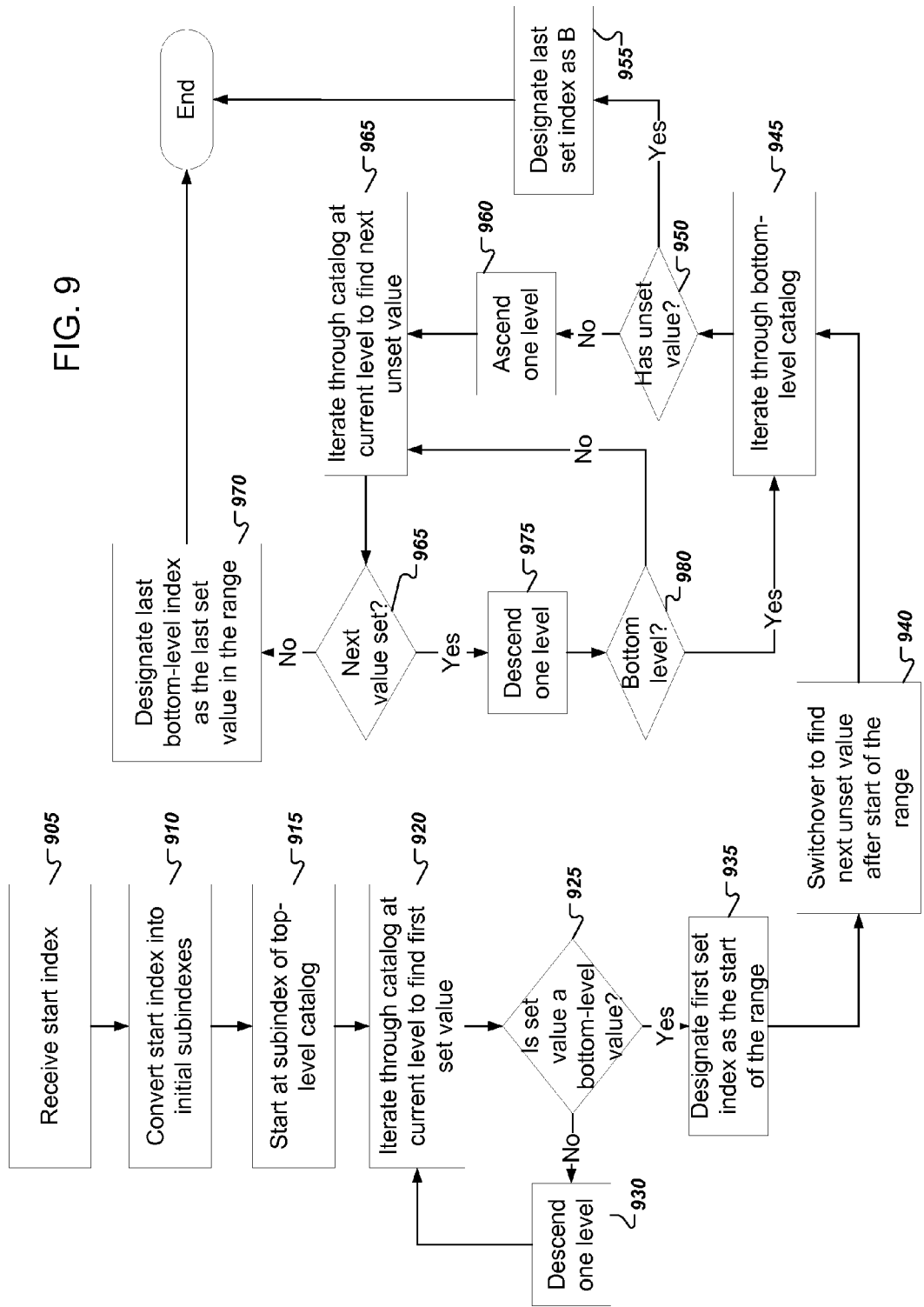
FIG. 9 is a flow chart of an example process for finding a range of contiguous set indexes in a tiered array.

FIG. 9 is a flow chart of an example process for finding a range of contiguous set indexes in a tiered array. The system will first identify a first set value, if any, by descending to lower levels of the tiered array. Once a first set value is found, the system will identify a last set value in a contiguous range from the first set value, which may require ascending one or more levels and descending again to find the last set value. The process will be described as being performed by an appropriately programmed system of one or more computers, e.g., the static analysis system 202 of FIG. 2.

The system receives a start index (910). The system will use the start index to find a first value in the tiered array that is set at an index that is greater than or equal to the start index. In other words, indexes less than the start index are disregarded. The start index can specify an arbitrary position in the tiered array, and, as described above, the start index can be negative if the tiered array has negative indexes.

The start index can be specified by a number of different operations. For example, to identify all set values in a tiered array, the system can first provide a start index equal to a minimum start index to find a range [a,b] of contiguous set indexes, where a is equal to or greater than the start index. The system can then repeat the process by providing a start index of b+1, and continue doing so until the are no remaining indexes that are set, as a means to rapidly determine and provide a representation of all set indexes, which can be used to iterate the indexes individually or simply to count them) Other start indexes can also be specified while computing other operations on the tiered array, e.g., while computing disjunctions or conjunctions of tiered arrays as described in more detail below with reference to FIGS. 10 and 12.

The system converts the start index into initial subindexes (920). The number of subindexes depends on the number of tiers in the tiered array. For example, the tiered array shown in FIG. 7 has four tiers, but the fourth is implemented by storing integer types. Thus, the system can convert a starting index into three subindexes that each reference a position in a corresponding catalog.

The system can store in each tier $2^x$, $2^y$, and $2^z$ values respectively. For example, if the indexes are 4-byte integers, x can be the most significant 10 bits, y can be next-most significant 10 bits, and z can be the least-significant 12 bits. Thus, the system can obtain the subindexes by bit shifting and masking operations applied to the "full" index. In other words, to obtain x, the system can shift the bits right by 22 bits and mask off all but the bottom 10 bits in the result.

As the system iterates through the catalogs, the system can update the subindexes. For example, when iterating through a catalog, the system will increment a subindex for the catalog on each iteration.

If the end of a catalog is reached, the system can ascend from a lower tier to an upper tier. In that case, the subindex for the lower tier can be reset to zero, while the subindex for the upper tier can be incremented by one.

If the system descends a tier by following a reference from an upper tier to a lower tier, the subindex for the lower tier can be reset to zero, unless the system is following a reference specified by the very first subindexes generated from a start index. In other words, when obtaining a value for the start index only, descending to lower tiers does not reset the subindex to zero for those lower tiers. In all other cases of descending to lower tiers, the subindex is reset to zero.

The system starts at the subindex of the top-level catalog (915). The system will then iterate through catalogs on lower levels to find a first value that is set at an index that is greater than or equal to the start index.

The system iterates through a catalog at a current level to find the first set value in the catalog (920). The catalog at the current level is initially the top-level catalog. Descending a level changes the current level to a catalog on a lower level, and ascending a level changes the current level to a catalog on an upper level.

Upon finding a first set value, the system determines whether the set value is a bottom-level value (925). If the set value is not a bottom-level value, the set value is a reference to a catalog on a lower level. Thus, the system descends one level and iterates through the catalog on the lower level (branch to 930).

If the set value is a bottom-level value, the system designates the first set index as the start of the range (935). The system then computes the start of the range by using the subindexes to compute an overall index corresponding to the bottom-level value. To do so, the system can perform the inverse of the process in step 910. That is, the system can left shift the current subindex for the top-level by x bits, left shift the current subindex for the middle level by y bits, and compute a bitwise OR of those with the last z bits. If, as in FIG. 7, the tiered array stores a fourth level as integer types, the system can additionally add the value in the last catalog to the result.

In some cases, the bottom-level catalog is not actually allocated. For example, the bottom-level catalog 734 in FIG. 7 is not actually allocated. However, the system can still designate the first set index of the range as the first index represented by the bottom-level catalog.

After finding the first set index at the start of the range, the system switches over to finding the next unset value after the start of the range (940). The next unset value represents the end of the range of contiguous set values. The end of the range is thus the index before the next unset value.

In general, finding the first set value in the range only involves descending levels in the tiered array. However, finding the next set value can involve ascending to upper levels in the tiered array, and possibly descending once again to lower levels in the tiered array.

The system iterates through the bottom-level catalog (945), and determines whether the bottom-level catalog has an unset value (950). If so, the system designates the last set index in the bottom-level catalog as the end of the range (955) and the process ends. If not, the system ascends one level (960).

If the bottom-level catalog is not actually allocated because it is fully set, the system need not iterate through the bottom-level catalog and can instead immediately determine that the bottom-level catalog does not have an unset value and ascend one level (branch to 960).

The system iterates through the catalog at the current level to find next unset value (965). If the next value on an iteration through the catalog at the current level is not set, this means that the last bottom-level index is the last set value in the range. Thus, the system designates the last bottom-level index as the last set value in the range (970), and the process ends.

If the next value on an iteration through the catalog at the current level is set, the system descends one level (branch to 975). If the current level is the bottom-level (980), the system iterates through the bottom-level to find the next unset value (branch to 945). If the current level is not the bottom-level, the system iterates through the catalog of the current level again (branch to 965).

The process in FIG. 9 can be illustrated with reference to FIG. 7. In FIG. 7, the system will follow references to lower-level catalogs in the order determined by the letters "a" through "f." Assume for this example, that the start index is 0.

Thus, the system begins iterating through the top-level catalog 710 starting from the first index of the top-level catalog 710. The first set value is designated by the reference "a" to the lower-level catalog 712.

The system then iterates through the lower-level catalog 712 identified by "a" until it reaches the first set value, designated by the reference "b" to the lower-level catalog 723.

The system then iterates through the lower-level catalog 722 until it reaches the first set value, designated by the reference "c" to the bottom-level catalog 732.

The system then iterates through the bottom-level catalog 732 until it reaches the first set value at the third position in the catalog. Because the first set value is in the bottom-level catalog, the system designates the index at that position as the first set value in the range.

In this case, the first index of the range is computed by computing the position of the first set value, e.g., 0x2 in base 0, plus the position of the first set value in the catalog 722 shifted by the number of bits in the bottom-level catalogs (4), plus the position of the first set value in the catalog 712 shifted by (i) the number of bits in the bottom-level catalogs and (ii) the number of positions in the catalog 722, plus the position of the first set value in the top-level catalog shifted by (i) the number of bits in the bottom-level catalogs, (ii) the number of positions in the catalog 722, and (iii) the number of positions in the catalog 712.

Thus, the first index in the range is 170.

The system then switches over to finding the next unset value by iterating through the bottom-level catalog 732. The system reaches the end of the catalog without finding an unset value, so the system ascends a level to the catalog 722.

The next value 723 is set, so the system could then descend a level to the bottom-level catalog 734. However, because the next value 723 indicates that the bottom-level catalog 734 is fully set, the system can skip iterating over the bottom level catalog and continue iterating over the catalog 722.

The value 723 is the last value in the catalog, so the system ascends one level to iterate through the catalog 712. The next value "d" is set, so the system descends one level to iterate through the catalog 724. The next value "e" is set, so the system iterates through the bottom-level catalog 736 until determining that the last position in the bottom-level catalog 736 is not set.

At this point, the system designates the immediately preceding index as the last index set in the range. The system can compute the last index in the range in a similar way to the first index in the range, and thus, the last index in the range is 178.

The system can then return the range [170, 178] in response to the requesting process. If the requesting process is a process that finds all such ranges in the tiered array, the system would next receive a request for the next range starting at index 179.

The system would then iterate through the top-level catalog to the value "f" and descend one level to the catalog 714. The first value 713 that is set is at the third position. Because the value 713 indicates that the lower-levels are not allocated because they are fully set, the system can designate the index represented by the fully set lower tiers as the first value in the range. In this example, the first index is 416. The system also need not iterate through the unallocated lower tiers. Thus, the system next determines that the next value is not set. The system thus designates the last value represented by the fully set lower tiers as the last value in the range, which is 431.

The system can then also return the range [416, 431] to the requesting process.

The process described above with reference to FIG. 9 can be improved with a number of optimizations. In particular, the system can maintain metadata about each catalog in the tiered array that stores a number of set indexes in each catalog, the first index that is set in the catalog, and the last index that is set in the catalog. The metadata can also maintain information about the tiered array as a whole, e.g., the number of set indexes in the tiered array, the first index that is set in the tiered array, and the last index that is set in the tiered array.

Furthermore, the system need not serially perform the steps for finding the first set index and then the last set index. Rather, the system can compute either the first or last set index independently, which means that the system can compute them in any order or concurrently. Lastly, the system can also seek to curtail computation of first set index and the last set index under a number of conditions.

These enhancements are described below with reference to FIG. 10A-C. In these examples, a tiered array having three tiers is assumed. However, the same techniques can be applied to tiered arrays having an arbitrary number of tiers.

Figure 10A:
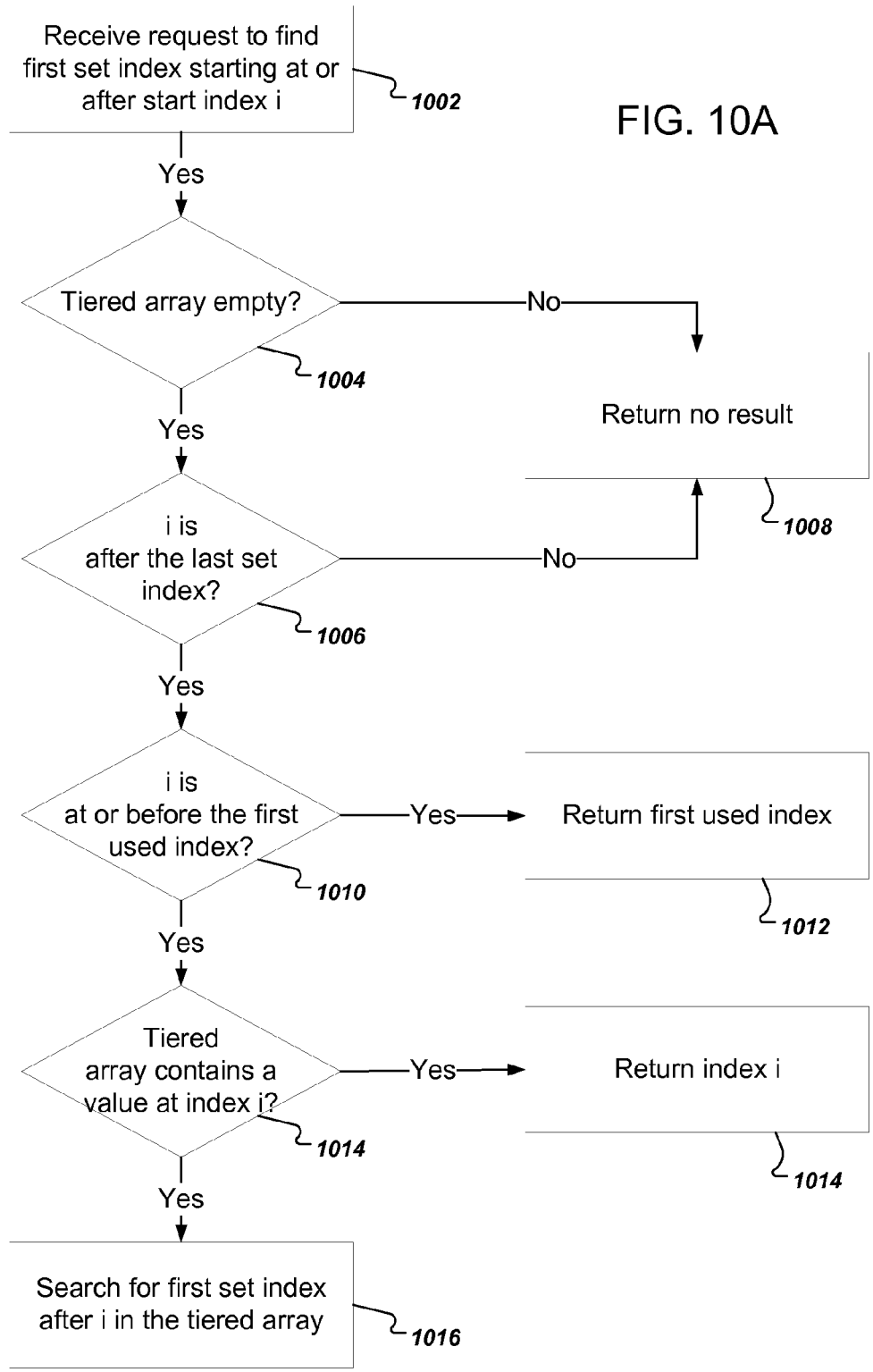
FIG. 10A is a flow chart of an example process for curtailing computation of a contiguous range set indexes in a tiered array.

FIG. 10A is a flow chart of an example process for curtailing computation of a contiguous range set indexes in a tiered array. Before searching the tiered array to find a first index and last index of a contiguous range of set indexes, the system will perform a variety of tests to determine whether the computation can be bypassed. The process will be described as being performed by an appropriately programmed system of one or more computers, e.g., the static analysis system 202 of FIG. 2.

The system receives a request to find a first set index starting at or after a start index i (1002). As described above, the system can search a tiered array for a contiguous range of set values that start at or after i.

The system determines whether the tiered array is empty (1004). If so, the system returns no result (branch to 1008).

If the tiered array is not empty, the system determines whether i is after the last set index in the tiered array (1004). For example, the system need only to refer to the maintained metadata information for the tiered array, which records the last set index in the tiered array.

If i is after the last set index, the system returns no result (branch to 1008).

If not, the system determines whether i is at or before the first used index (branch to 1010). Again, the system can merely refer to the metadata information maintained for the tiered array and need not search the tiered array to determine whether i is before the first used index. If it is, the system simply returns the first used index (branch to 1012).

Otherwise, the system determines whether the tiered array contains a value at index i (branch to 1014). The system can determine this in constant time by converting i into three subindexes, and using the subindexes to identify a position in a bottom-level catalog of the tiered array. If that position has a set value, the system returns the index i (branch to 1014).

Otherwise, the system will search for the first set index after i in the tiered array (1016). For example, the system can proceed with the example process described above with respect to FIG. 9, or proceed with the example process described below with respect to FIG. 10.

Figure 10B:
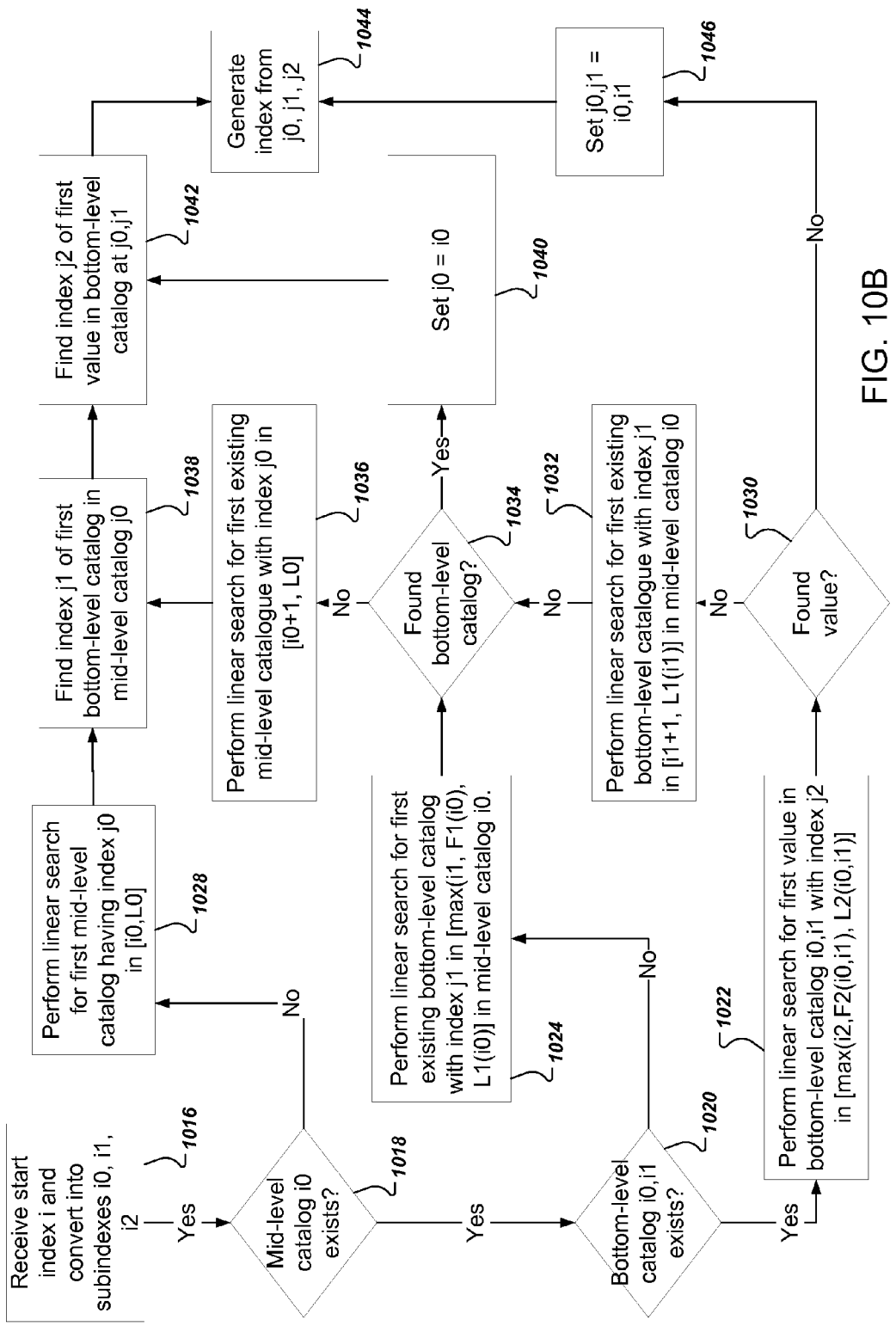
FIG. 10B is a flow chart of an example process for searching a tiered array for a first set index at or after a start index i.

FIG. 10B is a flow chart of an example process for searching a tiered array for a first set index at or after a start index i. The system can use metadata information associated with each of the catalogs of the tiered array and the tiered array itself in order to more efficiently find the first set index after i. The process will be described as being performed by an appropriately programmed system of one or more computers, e.g., the static analysis system 202 of FIG. 2.

The system receives a start index i and converts the start index into three subindexes i0, i1, and i2 (1016). i0 identifies a position in the top-level catalog, i1 identifies a position in a mid-level catalog, and i2 identifies a position in a bottom-level catalog.

The goal of the example process is an index j that identifies the first set index after i. The index j can be generated by its subindexes j0, j1, and j2.

The system determines whether the mid-level catalog identified by i0 exists (1018). If not, the system performs a linear search for the first catalog that exists in the range [i0, L0], wherein L0 is metadata that identifies the last mid-level catalog that exists.

The system finds the index j1 of the first bottom-level catalog in the mid-level catalog j0 (1038). Because the system maintains metadata indicating the first and last set values in each catalog, the system can perform this step in constant time.

The system finds the index j2 of the first value in the bottom-level catalog at j0,j1 (1042). The system can also perform this step in constant time using metadata.

The system then generates and returns an index j generated from the subindexes j0, j1, and j2 (1044).

If the mid-level catalog i0 exists (1018), the system determines whether the bottom-level catalog at i0,i1 exists (1020).

If not, the system performs a linear search for the first existing bottom-level catalog with index j1 in [max(i1, F1(i0)), L1(i0)] in mid-level catalog i0 (branch to 1024). The functions F1(i0) and L1(i0) respectively return the indexes of the first and last bottom-level catalogs having values that are referenced in the mid-level catalog i0.

The system determines whether a bottom-level catalog was found (1034). If not, the system performs a linear search for the first existing mid-level catalog with index j0 in [i0+1, L0], where L0 is the index of the last mid-level catalog having values (branch to 1036). The system then finds the index j1 of the first bottom-level catalog in the mid-level catalog j0 (1038).

If the system did not find a bottom-level catalog, the system sets j0=i0 (1040) and finds the index j1 of the first bottom-level catalog in the mid-level catalog j0 (branch to 1038).

If the bottom level catalog i0,i1 existed (1020), the system performs a linear search for the first value in the bottom-level catalog i0,i1 with index j2 in [max(i2,F2(i0,i1), L2(i0,i1)] (branch to 1022). The functions F2 and L2 respectively return the indexes of the first and last values in the bottom-level catalog at i0,i1.

The system determines whether a value was found (1030). If not, the system performs a linear search for the first existing bottom-level catalog with index j1 in [max(i1, F1(i0)), L1(i0)] in mid-level catalog i0 (branch to 1032).

If so, the system sets j0,j1 to i0,i1 (1046) and generates the result from j0, j1, and j2.

Figure 10C:
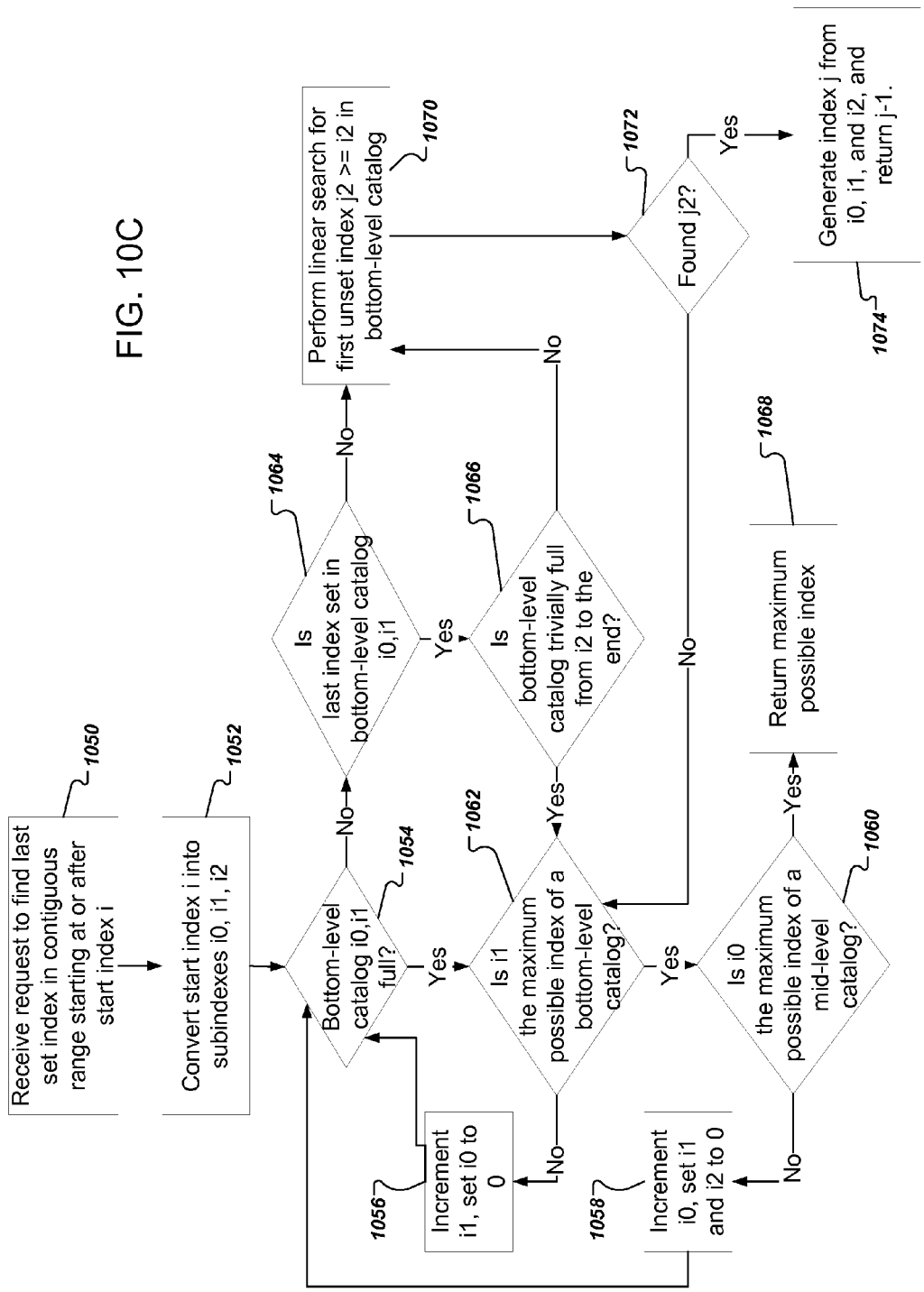
FIG. 10C is a flow chart of an example process for searching a tiered array for a last set index in a range of contiguous indexes start at or after a start index i.

FIG. 10C is a flow chart of an example process for searching a tiered array for a last set index in a range of contiguous indexes start at or after a start index i. The system can use metadata information associated with each of the catalogs of the tiered array and the tiered array itself in order to more efficiently find the last set index in the range. The process will be described as being performed by an appropriately programmed system of one or more computers, e.g., the static analysis system 202 of FIG. 2.

The system receives a request to find the last set index in a contiguous range starting at or after the start index i (1050). The system can perform the example process in FIG. 10C without actually having the start index of the range. Thus, the system could perform the example processes in FIGS. 10B and 10C in parallel.

The system converts the start index i into a subindexes i0, i1, and i2 (1052).

The system determines whether the bottom-level catalog i0,i1 is full (1054). The system can determine whether the bottom catalog is full by referring to metadata that maintains a number of set indexes in each catalog. If the bottom-level catalog is full, the system determines whether i1 is the maximum possible index of a bottom-level catalog (branch to 1062).

If so, the system increments i1 and sets i0 to 0 (branch to 1056). In other words, the system moves to the start of the next bottom-level catalog. The system then again determines if the bottom-level catalog at i0,i1 is full (1054).

If i1 is the maximum possible index of a bottom-level catalog (1062), the system determines whether i0 is the maximum possible index of a mid-level catalog (1060). If not, the system increments i0, and sets i1 and i2 to 0 (branch to 1058). In other words, the system moves to the start of the next mid-level catalog. The system then again determines if the bottom-level catalog at i0,i1 is full (1054).

If i0 is the maximum possible index of a mid-level catalog (1060), the system returns the maximum possible index (branch to 1068). In other words, if the system reaches the end of the last mid-level catalog and the last bottom-level catalog is full, the system can simply return the maximum possible index.

If the bottom-level catalog i0,i1 was not full (1054), the system determines if the last index is set in the bottom-level catalog i0,i1 (branch to 1064). If so, the system determines if the bottom-level catalog is trivially full from i2 to the end (1066). The system can use metadata to determine this if the first set value is the minimum for the catalog, the last set value if the maximum for the catalog, and the number of set values is equal to the size of the catalog.

If the bottom-level catalog is trivially full, the system again determines if i1 is the maximum possible index of a bottom-level catalog (branch to 1062).

Otherwise, the system performs a linear search for the first unset index j2>=i2 in the bottom-level catalog (1070). The system then determines whether such a j2 was found (1072). If not, the system has to effectively ascend a level, and the system determines whether i1 is the maximum possible index of a bottom-level catalog (branch to 1062).

If the system did find j2 (1072), the system generates the index j from i0, i1, and i2, and returns the value j−1.

To improve computational performance, instead of operating only on individual elements, a system can iteratively operate on ranges of contiguously set indexes. In the following description accompanying FIGS. 10D-E and 11-12, reference will be made to a function FindNextRange(X, n), which finds a contiguous range of set indexes in array X from a particular start index n. The function FindNextRange can be implemented, for example, as the process described above with reference to FIG. 9 or FIGS. 10A-C.

The structure of the tiered arrays and the deliberate arrangement of dependencies in contiguous ranges allows a system to efficiently compute operations over tiered arrays. The examples below will thus reference using tiered arrays to perform the operations. However, the procedures described below can also be performed on any appropriate data structure over which ranges of contiguously set indexes can be computed. In other words, a tiered array is not required to perform the range-based operations described in FIGS. 11-12.

In particular, the system can compute virtual bitwise compositions between tiered arrays, e.g., disjunctions, conjunctions, and inverses. A composition is a bitwise operation over indexes having non-default values. In this context, "virtual" indicates that neither a simple nor a tiered array is generated that represents the bitwise composition. Rather, the system is able to output a set of indexes that represents the bitwise composition without generating an array that represents the bitwise composition.

The set of indexes can be represented by one or more pairs of indexes representing contiguously set ranges of indexes. In other words, each pair has a start index and an end index that respectively identify the start and end of a contiguous range of indexes having non-default values. In the examples below, outputting indexes generally means outputting a start index and an end index representing a range of contiguously set indexes. However, a system can also individually output all indexes in the range.

Figure 10D:
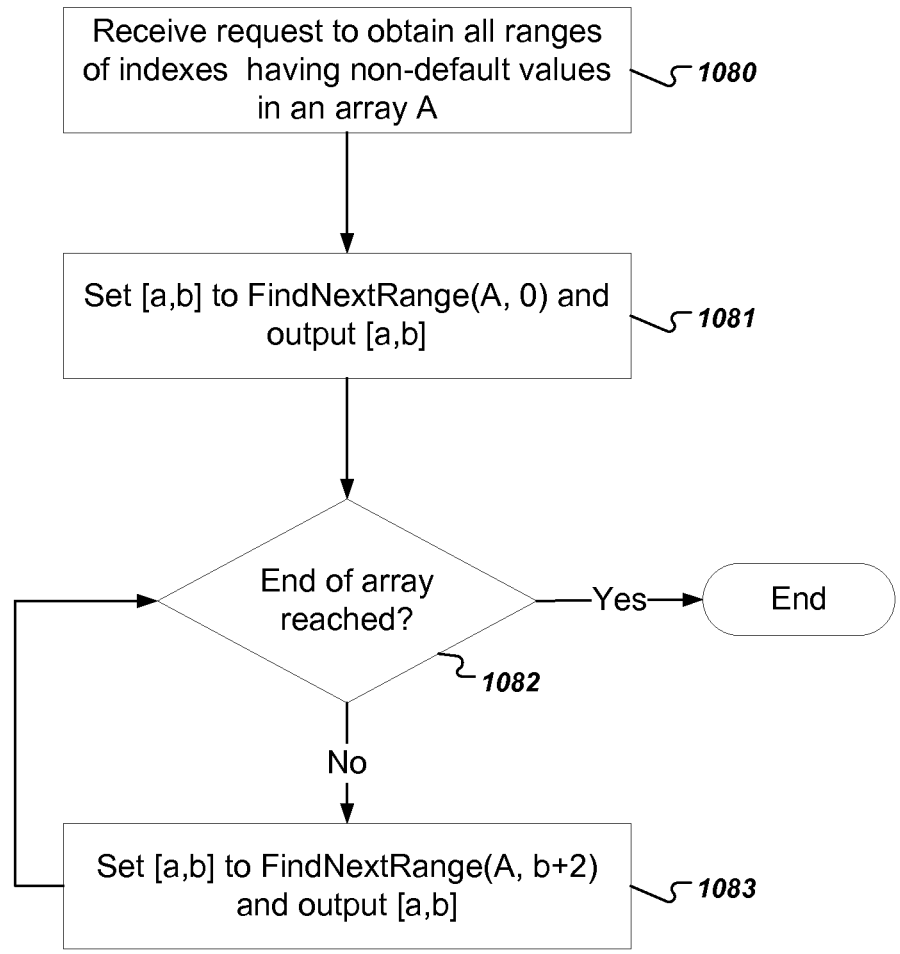
FIG. 10D is a flow chart of an example process for outputting all contiguous ranges of non-default values in a tiered array.

FIG. 10D is a flow chart of an example process for outputting all contiguous ranges of non-default values in a tiered array. The system can repeatedly use the FindNextRange procedure to output all maximal contiguous ranges in an array. The process will be described as being performed by an appropriately programmed system of one or more computers, e.g., the static analysis system 202 of FIG. 2.

The system receives a request to obtain all ranges of indexes having non-default values in an array A (1080). As described above, the array A can be a tiered array, but need not be.

The system sets [a,b] to the result of FindNextRange(A, 0) and outputs the range [a,b] (1081). In other words, the system finds the first index in the tiered array having a non-default value. To find this index, the system provides, to the FindNextRange function, a start index equal to a minimum start index, e.g., 0.

The system determines whether the end of the array has been reached (1082). If not, the system obtains the next range by setting [a,b] to the result of FindNextRange(A, b+2) and outputs the range [a,b] (1083). In other words, the system uses b, the end of the previously obtained range of set indexes, to find the next contiguously set range of indexes. It is known that b+1 is not set, thus, the system provides b+2 as a start index to the FindNextRange procedure.

The system again determines whether the end of the array has been reached (1082). If so, the process ends (branch to end). Otherwise, the system continues outputting ranges of contiguously set indexes (branch to 1083).

Figure 10E:
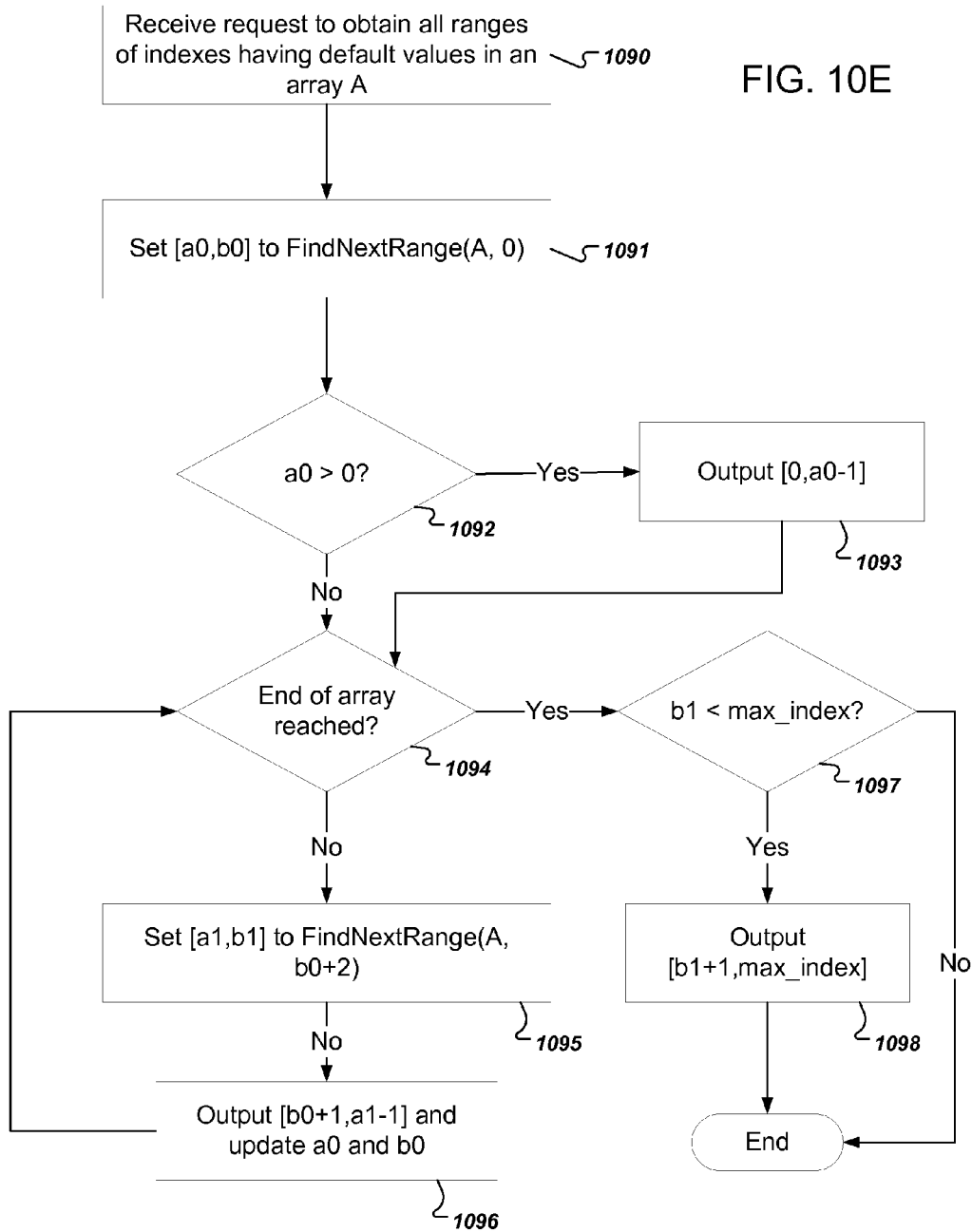
FIG. 10E is a flow chart of an example process for outputting all contiguous ranges of default values in a tiered array.

FIG. 10E is a flow chart of an example process for outputting all contiguous ranges of default values in a tiered array. In other words, the system will output ranges representing "NOT A," e.g., the inverse of A. Like FIG. 9B, the example process also repeatedly uses FindNextRange, but outputs the ranges representing the spaces between set indexes. The process will be described as being performed by an appropriately programmed system of one or more computers, e.g., the static analysis system 202 of FIG. 2.

The system receives a request to obtain all ranges of indexes having default values in an array A (1090). The array A can be a tiered array, but need not be.

The system sets [a0,b0] to the result of FindNextRange(A, 0) (1091). In other words, the system finds the first index in the tiered array having a non-default value. To find this index, the system provides, to the FindNextRange function, a start index equal to a minimum start index, e.g., 0.

The system determines whether a0>0 (1092). If a0, which represents the first set index in the array, is not the first index in the array, the system will output all indexes having the default value up to, but not including, a0. Thus, the system outputs [0, a0−1] (1093).

The system determines whether the end of the array has been reached (1094). If not, the system finds the next range by setting [a1,b1] to FindNextRange(A, b0+2) (branch to 1095). After finding the next range of contiguously set indexes, the system can output the space between the previous range of contiguously set indexes and the current range of contiguously set indexes.

Thus, the system outputs [b0+1, a1−1] and updates a0 and b0 (1096). The system updates a0 and b0 to represent the current range of contiguously set indexes.

If the end of the array has been reached (1094), the system then determines whether b1<max_index (1097). The value max_index represents the maximum index in the array. If b1 does not equal the maximum index, the system outputs the gap between the last range of contiguously set indexes and the end of the array.

Thus, the system outputs [b1+1, max_index] (branch to 1098). Otherwise, if b1=max_index, the process ends (branch to end).

Figure 11A:
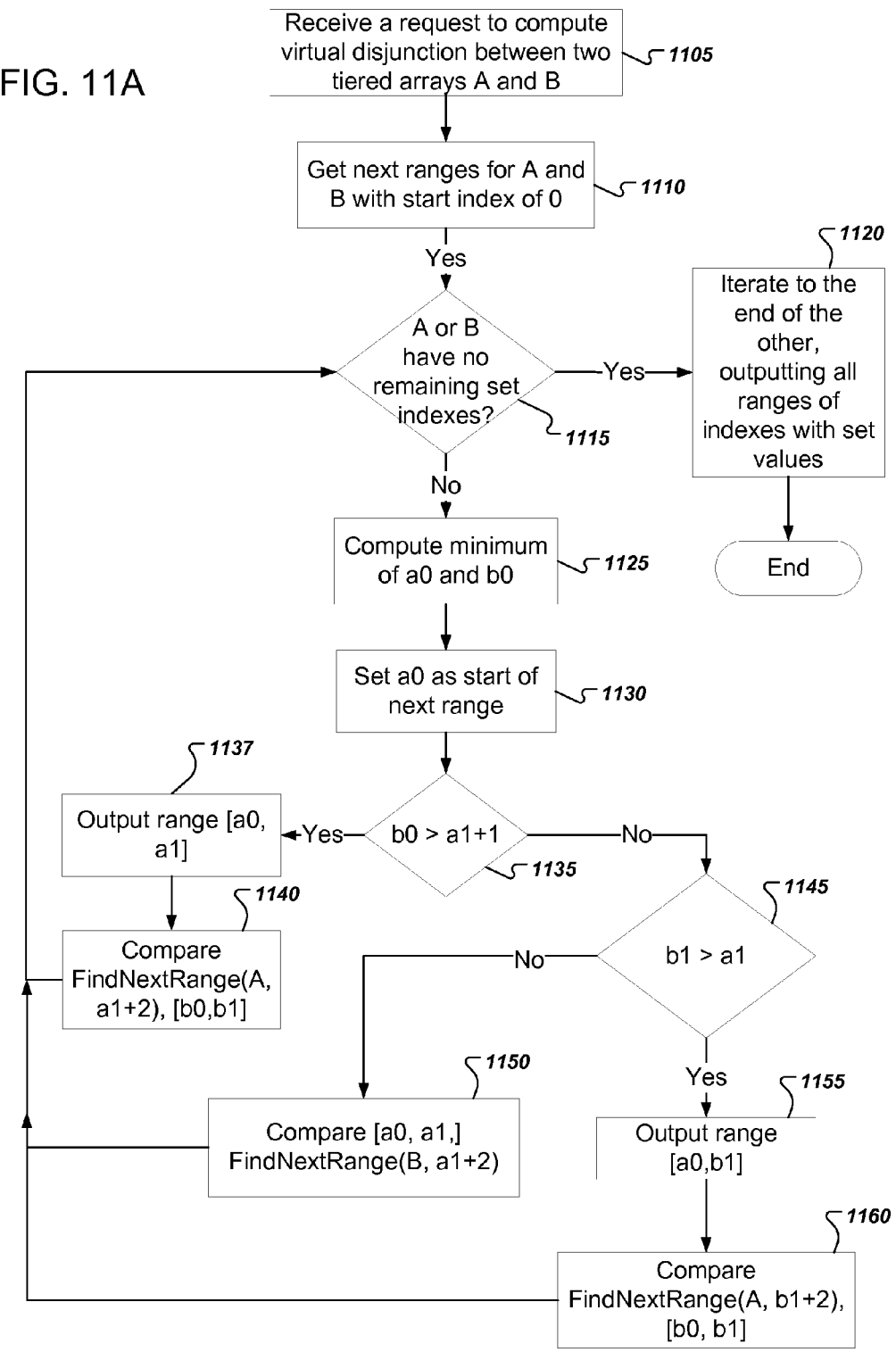
FIG. 11A is a flow chart of an example process for computing a virtual disjunction between two tiered arrays.

FIG. 11A is a flow chart of an example process for computing a virtual disjunction between two tiered arrays. The system will output a set of indexes representing a disjunction between two tiered arrays, which is a bitwise OR operation between the values represented by two tiered arrays. However, a tiered array representing the bitwise operation will not be generated. The process will be described as being performed by an appropriately programmed system of one or more computers, e.g., the static analysis system 202 of FIG. 2.

The system receives a request to compute a virtual disjunction between two tiered arrays A and B (1105). The system can compute a disjunction between two tiered arrays for a variety of purposes. For example, the system can compute a set of dependencies outbound from a source element A or any descendant of A by computing a disjunction between tiered arrays representing outbound dependencies for A and each of its descendants.

The system gets the next ranges for A and B with a start index of 0 (1110). In other words, the system computes the respective first ranges of contiguously set values for both A and B. The system can use the example process described above with reference to FIG. 9 or FIGS. 10A-C, providing as input to the process a starting index value of 0. The resulting range for A will be represented by a first index a0 at the start of the range of contiguously set values and a second index a1 at the end of the range. The resulting range for B will be represented similarly by b0 and b1.

The system determines whether A or B have no remaining indexes with set values (1115). In other words, if the range-finding process returns no results for either A or B, the system can determine that one of the tiered arrays has no remaining indexes with set values.

If so, the system iterates to the end of the other tiered array, outputting all ranges of indexes with set values (branch to 1120). For example, if B has no more indexes with set values, the system can simply output the remaining indexes in A. That is, because the virtual disjunction is a bitwise OR, the system need not inspect any more elements in B. The system need not actually output every set index, but can rather output a representation of ranges that each represent a sequence of contiguously set indexes.

Instead, the system simply outputs ranges of any remaining indexes in A. To do so, for A for example, the system can repeatedly call FindNextRange(A, a1+2) to obtain the next range [a0,a1], using each updated a1+2 as the next starting index. In other words, the system need not actually output each set index. Rather, the system can output the start and end of contiguous ranges of set indexes.

Because the system outputs maximal contiguous ranges, the index a1+1 is known to be not associated with a non-default value in A).

If both tiered arrays have remaining indexes, the system computes the minimum between a0 and b0 (branch to 1025). For clarity, in the rest of the description of the example process, it will be assumed that a0 was less than b0. However, the same techniques apply conversely if b0 is less than a0.

The system sets a0 as the start of a next range of contiguously set indexes in the disjunction (1130). Because [a0,a1] represents a contiguous range of set indexes, the result will include at least [a0,a1].

The system will then determine which index, a1 or b1 is the end of the next range in the disjunction.

The system determines whether b0>a1+1 (1135).

FIG. 11B illustrates ranges of indexes when a0<b0 and b0>a1+1. In this situation, [b0,b1] does not overlap a1+1, and thus a1+1 is not in the result, and the system outputs a maximal contiguous range [a0, a1] (1137). The next ranges to be compared are the next range from A and [b0,b1].

The system thus compares the range generated by FindNextRange(A, a1+2) to [b0,b1] (1140). The process then returns to step 1015 to determine whether the end of A or B has been reached.

If b0 was less than or equal to a1+1, the system determines whether b1>a1 (branch to 1145).

FIG. 11C illustrates ranges of indexes when a0<b0 and b1<=a1. In this situation, [a0,a1] completely overlaps [b0, b1]. But it is possible that B extends the range ending at a1. Therefore, the system compares the ranges [a0,a1] and FindNextRange(B, a1+2) (1150), and the process returns to step 1015 to determine whether the end of A or B has been reached.

FIG. 11D illustrates ranges of indexes when a0<=b0, a1>=b0, and b1>a1, i.e., [a0, a1] overlaps [b0, b1] and the latter extends contiguous range in the disjunction In this situation, the result includes indexes up to at least b1. Therefore, the system outputs the contiguous range [a0, b1] b1 (1155).

The system then compares the ranges FindNextRange(A, b1+2) and [b0, b1] (1160), and the process returns to step 1115 to determine whether the end of A or B has been reached.

Figure 11E:
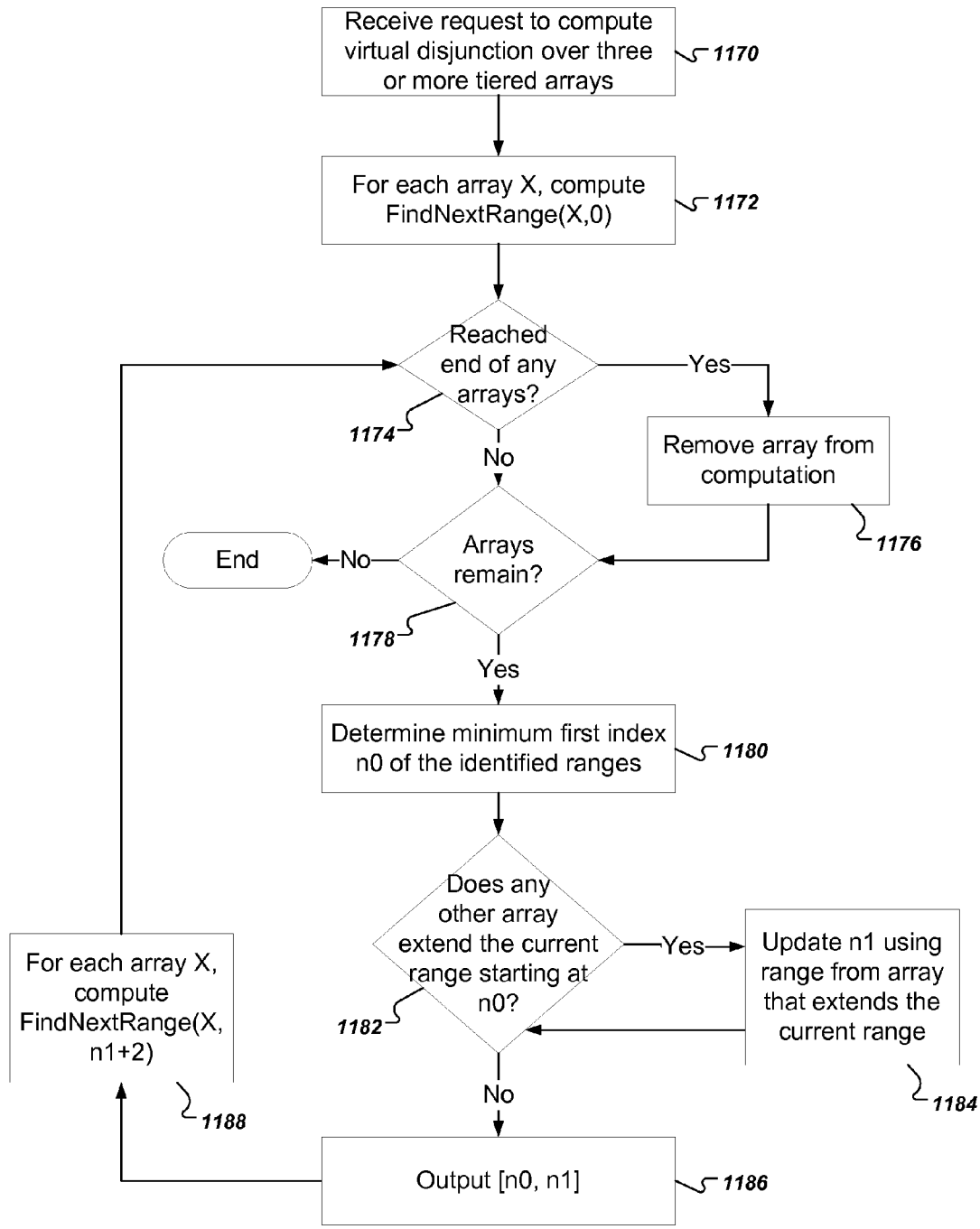
FIG. 11E is a flow chart of an example process for computing a virtual disjunction over an arbitrary number of arrays.

FIG. 11E is a flow chart of an example process for computing a virtual disjunction over an arbitrary number of arrays. The example process described above with reference to FIG. 11A computed a virtual disjunction between only two tiered arrays. However, the system can also use ranges of indexes to compute a virtual disjunction between an arbitrary number of tiered arrays simultaneously. The process will be described as being performed by an appropriately programmed system of one or more computers, e.g., the static analysis system 202 of FIG. 2.

The system receives a request to compute a virtual disjunction over three or more tiered arrays (1170).

For each array X, the system computes FindNextRange(X, 0) (1172). In other words, the system finds the first range of contiguously set indexes for each array.

The system determines whether the end of any of the arrays has been reached (1174). If so, the array will not contribute anything else to the result, so the system removes each array from the computation whose end has been reached (1176).

The system then determines whether any arrays remain (1178).

If so, the system determines the minimum first index n0 of the identified ranges (1180). The minimum first index is the start of a range [n0, n1] of contiguously set indexes in one of the tiered arrays.

The virtual disjunction will include at least [n0,n1], and the system will determine whether any of the other arrays can extend this range.

The system determines whether any other array extends the current range starting at n0 (1182). In other words, the system iterates over the other current ranges found for the other arrays to determine whether the arrays overlap and extend the range.

If so, the system updates n1 using the range from the array that extends the current range (branch to 1184). The system then repeatedly determines whether the range can be extended with any of the other ranges (1182).

When the range can no longer be extended by any of the current ranges, the system outputs the range [n0,n1] (1186).

The system then computes FindNextRange(X, n1+2) for each of the remaining arrays (1188).

The system then again removes arrays whose end has been reached (1174 and 1176) and determines whether any arrays remain (1178). If not, the process ends (branch to end).

Figure 12A:
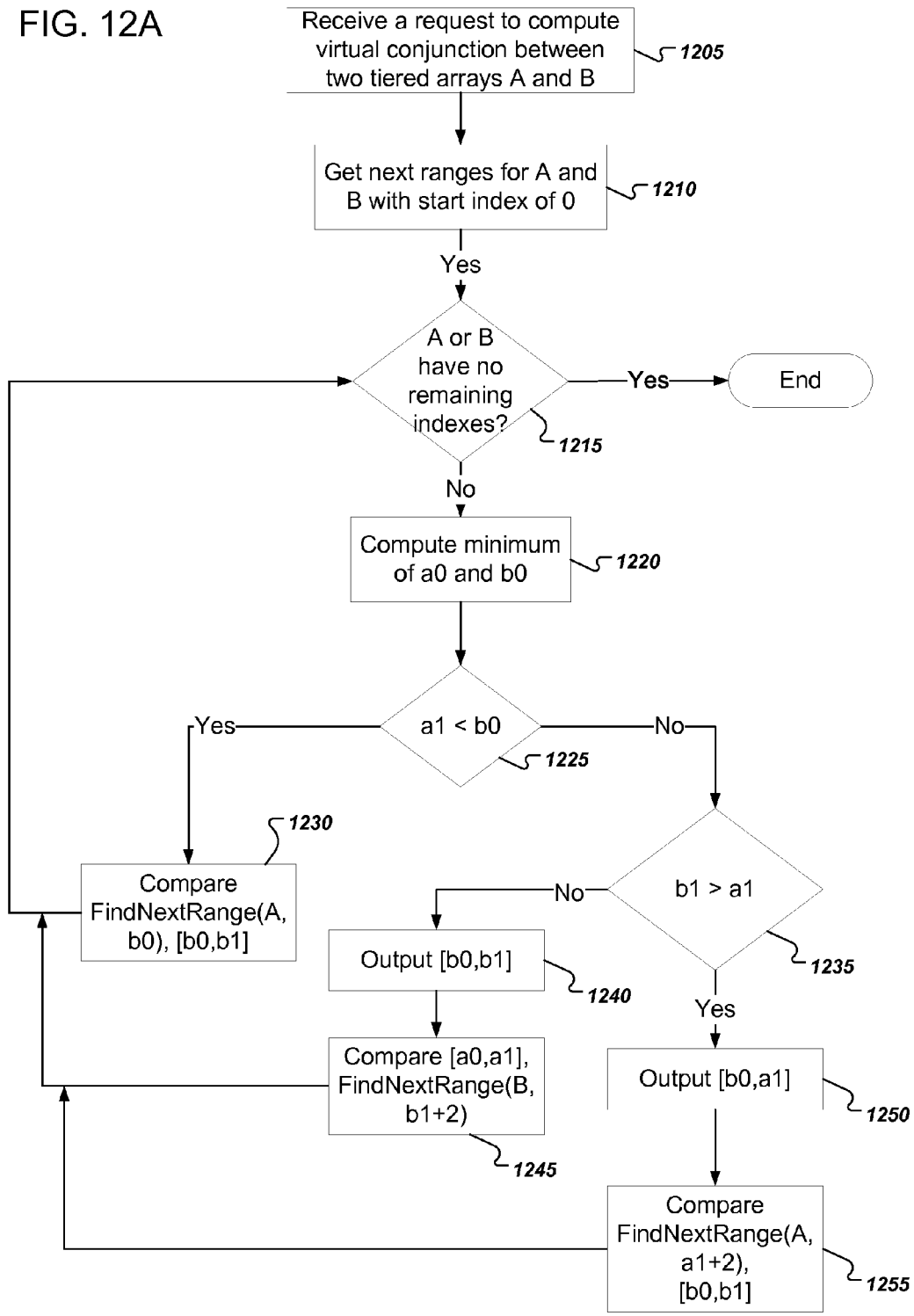
FIG. 12A is a flow chart of an example process for computing a virtual conjunction between two tiered arrays.

FIG. 12A is a flow chart of an example process for computing a virtual conjunction between two tiered arrays. The system will generate ranges representing a set of indexes equal to a conjunction between the two tiered arrays, which is a bitwise AND operation between the values represented by two tiered arrays. However, a tiered array representing the bitwise operation will not be generated. The process will be described as being performed by an appropriately programmed system of one or more computers, e.g., the static analysis system 202 of FIG. 2.

The system receives a request to compute a virtual conjunction between two tiered arrays A and B (1205). The system can compute a conjunction between two tiered arrays for a variety of purposes. For example, the system can compute aggregated dependencies between two software element nodes by computing an intersection between two sets of dependencies as described above with reference to FIG. 4.

The system gets the next ranges for A and B with a start index of 0 (1210). In other words, the system computes the respective first ranges of contiguously set values for both A and B. The system can use the example process described above with reference to FIG. 9 or FIGS. 10A-C, providing as input to the process a starting index value of 0. The resulting range for A will be represented by a first index a0 at the start of the range of contiguously set values and a second index a1 at the end of the range. The resulting range for B will be represented similarly by b0 and b1.

The system determines whether A or B have no remaining indexes with set values (1215). In other words, if the range-finding process returns no results for either A or B, the system can determine that one of the tiered arrays have no remaining indexes with set values. If so, the process ends because there can be no further indices in the conjunction (branch to end).

If both A and B have remaining indexes, the system computes the minimum between a0 and b0 (branch to 1220). For clarity, in the rest of the description of the example process, it will be assumed that a0 was less than b0. However, the same techniques apply conversely if b0 is less than a0.

The system determines whether a1<b0 (1225).

FIG. 12B illustrates ranges of indexes when a1<b0. In this situation, [a0,b1] and [b1,b0] do not overlap at all. Therefore, the conjunction between those two ranges will not yield any indexes in the result.

Thus, the system next compares ranges FindNextRange(A, b0) and [b0,b1] (1230), and the process returns to step 1215 to determine whether the end of A or B has been reached.

If a1 was greater than or equal to b0, the system determines whether b1>a1 (1235).

FIG. 12C illustrates ranges of indexes when a0<b0 and b1<=a1. In this situation, [a0,a1] completely overlaps [b0, b1]. Therefore, the result will include at least [b0,b1].

Therefore, the system outputs the contiguous range [b0, b1] (1240).

The next range in B could still overlap part of [a0,a1], so the system next compares ranges [a0,a1] and FindNextRange(B, b1+2) (1245), and the process returns to step 1215 to determine whether the end of A or B has been reached.

FIG. 12D illustrates ranges of indexes when a0<b0 and b1>a1. In this situation, the result will include at least the range [b0,a1]. Therefore, the system outputs the contiguous range [b0, a1] (1250).

The next range in A could still overlap part of [b0,b1], so the system next compares ranges FindNextRange(A, a1+2) and [b0, b1] (1255), and the process returns to step 1215 to determine whether the end of A or B has been reached.

Iterating over ranges of contiguously set indexes also provides opportunities for efficient counting of set values in the arrays, since the total number of indices with which a non-default value is associated can be found by iterating over the contiguous ranges in the result and accumulating the sum of their lengths. This applies equally to the counting of indices in the result of a composition.

Figure 12E:
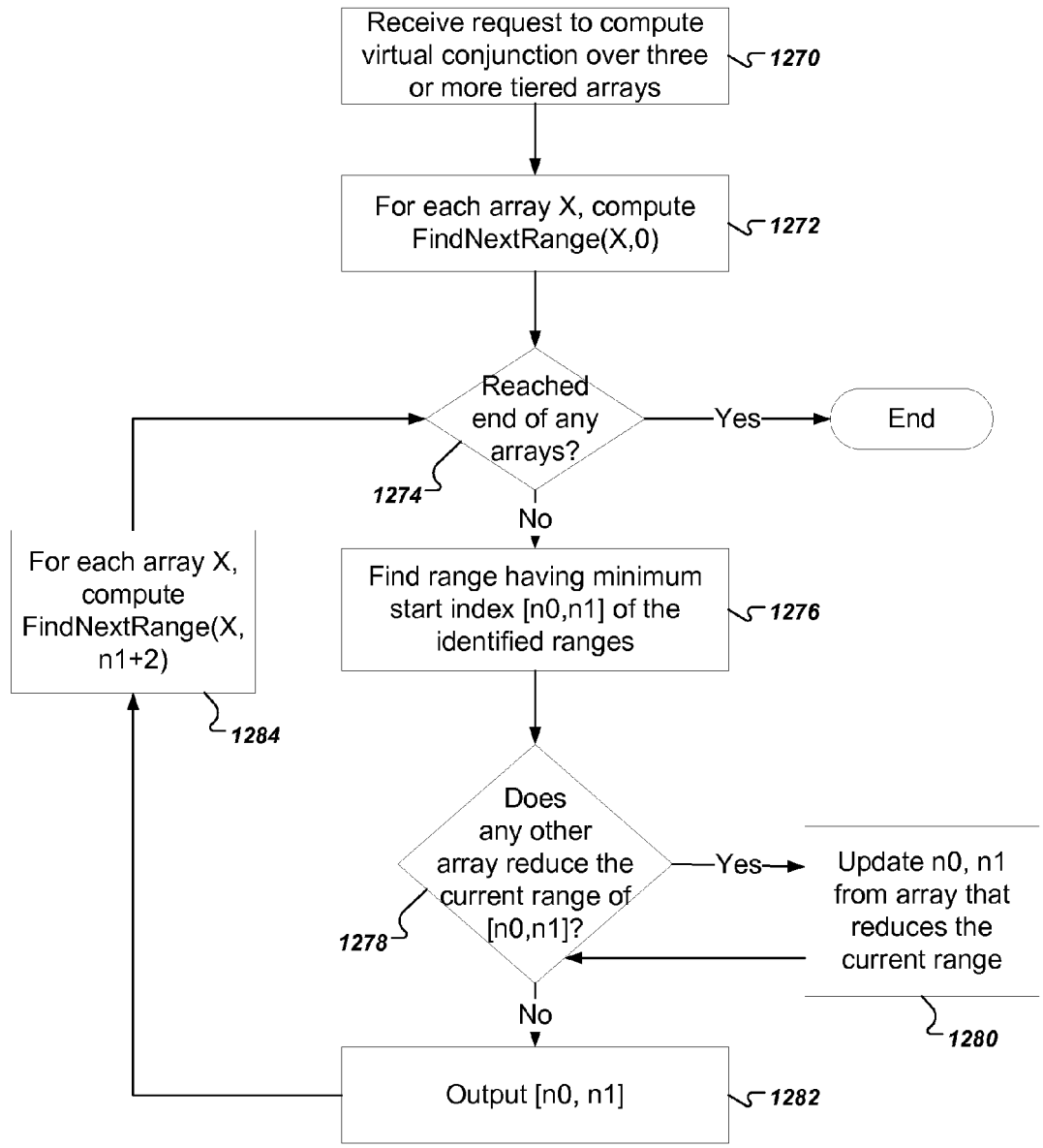
FIG. 12E is a flow chart of an example process for computing a virtual conjunction over an arbitrary number of arrays.

FIG. 12E is a flow chart of an example process for computing a virtual conjunction over an arbitrary number of arrays. The example process described above with reference to FIG. 12A computed a virtual conjunction between only two tiered arrays. However, the system can also use ranges of indexes to compute a virtual conjunction between an arbitrary number of tiered arrays simultaneously. The process will be described as being performed by an appropriately programmed system of one or more computers, e.g., the static analysis system 202 of FIG. 2.

The system receives a request to compute a virtual conjunction over three or more tiered arrays (1270).

For each array X, the system computes FindNextRange(X, 0) (1272). In other words, the system finds the first range of contiguously set indexes for each array.

The system determines whether the end of any of the arrays has been reached (1274). If so, the conjunction cannot have any additional ranges, so the process ends (branch to end).

Otherwise, the system determines the minimum first index n0 of the identified ranges (1276). The minimum first index is the start of a range [n0, n1] of contiguously set indexes in one of the tiered arrays.

The virtual conjunction will include at most [n0,n1], and the system will determine whether any of the other arrays reduce this range where they do not have overlapping ranges.

The system determines whether any other array reduces the current range starting at n0 (1278). In other words, the system iterates over the other current ranges found for the other arrays to determine whether the arrays do not overlap the range.

If so, the system updates n0 and n1 using the range from the array that reduces the current range (branch to 1280). The system then repeatedly determines whether the range can be extended with any of the other ranges (1278).

When the range can no longer be reduced by any of the current ranges, the system outputs the range [n0,n1] (1282).

The system then computes FindNextRange(X, n1+2) for each of the remaining arrays (1284).

The system then again determines whether the end of any array has been reached (1274), and if so, the process ends (branch to end).

By computing virtual disjunctions, conjunctions, and logical "NOT" by iterating over ranges, a system can use the ranges to compute any arbitrary nested virtual composition. For example, to compute "A or not B," the system can compute a virtual disjunction, e.g., as described above with reference to FIG. 11A, using between the ranges output by A, e.g., as described above with reference to FIG. 9B, and the ranges output by NOT the inverse of B, e.g., as described above with reference to FIG. 9C.

The system can effectively nest the virtual composition processes by using a virtual composition process in place of FindNextRange. For example, to compute the virtual nested composition "A or (B and C)," the system can compute virtual disjunction between A and the virtual conjunction of B and C. Instead of using FindNextRange in the virtual disjunction process, the system can compute the next range of a virtual conjunction for "B and C".

This also allows the system compute other compositions, e.g., "A implies B," which is logically equivalent to "B or not A," as well as a "without" operation, e.g., "A without B," which is logically equivalent to "A and not B."

Figure 13:
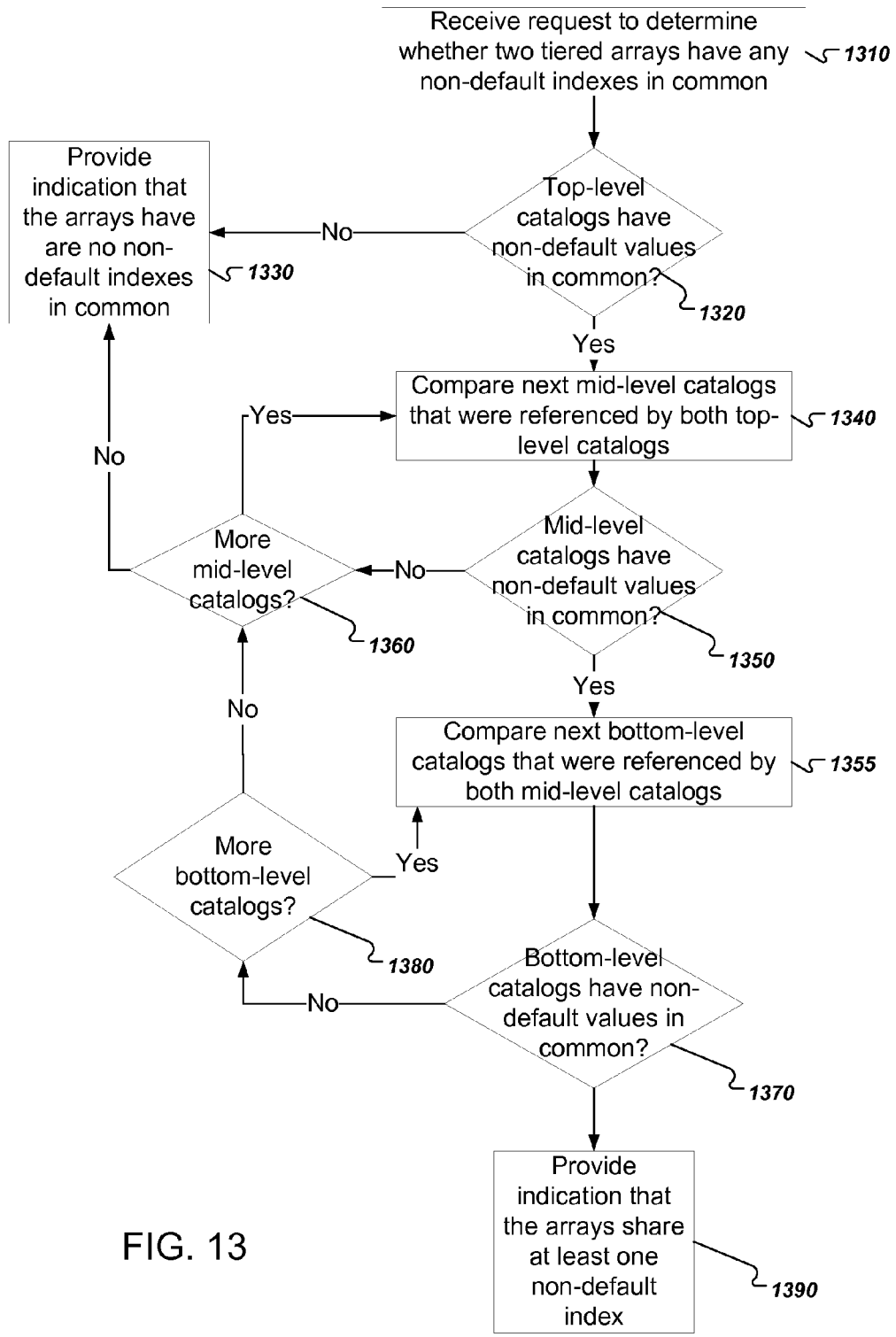
FIG. 13 is a flow chart of an example process for determining whether two tiered arrays have any non-default indexes in common.

FIG. 13 is a flow chart of an example process for determining whether two tiered arrays have any non-default indexes in common. The system can exploit the structure of the tiered arrays to efficiently determine whether the arrays share at least one index having a non-default value. This process can prevent a system from computing a full virtual conjunction between arrays that do not share data elements. The example process operates on a tiered array having three tiers. However, the process can also be applied equivalently to other tiered arrays having more or fewer tiers. The process will be described as being performed by an appropriately programmed system of one or more computers, e.g., the static analysis system 202 of FIG. 2.

The system receives a request to determine whether two tiered arrays have any non-default indexes in common (1310). For example, the system can perform this check before each request to compute a virtual conjunction and then only compute the virtual conjunction for pairs of arrays that share at least one non-default index.

The system determines whether the top-level catalogs have non-default values in common (1320). If the top-level catalogs do not share at least one non-default value, the two arrays cannot have any intersecting indexes. Thus, the system provides an indication that the arrays have no non-default indexes in common (1330).

Otherwise, the system compares the next mid-level catalogs that were referenced by both top-level catalogs (1340). For each pair of mid-level catalogs referenced by both top-level catalogs, the system determines whether the mid-level catalogs have non-default values in common (1350). If they don't, the mid-level catalogs cannot have any intersecting indexes and the system moves on to determine if there are more mid-level catalogs to compare (branch to 1360).

If there are more mid-level catalogs to compare (1360), the system compares the next midlevel catalogs that were referenced by both top-level catalogs (branch to 1340). Otherwise, the system provides an indication that the arrays have no non-default indexes in common (branch to 1330).

If a pair of mid-level catalogs had non-default values in common (1350), the system compares the next bottom-level catalogs that were referenced by both mid-level catalogs (1355).

For each pair of mid-level catalogs referenced by both mid-level catalogs, the system determines whether the bottom-level catalogs have non-default values in common (1370). If they do, the system immediately ends the process and provides an indication that the arrays share at least one non-default index (1390). Because the system is only testing for non-emptiness of a virtual conjunction, the system need not make any other comparisons.

If a pair of bottom-level catalogs do not have non-default values in common (1370), the system moves on to determine if there are more bottom-level catalogs to compare (branch to 1380). Because the system is testing for non-emptiness by finding at least one non-default index, the system thus compares all bottom-level catalogs before proceeding to examine other mid-level catalogs.

Thus, if there are more bottom-level catalogs to compare, the system compares the next bottom-level catalogs that were referenced by both mid-level catalogs (1355). Otherwise, the system determines whether there are more mid-level catalogs to compare (1360).

The structure of tiered arrays also provides for efficient mechanisms for counting a number of non-default values represented by a tiered array. Two of such techniques are described with reference to FIGS. 14A-B.

Figure 14A:
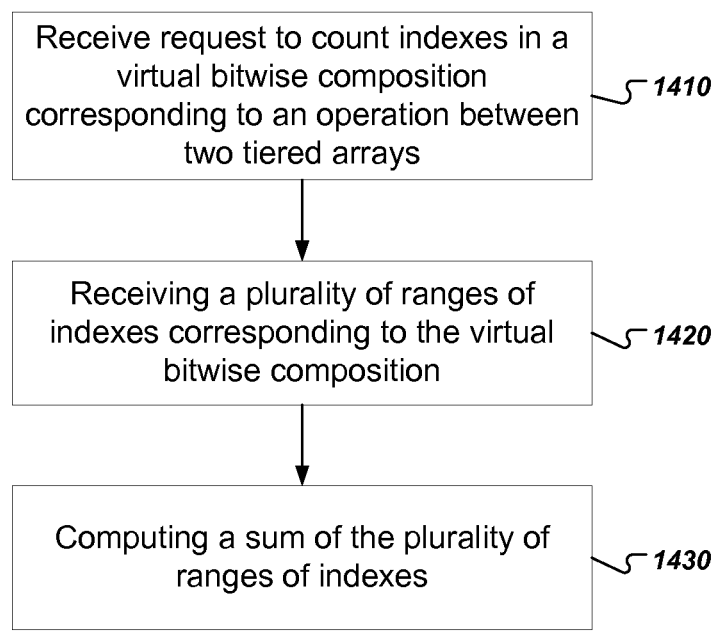
FIG. 14A is a flow chart of an example process for counting a number of indexes having set values in a virtual tiered array.

FIG. 14A is a flow chart of an example process for counting a number of indexes having set values in a virtual tiered array. The process will be described as being performed by an appropriately programmed system of one or more computers, e.g., the static analysis system 202 of FIG. 2.

The system receives a request to compute a virtual bitwise composition between two tiered arrays (1410). As described above, the virtual bitwise composition can be a disjunction, conjunction, inverse, or nested composition thereof. The count of indexes having set values can be used for a number of purposes, e.g., for the searching process described below with reference to FIG. 15.

The system receives a plurality of ranges of indexes corresponding to the virtual bitwise composition (1420). The system need not actually compute the full result of the virtual bitwise composition in order to count the number of elements. Rather, the system can perform a similar process to that described above with reference to FIG. 11 and FIG. 13. Instead of outputting each index that is in the result, the system can simply output the start and end of ranges of contiguous values in the result. For example, instead of outputting 130, 131, 132, 133, the system can instead output [130, 133].

The system computes a sum of the plurality of ranges (1430). Rather than iterating through the individual indexes of the result of the bitwise composition, the system can instead compute a subcount for each range and then sum the subcounts. For example, for each range [a0,a1], the system can compute the subcount as a1−a0+1.

Figure 14B:
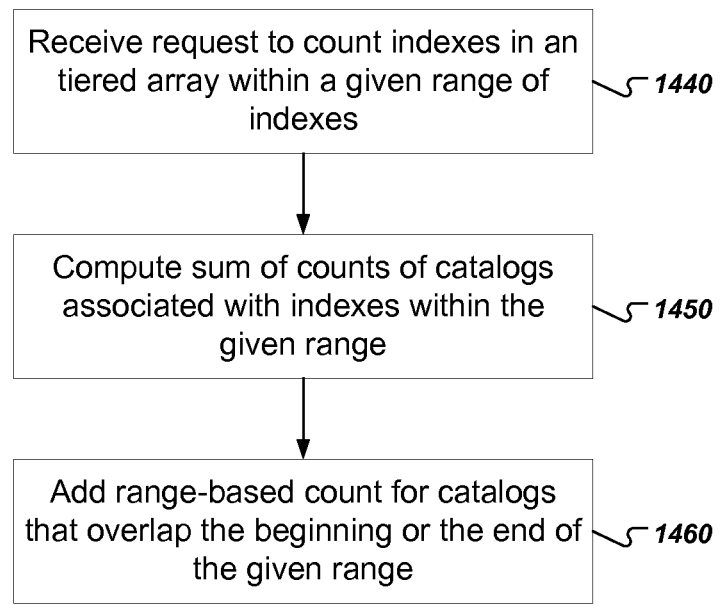
FIG. 14B is a flow chart of an example process for counting a number of indexes having set values in a tiered array.

FIG. 14B is a flow chart of an example process for counting a number of indexes having set values in a tiered array. The process will be described as being performed by an appropriately programmed system of one or more computers, e.g., the static analysis system 202 of FIG. 2.

The system receives a request to count indexes within a given range of indexes for a tiered array (1440).

The system computes a sum of counts of indexes with which a non-default value is associated over all catalogs fully contained within the given range (1450). The system can maintain, for each catalog in the tiered array, a metadata structure that stores this count of indexes having set values in the catalog. The system can update the count for a catalog whenever a value is set or removed from the catalog. The system can access the metadata structure to obtain counts of catalogs within the given range of indexes and sum the result.

To compute the count over an arbitrary range, the system then adds a range-based count of set indices over the portions of the range at its start and end that only partially overlap the catalogue that contains them, if, in each case, those ranges exist) (1460). The system can use the range finding function to determine whether any ranges overlap the start or end of the given range.

In other words, if the given range is [x,y], the system can use FindNextRange(A, x)—repeatedly if necessary, to count over the initial portion that only partially overlaps a catalogue, and FindNextRange(A, y')—repeatedly if necessary, to count over the final portion that only partially overlaps a catalogue, where y' is the first index in the catalogue that is only partially overlapped at the end of the counted range [x, y].

Figure 15:
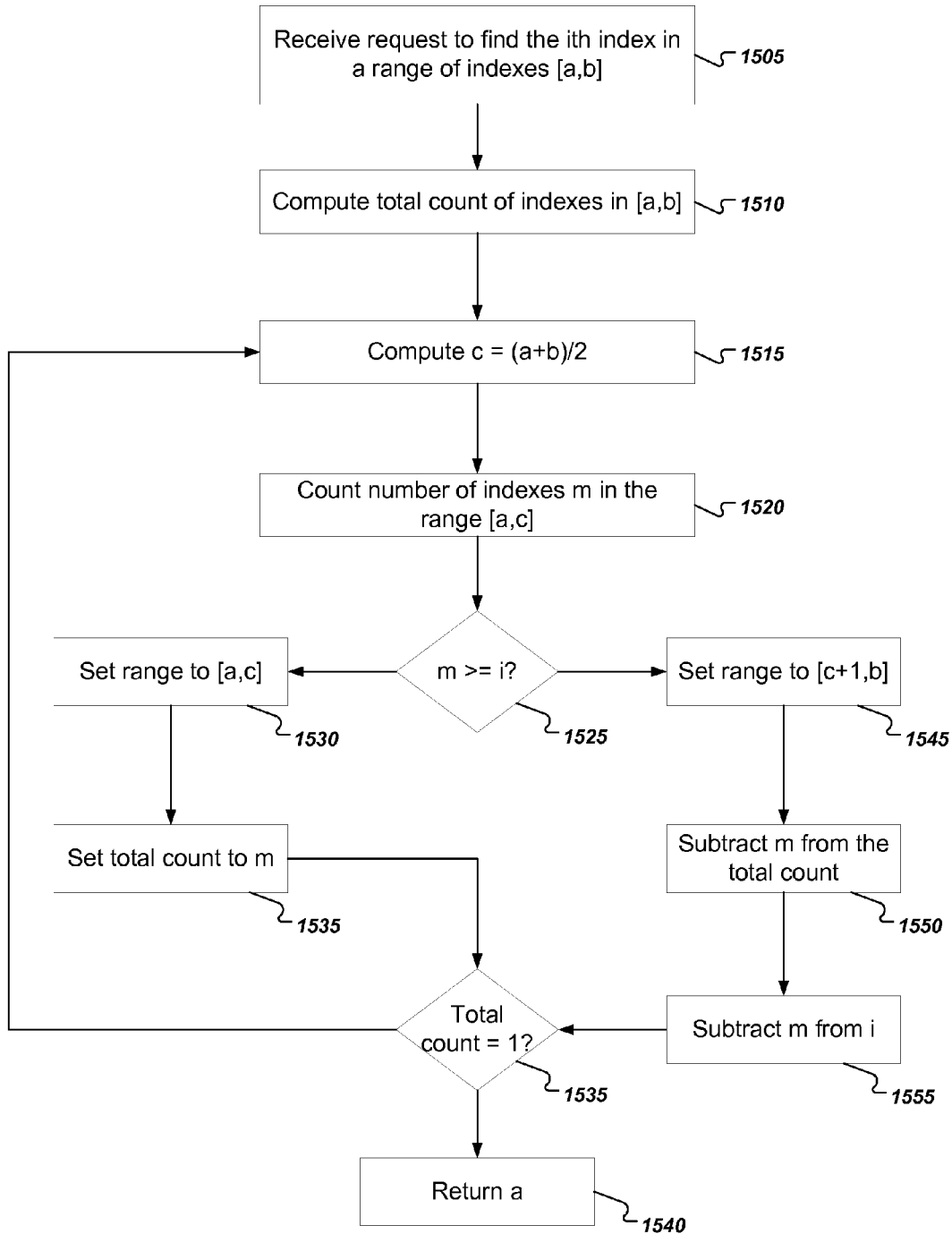
FIG. 15 is a flow chart of an example process for searching for the ith index of a virtual composition.

FIG. 15 is a flow chart of an example process for searching for the ith index of a virtual composition. In general, the system repeatedly uses range-based counting to bisect the virtual composition until the ith index of the virtual composition is found. The process will be described as being performed by an appropriately programmed system of one or more computers, e.g., the static analysis system 202 of FIG. 2.

The system receives a request to find the ith index of a virtual composition (1505). As described above, a virtual composition can be generated between two tiered arrays. The tiered arrays are actually represented in memory, but the virtual composition is represented as ranges of contiguously set indexes and may be generated on the fly.

As described above with reference to FIG. 6F, some user interface presentations may display a list of dependencies in response to a user selection. The dependencies to be displayed may be part of a virtual composition rather than an actually physically represented tiered array. Thus, in order to display the ith dependency of the virtual composition, the system can perform a search over the ranges of the virtual composition using range-based counting. When the ith dependency of the virtual composition has been found, the system can obtain subsequent dependencies simply from the subsequent indexes in the ranges of the virtual composition.

The system computes a count of indexes in [a,b] (1510). The system can use the example process in FIG. 13, for example. In some implementations, a is initialized to the minimum possible index, and b is initialized to the maximum possible index.

The system computes c=(a+b)/2 (1515). The value c bisects the range between a and b.

The system counts a number of indexes m having set values in the range [a,c] (1520). The system can again use the example process in FIG. 13.

The system determines whether m>=i (1525). If m<i, then the ith index occurs in the range [a,c]. Otherwise, the ith index occurs in the range [c+1,b].

If m<i, the system sets the range to [a,c] (1530). In other words, the system reassigns the previous value of b in [a,b] to be the value of c.

The system sets the total count to m (1535). The total count now represents the number of elements in [a,c].

The system determines whether the total count is 1 (1535). If the total count is 1, then the index a represents the requested index, and the system returns a as the requested index (branch to 1540).

If the total count is not 1, the process returns to step 1515 to bisect the current range again (branch to 1515).

If m was greater than or equal to i (1525), the system sets the range to be [c+1,b] (branch to 1545).

The system subtracts m from the total count (1550). The system can take advantage of the fact that the number of indexes in [a,c] has already been computed. Thus, the system need not explicitly count the indexes in [c+1,b].

The system subtracts m from i (1555). For example, if m was 7 and i was 9, after bisecting the range [a,b] to [c+1,b], the system will then be searching for the 2nd index in the bisected range.

The system can also use example process to compute the ith index of an actual tiered array rather than a virtual composition. However, when using a tiered array, the system can significantly speed up the process by making use of the structure of the tiered array and the auxiliary data that records a number of set indexes within each catalog.

For example, to start the process, the system can obtain, from the auxiliary data a minimum index and a maximum index having non-default values. The system can set [a,b] to be the values of the minimum index and the maximum index to limit the bisective search to that range.

In addition, the system can align the bisected ranges with the catalogs in order to make use of the auxiliary counting data within mid-level and bottom-level catalogs. In other words, each bisection exactly splits a range along a boundary between catalogs. Then, when the range fits within one single catalog, the system can find the ith index by performing a linear search through the single catalog.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request for a plurality of dependencies inbound to or outbound from a node in a raw dependency graph of software elements in a project, wherein each node in the raw dependency graph represents a software element in the project, and wherein each link in the raw dependency graph represents a software dependency of a first software element on a second software element;
identifying a tiered array representing the plurality of dependencies for the node in the raw dependency graph, the tiered array having a plurality of tiers, wherein each tier of the tiered array comprises one or more catalogs, wherein each catalog in each tier, except for a bottom-most tier, stores (i) non-default elements that each identify a respective catalog at a lower tier and (ii) default elements that do not identify any catalogs, and
wherein each bottom-most catalog in the bottom-most tier stores one or more non-default values, each non-default value being stored at a respective index value in the bottom-most catalog, the non-default value representing that the plurality of dependencies for the node includes a dependency identified by the index value;
setting a reference index to be initially equal to a minimum index, the minimum index corresponding to a dependency that is first in an ordering of the plurality of dependencies;
repeatedly performing a search, from the reference index, for a next contiguous sequence of indexes having non-default values to generate pairs of index values representing ranges of contiguous indexes having non-default values until reaching an end of indexes having non-default values in the tiered array, including:
converting the reference index into a first subindex into a top-level catalog of the tiered array;
iterating through the top-level catalog from the first subindex to identify a first non-default element in the top-level catalog;
descending one or more tiers from the first non-default element in the top-level catalog to identify a first index that (i) is greater than or equal to the reference index and (ii) has a non-default value,
after identifying the first index, ascending one or more tiers in the tiered array and subsequently descending to identify a second index that is a last index in a contiguous sequence of indexes having non-default values from the first index up to and including the second index,
generating a pair of indexes comprising the first index and the second index, and
updating the reference index to be equal to an index greater than the second index; and
providing the generated pairs of index values identifying the plurality of dependencies for the node in response to the request.

2. The method of claim 1, further comprising:
after ascending one tier in the tiered array to a first catalog, determining that the next element in the first catalog is a non-default element; and
in response, descending one tier to a catalog identified by the non-default element.

3. The method of claim 1, wherein descending one or more tiers in the tiered array comprises:
identifying, at each catalog in the one or more tiers, a first non-default element; and
descending to a lower-tier catalog identified by the first non-default element.

4. The method of claim 1, wherein ascending one or more tiers in the tiered array comprises determining that a particular catalog does not have any more non-default elements.

5. The method of claim 1, further comprising:
determining that a particular non-bottom-most catalog does not have a subsequent non-default element; and
designating the last index of the bottom-most catalog as the last index in a range of indexes having non-default values.

6. The method of claim 1, further comprising:
obtaining, for a particular catalog, auxiliary data that specifies a first non-default element and a last non-default element of the catalog; and
limiting the search within the catalog to elements between the first non-default element and the last non-default element of the catalog.

7. The method of claim 1, further comprising:
obtaining, for a particular catalog, auxiliary data that specifies a first non-default element of the catalog, a last non-default element of the catalog, and a number of non-default elements in the catalog;

determining that a difference between index values for the first non-default element and the last non-default element indicates that all elements in the catalog are non-default elements; and in response, bypassing a linear search of the particular catalog.

8. The method of claim 1, further comprising:

obtaining, for a particular catalog, auxiliary data that specifies a number of non-default elements in the catalog;

determining that the auxiliary data indicates that the particular catalog has no non-default elements; and in response, bypassing a linear search of the particular catalog.

9. The method of claim 1, further comprising providing a user interface presentation that presents data representing one or more of the plurality of dependencies inbound to or outbound from the node.

10. A system comprising:

one or more computers and one or more storage devices storing instructions that are operable, when executed by the one or more computers, to cause the one or more computers to perform operations comprising:

receiving a request for a plurality of dependencies inbound to or outbound from a node in a raw dependency graph of software elements in a project, wherein each node in the raw dependency graph represents a software element in the project, and wherein each link in the raw dependency graph represents a software dependency of a first software element on a second software element;

identifying a tiered array representing the plurality of dependencies for the node in the raw dependency graph, the tiered array having a plurality of tiers, wherein each tier of the tiered array comprises one or more catalogs, wherein each catalog in each tier, except for a bottom-most tier, stores (i) non-default elements that each identify a respective catalog at a lower tier and (ii) default elements that do not identify any catalogs, and wherein each bottom-most catalog in the bottom-most tier stores one or more non-default values, each non-default value being stored at a respective index value in the bottom-most catalog, the non-default value representing that the plurality of dependencies for the node includes a dependency identified by the index value;

setting a reference index to be initially equal to a minimum index, the minimum index corresponding to a dependency that is first in an ordering of the plurality of dependencies;

repeatedly performing a search, from the reference index, for a next contiguous sequence of indexes having non-default values to generate pairs of index values representing ranges of contiguous indexes having non-default values until reaching an end of indexes having non-default values in the tiered array, including:

converting the reference index into a first subindex into a top-level catalog of the tiered array;

iterating through the top-level catalog from the first subindex to identify a first non-default element in the top-level catalog;

descending one or more tiers from the first non-default element in the top-level catalog to identify a first index that (i) is greater than or equal to the reference index and (ii) has a non-default value, after identifying the first index, ascending one or more tiers in the tiered array and subsequently descending to identifying a second index that is a last index in a contiguous sequence of indexes having non-default values from the first index up to and including the second index, generating a pair of indexes comprising the first index and the second index, and updating the reference index to be equal to an index greater than the second index; and providing the generated pairs of index values identifying the plurality of dependencies for the node in response to the request.

11. The system of claim 10, wherein the operations further comprise:

after ascending one tier in the tiered array to a first catalog, determining that the next element in the first catalog is a non-default element; and in response, descending one tier to a catalog identified by the non-default element.

12. The system of claim 10, wherein descending one or more tiers in the tiered array comprises:

identifying, at each catalog in the one or more tiers, a first non-default element; and descending to a lower-tier catalog identified by the first non-default element.

13. The system of claim 10, wherein ascending one or more tiers in the tiered array comprises determining that a particular catalog does not have any more non-default elements.

14. The system of claim 10, wherein the operations further comprise:

determining that a particular non-bottom-most catalog does not have a subsequent non-default element; and designating the last index of the bottom-most catalog as the last index in a range of indexes having non-default values.

15. The system of claim 10, wherein the operations further comprise:

obtaining, for a particular catalog, auxiliary data that specifies a first non-default element and a last non-default element of the catalog; and limiting the search within the catalog to elements between the first non-default element and the last non-default element of the catalog.

16. The system of claim 10, wherein the operations further comprise:

obtaining, for a particular catalog, auxiliary data that specifies a first non-default element of the catalog, a last non-default element of the catalog, and a number of non-default elements in the catalog;

determining that a difference between index values for the first non-default element and the last non-default element indicates that all elements in the catalog are non-default elements; and in response, bypassing a linear search of the particular catalog.

17. The system of claim 10, wherein the operations further comprise:

obtaining, for a particular catalog, auxiliary data that specifies a number of non-default elements in the catalog;

determining that the auxiliary data indicates that the particular catalog has no non-default elements; and in response, bypassing a linear search of the particular catalog.

18. The system of claim 10, wherein the operations further comprise providing a user interface presentation that presents data representing one or more of the plurality of dependencies inbound to or outbound from the node.

19. A computer program product, encoded on one or more non-transitory computer storage media, comprising instructions that when executed by one or more computers cause the one or more computers to perform operations comprising:

receiving a request for a plurality of dependencies inbound to or outbound from a node in a raw dependency graph of software elements in a project, wherein each node in the raw dependency graph represents a software element in the project, and wherein each link in the raw dependency graph represents a software dependency of a first software element on a second software element;

identifying a tiered array representing the plurality of dependencies for the node in the raw dependency graph, the tiered array having a plurality of tiers, wherein each tier of the tiered array comprises one or more catalogs, wherein each catalog in each tier, except for a bottom-most tier, stores (i) non-default elements that each identify a respective catalog at a lower tier and (ii) default elements that do not identify any catalogs, and wherein each bottom-most catalog in the bottom-most tier stores one or more non-default values, each non-default value being stored at a respective index value in the bottom-most catalog, the non-default value representing that the plurality of dependencies for the node includes a dependency identified by the index value;

setting a reference index to be initially equal to a minimum index, the minimum index corresponding to a dependency that is first in an ordering of the plurality of dependencies;

repeatedly performing a search, from the reference index, for a next contiguous sequence of indexes having non-default values to generate pairs of index values representing ranges of contiguous indexes having non-default values until reaching an end of indexes having non-default values in the tiered array, including:

converting the reference index into a first subindex into a top-level catalog of the tiered array;

iterating through the top-level catalog from the first subindex to identify a first non-default element in the top-level catalog;

descending one or more tiers from the first non-default element in the top-level catalog to identify a first index that (i) is greater than or equal to the reference index and (ii) has a non-default value, after identifying the first index, ascending one or more tiers in the tiered array and subsequently descending to identifying a second index that is a last index in a contiguous sequence of indexes having non-default values from the first index up to and including the second index, generating a pair of indexes comprising the first index and the second index, and updating the reference index to be equal to an index greater than the second index; and providing the generated pairs of index values identifying the plurality of dependencies for the node in response to the request.

20. The computer program product of claim 19, wherein the operations further comprise:

after ascending one tier in the tiered array to a first catalog, determining that the next element in the first catalog is a non-default element; and in response, descending one tier to a catalog identified by the non-default element.

21. The computer program product of claim 19, wherein descending one or more tiers in the tiered array comprises:

identifying, at each catalog in the one or more tiers, a first non-default element; and descending to a lower-tier catalog identified by the first non-default element.

22. The computer program product of claim 19, wherein ascending one or more tiers in the tiered array comprises determining that a particular catalog does not have any more non-default elements.

23. The computer program product of claim 19, wherein the operations further comprise:

determining that a particular non-bottom-most catalog does not have a subsequent non-default element; and designating the last index of the bottom-most catalog as the last index in a range of indexes having non-default values.

24. The computer program product of claim 19, wherein the operations further comprise:

obtaining, for a particular catalog, auxiliary data that specifies a first non-default element and a last non-default element of the catalog; and limiting the search within the catalog to elements between the first non-default element and the last non-default element of the catalog.

25. The computer program product of claim 19, wherein the operations further comprise:

obtaining, for a particular catalog, auxiliary data that specifies a first non-default element of the catalog, a last non-default element of the catalog, and a number of non-default elements in the catalog;

determining that a difference between index values for the first non-default element and the last non-default element indicates that all elements in the catalog are non-default elements; and in response, bypassing a linear search of the particular catalog.

26. The computer program product of claim 19, wherein the operations further comprise:

obtaining, for a particular catalog, auxiliary data that specifies a number of non-default elements in the catalog;

determining that the auxiliary data indicates that the particular catalog has no non-default elements; and in response, bypassing a linear search of the particular catalog.

27. The computer program product of claim 19, wherein the operations further comprise providing a user interface presentation that presents data representing one or more of the plurality of dependencies inbound to or outbound from the node.

* * * * *